United States Patent
Fujimoto

(10) Patent No.: US 8,320,105 B2
(45) Date of Patent: Nov. 27, 2012

(54) ELECTROLYTIC CAPACITOR

(75) Inventor: Kazumasa Fujimoto, Saga (JP)

(73) Assignees: SANYO Electric Co., Ltd., Moriguchi-shi, Osaka (JP); SAGA SANYO INDUSTRIES Co., Ltd., Kishima-gun, Saga (JP)

( * ) Notice: Subject to any disclaimer, the term of this patent is extended or adjusted under 35 U.S.C. 154(b) by 139 days.

(21) Appl. No.: 12/870,225

(22) Filed: Aug. 27, 2010

(65) Prior Publication Data

US 2011/0051317 A1  Mar. 3, 2011

(30) Foreign Application Priority Data

Aug. 31, 2009 (JP) ................... 2009-199524
Aug. 31, 2009 (JP) ................... 2009-199525
Aug. 31, 2009 (JP) ................... 2009-199526

(51) Int. Cl.
*H01G 9/15* (2006.01)

(52) U.S. Cl. ........ 361/512; 361/502; 361/508; 361/540; 361/517; 361/511

(58) Field of Classification Search .................. 361/502, 361/508, 540, 517, 533, 511, 512, 531
See application file for complete search history.

(56) References Cited

U.S. PATENT DOCUMENTS 6,366,447 B1 * 4/2002 Nakaaki ........................ 361/518

FOREIGN PATENT DOCUMENTS

JP 848345 S 6/1992
JP 2004-179621 A 6/2004

OTHER PUBLICATIONS

Design of a capacitor on p. 74 of a foreign magazine "Design News," No. 11, received by the National Center for Industrial Property Information and Training on Aug. 2008 (the Japan Patent Office, the Design Division, Publicly Known Design No. HB20008195).
Deign of a transistor package on p. 2 of a foreign catalog "Small Signal Transistors New Releases—Fall 2001" received by the Design Division of the Japan Patent Office on Apr. 2002 (the Japan Patent Office, the Design Division, Publicly Known Design No. HD14013294).
Notice of Grounds of Rejection dated Aug. 3, 2010, issued in Japanese Design Application No. 2010-005911, which was converted from Divisional Application of Third Basic Japanese Patent Application No. 2009-199526.

* cited by examiner

*Primary Examiner* — Jayprakash N Gandhi
*Assistant Examiner* — Hung Dang
(74) *Attorney, Agent, or Firm* — Westerman, Hattori, Daniels & Adrian, LLP

(57) ABSTRACT

A both-side pressed terminal is connected as a first anode (cathode) lead tab terminal to an anode (a cathode) foil. A first connection surface of a connection portion of a one-side pressed terminal as a second anode (cathode) lead tab terminal is connected to an inner circumferential surface of the anode (cathode) foil. A position in a radial direction of a lead of the second anode (cathode) lead tab terminal is shifted inward to be in registration with a position in a radial direction of a lead of the first anode (cathode) lead tab terminal. Thus, an electrolytic capacitor free from position displacement of an anode (a cathode) lead tab terminal while maintaining characteristics as an electrolytic capacitor can be obtained.

15 Claims, 44 Drawing Sheets

ELECTROLYTIC CAPACITOR

This nonprovisional application is based on Japanese Patent Application No. 2009-199524, Japanese Patent Application No. 2009-199525 and Japanese Patent Application No. 2009-199526 filed with the Japan Patent Office on Aug. 31, 2009, the entire contents of which are hereby incorporated by reference.

BACKGROUND OF THE INVENTION

1. Field of the Invention

The present invention relates to an electrolytic capacitor, and particularly to an electrolytic capacitor formed by winding an anode foil, a cathode foil and the like.

2. Description of the Background Art

An electrolytic capacitor formed by winding up an anode foil and a cathode foil with separator paper being interposed represents one form of an electrolytic capacitor.

Here, a method of manufacturing an electrolytic capacitor having a two-terminal (one anode terminal and one cathode terminal) structure representing such a wound-type electrolytic capacitor will now be described. Initially, as shown in FIG. 52, band-shaped anode foil 103 and cathode foil 104 each having a prescribed length and two sheets of separator paper 105, 106 are prepared. For example, an aluminum foil having a dielectric oxide film formed is applied as an anode foil and an aluminum foil is applied as a cathode foil.

An anode lead tab terminal 110 is connected at a prescribed position in a longitudinal direction of anode foil 103, and a cathode lead tab terminal 113 is connected at a prescribed position in a longitudinal direction of cathode foil 104. As shown in FIGS. 53 and 54, a columnar boss portion 116a, a plate-shaped connection portion 116b connected to anode foil (cathode) 103, 104, and a columnar lead 116c serving as an anode (a cathode) terminal are provided in anode (cathode) lead tab terminal 110, 113.

As shown in FIG. 52, anode foil 103, cathode foil 104 and the like are arranged in such a manner that one sheet of separator paper 105 is sandwiched between anode foil 103 and cathode foil 104 and anode foil 103 is sandwiched between one sheet of separator paper 105 and the other sheet of separator paper 106.

Then, as shown in FIG. 55, one-end sides of arranged anode foil 103, cathode foil 104 and sheets of separator paper 105, 106 are sandwiched between cores 131a and 131b. Then, by turning cores 131a, 131b clockwise in that state, anode foil 103, cathode foil 104 and the like are wound up from the one-end side, to thereby form a wound-type electrolytic capacitor.

An electrolytic capacitor has an inductance component referred to as equivalent series inductance (ESL). This ESL increases with the increase in a frequency, and then the electrolytic capacitor cannot function as a capacitor. Therefore, an electrolytic capacitor used in a high-frequency region is required to have lower ESL. In addition, an electrolytic capacitor has a resistance component referred to as equivalent series resistance (ESR), and it is required to have lower ESR.

In order to lower ESR and ESL, a multi-terminal electrolytic capacitor including a plurality of lead tab terminals as lead tab terminals is available. A method of manufacturing an electrolytic capacitor having a four-terminal (two anode terminals and two cathode terminals) structure representing such a multi-terminal electrolytic capacitor will now be described.

As shown in FIG. 56, a first anode lead tab terminal 111 and a second anode lead tab terminal 112 are connected at prescribed positions in a longitudinal direction of anode foil 103 respectively, and a first cathode lead tab terminal 114 and a second cathode lead tab terminal 115 are connected at prescribed positions in a longitudinal direction of cathode foil 104 respectively. Anode foil 103, cathode foil 104 and the like are arranged as in the case of a two-terminal electrolytic capacitor, and one-end sides thereof are sandwiched between cores 131a and 131b (see FIG. 55). By turning cores 131a, 131b clockwise in that state, anode foil 103, cathode foil 104 and the like are wound up from the one-end side, to thereby form a capacitor element 102 as shown in FIG. 57.

Then, a cut surface or the like of anode foil 103 and cathode foil 104 of capacitor element 102 is subjected to a prescribed treatment such as chemical conversion treatment. Then, a sealing rubber gasket 122 (see FIG. 58) is attached to capacitor element 102. In sealing rubber gasket 122, four openings 122a (see FIG. 58) corresponding to positions of respective lead tab terminals 111, 112, 114, 115 are formed. Sealing rubber gasket 122 is attached to capacitor element 102 such that leads 116c of lead tab terminals 111, 112, 114, 115 are inserted in respective openings 122a.

Capacitor element 102 to which sealing rubber gasket 122 is attached is accommodated in an aluminum case 120 with a bottom (see FIG. 58) having a prescribed size. Then, an open-end side of aluminum case 120 is sealed by pressing in a lateral direction and curling and prescribed aging treatment is performed. Then, a seat plate 124 made of plastic is attached to a curled surface of aluminum case 120. Four openings 124a (see FIG. 58) corresponding to positions of respective lead tab terminals 111, 112, 114, 115 are formed in seat plate 124.

Thereafter, as shown in FIG. 58, each lead 116c protruding through opening 124a in seat plate 124 and serving as an electrode terminal is pressed and bent, to thereby complete an electrolytic capacitor 101 having a four-terminal structure.

A method of manufacturing an electrolytic capacitor having a three-terminal (two anode terminals and one cathode terminal) as a multi-terminal electrolytic capacitor will now be described.

As shown in FIG. 59, first anode lead tab terminal 111 and second anode lead tab terminal 112 are connected at prescribed positions in a longitudinal direction of anode foil 103 respectively, and cathode lead tab terminal 113 is connected at a prescribed position in a longitudinal direction of cathode foil 104. Anode foil 103, cathode foil 104 and the like are arranged as in the case of a two-terminal electrolytic capacitor, and one-end sides thereof are sandwiched between cores 131a and 131b (see FIG. 55). By turning cores 131a, 131b clockwise in that state, anode foil 103, cathode foil 104 and the like are wound up from the one-end side, to thereby form capacitor element 102 as shown in FIG. 60.

Then, a cut surface or the like of anode foil 103 and cathode foil 104 of capacitor element 102 is subjected to a prescribed treatment such as chemical conversion treatment. Then, sealing rubber gasket 122 (see FIG. 61) is attached to capacitor element 102. In sealing rubber gasket 122, three openings 122a (see FIG. 61) corresponding to positions of respective lead tab terminals 111, 112, 113 are formed. Sealing rubber gasket 122 is attached to capacitor element 102 such that leads 116c of lead tab terminals 111, 112, 113 are inserted in respective openings 122a.

Capacitor element 102 to which sealing rubber gasket 122 is attached is accommodated in aluminum case 120 with a bottom (see FIG. 61) having a prescribed size. Then, an open-end side of aluminum case 120 is sealed by pressing in a lateral direction and curling and prescribed aging treatment is performed. Then, seat plate 124 made of plastic is attached to a curled surface of aluminum case 120. Three openings 124a (see FIG. 61) corresponding to positions of respective lead tab terminals 111, 112, 113 are formed in seat plate 124.

Thereafter, as shown in FIG. 61, each lead 116c protruding through opening 124a in seat plate 124 and serving as an electrode terminal is pressed and bent, to thereby complete electrolytic capacitor 101 having a three-terminal structure.

It is noted that Patent Document 1 (Japanese Patent Laying-Open No. 2004-179621) is an exemplary document disclosing an electrolytic capacitor having a multi-terminal structure such as a two- to four-terminal structure.

The inventors, however, have found that a conventional electrolytic capacitor having a multi-terminal structure suffers the following problems.

As described above, an electrolytic capacitor used in a high-frequency region in particular is required to have lower ESL. Since this ESL depends on a pitch between leads of anode (cathode) lead tab terminals, in order to lower ESL, the anode (cathode) lead tab terminals should be arranged in good balance, with regular pitches between the leads being set.

Namely, in the case of an electrolytic capacitor having a four-terminal structure, when electrolytic capacitor 101 is viewed from the anode (cathode) lead tab terminal side, it is required that first anode lead tab terminal 111, second anode lead tab terminal 112, first cathode lead tab terminal 114, and second cathode lead tab terminal 115 are arranged at positions corresponding to respective vertices of a square (or a rectangle).

Here, as shown in FIG. 62, it is assumed that two anode lead tab terminals 111, 112 are arranged in one anode foil 103 at positions corresponding to respective vertices of a square after winding-up. Then, as an electrolytic capacitor has a smaller diameter, a distance PL between two anode lead tab terminals 111 and 112 becomes shorter. For example, in an electrolytic capacitor having a diameter of 6.3 mm, distance PL between two anode lead tab terminals 111 and 112 should be set to several mm.

In the electrolytic capacitor having a diameter of 6.3 mm, however, a length L of anode foil 103 is around 60 to 70 mm, and it is difficult to accurately connect two anode lead tab terminals 111, 112 to anode foil 103 having such a length L at an interval of several mm (distance PL).

Meanwhile, in order to lower ESR, an anode lead tab terminal is desirably connected to an anode foil such that a resistance value of a portion of the anode foil extending toward one side with respect to an anode lead tab terminal connected to the anode foil is equal to a resistance value of a portion of the anode foil extending toward the other side.

Namely, the two anode lead tab terminals are desirably arranged such that a distance half the interval therebetween (distance PL), that is, a distance between one end of the anode foil and the anode lead tab terminal closest thereto is substantially equal to a distance between the other end of the anode foil and the anode lead tab terminal closest thereto. Therefore, if two anode lead tab terminals are connected to one anode foil too closely to each other, such a situation is the same as a state that substantially one anode lead tab terminal is connected, and characteristics as an electrolytic capacitor will be interfered in particular in a high-frequency region.

In order to overcome such disadvantages, the inventors made the following evaluation in order to ensure an interval between two anode lead tab terminals. Initially, in a state that an anode foil and the like are wound up, a position in a circumferential direction where a first anode lead tab terminal is arranged is defined as a first position in a circumferential direction, and a position in a circumferential direction where a second anode lead tab terminal is arranged is defined as a second position in a circumferential direction.

As shown in FIG. 63, anode foil 103, in which interval PL between first anode lead tab terminal 111 and second anode lead tab terminal 112 is set to an interval between a portion of anode foil 103 corresponding to the first position in the circumferential direction and a portion of anode foil 103 corresponding to the second position in the circumferential direction after winding up a closest portion of anode foil 103 corresponding to the second position in the circumferential direction with respect to the first position in the circumferential direction, and further winding up again anode foil 103, was prepared as anode foil 103.

Based on evaluation of winding-up using this anode foil 103 and the like, as shown in FIG. 64, a new problem that a position in a radial direction of second anode lead tab terminal 112 is displaced from a position in a radial direction of first anode lead tab terminal 111 was found to arise. It is noted that a case where a position in a radial direction of second anode lead tab terminal 112 is in registration with a position in a radial direction of first anode lead tab terminal 111, that is, a case where anode (cathode) lead tab terminals are arranged in good balance with pitches between four leads 116c being equal to each other, is shown in FIG. 64 with a dotted line.

As described above, in a wound-type electrolytic capacitor, one-end sides of the anode foil, the cathode foil and two sheets of separator paper are sandwiched between the cores, and they are wound up from the one-end side in that state. Therefore, in second winding and later, the anode foil and the like are further wound up over the portion of the anode foil and the like wound up so far.

Then, even if a position in a circumferential direction is the same, a portion wound up in an early stage is different in position in a radial direction from a portion wound up in a final stage, and thus a distance in a radial direction from a point of start of winding (center) becomes greater in a later stage of winding-up. Therefore, as shown in FIG. 64, regarding a circumferential direction, though second anode lead tab terminal 112 is arranged at a prescribed second position in a circumferential direction with respect to the first position in the circumferential direction where first anode lead tab terminal 111 is arranged, regarding a radial direction, it is arranged on an outer side relative to the position in the radial direction in a case where connection to the closest portion of anode foil 103 corresponding to the second position in the circumferential direction with respect to the first position in the circumferential direction. Namely, second anode lead tab terminal 112 is arranged on the outer side relative to the position in the radial direction of first anode lead tab terminal 111.

This is also the case with the first cathode lead tab terminal and the second cathode lead tab terminal, and in capacitor element 102 formed by winding up the anode foil and the like, two anode lead tab terminals 111, 112 and two cathode lead tab terminals 114, 115 are not arranged at positions corresponding to respective vertices of a square.

If two anode lead tab terminals 111, 112 and two cathode lead tab terminals 114, 115 are displaced from the positions corresponding to the respective vertices of the square, pitches between anode (cathode) lead tab terminals 111, 112, 114, 115 vary, ESL increases, and characteristics as the electrolytic capacitor become poorer. In addition, it becomes difficult to insert each anode (cathode) lead tab terminal 111, 112, 114, 115 in opening 122a in sealing rubber gasket 122 or opening 124a in seat plate 124 and productivity is interfered.

This is also the case with an electrolytic capacitor having a three-terminal structure. As shown in FIG. 65, in capacitor element 102 formed by winding up the anode foil and the like, two anode lead tab terminals 111, 112 and cathode lead tab terminal 113 are not arranged at positions corresponding to respective vertices of an equilateral triangle.

If two anode lead tab terminals 111, 112 are displaced from positions corresponding to respective vertices of an equilateral triangle, pitches between anode (cathode) lead tab terminals 111, 112, 113 vary, ESL increases, and characteristics as the electrolytic capacitor become poorer. In addition, it becomes difficult to insert each anode (cathode) lead tab terminal 111, 112, 113 in opening 122a in sealing rubber gasket 122 or opening 124a in seat plate 124 and productivity is interfered.

SUMMARY OF THE INVENTION

The present invention was made to solve the above-described problems, and an object of the present invention is to provide an electrolytic capacitor free from position displacement of anode (cathode) lead tab terminals while maintaining characteristics as an electrolytic capacitor.

A first electrolytic capacitor according to the present invention is an electrolytic capacitor formed by winding band-shaped anode foil and cathode foil, and the electrolytic capacitor includes an anode foil and a cathode foil, a first anode lead tab terminal, a second anode lead tab terminal, a first cathode lead tab terminal, and a second cathode lead tab terminal. The anode foil and the cathode foil are wound up in a prescribed orientation from one-end side in a longitudinal direction, in a manner opposed to each other. The first anode lead tab terminal is connected to a portion of the anode foil at a first distance from the one-end side of the anode foil and arranged at a prescribed first position in a circumferential direction in a wound-up state. The second anode lead tab terminal is connected to a portion of the anode foil at a second distance greater than the first distance from the one-end side of the anode foil and arranged at a prescribed second position in a circumferential direction with respect to the first position in the circumferential direction in the wound-up state. The first cathode lead tab terminal is connected to a portion of the cathode foil at a third distance from the one-end side of the cathode foil and arranged at a prescribed third position in a circumferential direction with respect to the first position in the circumferential direction and the second position in the circumferential direction in the wound-up state. The second cathode lead tab terminal is connected to a portion of the cathode foil at a fourth distance greater than the third distance from the one-end side of the cathode foil and arranged at a prescribed fourth position in a circumferential direction with respect to the third position in the circumferential direction in the wound-up state. Each of the first anode lead tab terminal and the second anode lead tab terminal includes an anode connection portion connected in contact with the anode foil and an anode lead electrically connected to the anode connection portion and serving as an anode terminal. Each of the first cathode lead tab terminal and the second cathode lead tab terminal includes a cathode connection portion connected in contact with the cathode foil and a cathode lead electrically connected to the cathode connection portion and serving as a cathode terminal. The second anode lead tab terminal is connected to a portion of the anode foil corresponding to the second position in the circumferential direction after winding up the anode foil by a prescribed length from the portion of the anode foil corresponding to the first position in the circumferential direction. One anode lead tab terminal of the first anode lead tab terminal and the second anode lead tab terminal is provided as a first type formed such that a position in a radial direction of the anode lead is different from a position in a radial direction of the anode connection portion in a state that the anode foil is wound up. The other anode lead tab terminal of the first anode lead tab terminal and the second anode lead tab terminal is provided as a second type formed such that a position in a radial direction of the anode lead is identical to a position in a radial direction of the anode connection portion in a state that the anode foil is wound up. The second cathode lead tab terminal is connected to a portion of the cathode foil corresponding to the fourth position in the circumferential direction after winding up the cathode foil by a prescribed length from the portion of the cathode foil corresponding to the third position in the circumferential direction. One cathode lead tab terminal of the first cathode lead tab terminal and the second cathode lead tab terminal is provided as a third type formed such that a position in a radial direction of the cathode lead is different from a position in a radial direction of the cathode connection portion in a state that the cathode foil is wound up. The other cathode lead tab terminal of the first cathode lead tab terminal and the second cathode lead tab terminal is provided as a fourth type formed such that a position in a radial direction of the cathode lead is identical to a position in a radial direction of the cathode connection portion in a state that the cathode foil is wound up.

A second electrolytic capacitor according to the present invention has band-shaped anode foil and cathode foil to be wound and four lead tab terminals. Each of the four lead tab terminals includes a connection portion connected in contact with any of the anode foil and the cathode foil and a lead electrically connected to the connection portion and serving as a terminal. The four lead tab terminals include such a lead tab terminal that the lead is arranged at a position in a radial direction identical to that of the connection portion and such a lead tab terminal that the lead is arranged at a position shifted in the radial direction with respect to the connection portion, in a state that the anode foil and the cathode foil are wound.

According to the first electrolytic capacitor of the present invention, one anode lead tab terminal of the first anode lead tab terminal and the second anode lead tab terminal is provided as the first type formed such that the position in the radial direction of the anode lead is different from the position in the radial direction of the anode connection portion in a state that the anode foil is wound up, and the other anode lead tab terminal is provided as the second type formed such that the position in the radial direction of the anode lead is the same as the position in the radial direction of the anode connection portion in a state that the anode foil is wound up. In addition, one cathode lead tab terminal of the first cathode lead tab terminal and the second cathode lead tab terminal is provided as the third type formed such that the position in the radial direction of the cathode lead is different from the position in the radial direction of the cathode connection portion in a state that the cathode foil is wound up, and the other cathode lead tab terminal is provided as the fourth type formed such that the position in the radial direction of the cathode lead is the same as the position in the radial direction of the cathode connection portion in a state that the cathode foil is wound up. Thus, a position in the circumferential direction of the anode (cathode) lead of the first anode (cathode) lead tab terminal is in registration with a position in the circumferential direction of the anode (cathode) lead of the second anode (cathode) lead tab terminal. Consequently, the anode (cathode) leads of the first (second) anode (cathode) lead tab terminals can be arranged at positions corresponding to respective vertices of a substantial square. In addition, since substantially regular pitches between four anode (cathode) leads are achieved, ESL becomes lower and characteristics as an electrolytic capacitor can be maintained.

According to the second electrolytic capacitor of the present invention, four lead tab terminals include such a lead tab terminal that a lead is arranged at the position in the radial direction the same as that of the connection portion and such a lead tab terminal that a lead is arranged at a position shifted in the radial direction with respect to the connection portion, in a state that the anode foil and the cathode foil are wound. Thus, registration of the positions in the radial direction of the leads of the lead tab terminals can be achieved. Consequently, registration in manufacturing is facilitated and characteristics as an electrolytic capacitor can be maintained.

A third electrolytic capacitor according to the present invention is an electrolytic capacitor formed by winding band-shaped anode foil and cathode foil, and the electrolytic capacitor includes an anode foil and a cathode foil, a first anode lead tab terminal, a second anode lead tab terminal, a first cathode lead tab terminal, and a second cathode lead tab terminal. The anode foil and the cathode foil are wound up in a prescribed orientation from one-end side in a longitudinal direction, in a manner opposed to each other. The first anode lead tab terminal is connected to a portion of the anode foil at a first distance from the one-end side of the anode foil and arranged at a prescribed first position in a circumferential direction in a wound-up state. The second anode lead tab terminal is connected to a portion of the anode foil at a second distance greater than the first distance from the one-end side of the anode foil and arranged at a prescribed second position in a circumferential direction with respect to the first position in the circumferential direction in the wound-up state. The first cathode lead tab terminal is connected to a portion of the cathode foil at a third distance from the one-end side of the cathode foil and arranged at a prescribed third position in a circumferential direction with respect to the first position in the circumferential direction and the second position in the circumferential direction in the wound-up state. The second cathode lead tab terminal is connected to a portion of the cathode foil at a fourth distance greater than the third distance from the one-end side of the cathode foil and arranged at a prescribed fourth position in a circumferential direction with respect to the third position in the circumferential direction in the wound-up state. Each of the first anode lead tab terminal and the second anode lead tab terminal includes an anode connection portion connected in contact with the anode foil and an anode lead electrically connected to the anode connection portion and serving as an anode terminal. Each of the first cathode lead tab terminal and the second cathode lead tab terminal includes a cathode connection portion connected in contact with the cathode foil and a cathode lead electrically connected to the cathode connection portion and serving as a cathode terminal. The second anode lead tab terminal is connected to a portion of the anode foil corresponding to the second position in the circumferential direction after winding up the anode foil by a prescribed length from the portion of the anode foil corresponding to the first position in the circumferential direction. The first anode lead tab terminal and the second anode lead tab terminal are formed such that a position in a radial direction of the anode lead is different from a position in a radial direction of the anode connection portion in a state that the anode foil is wound up. The second cathode lead tab terminal is connected to a portion of the cathode foil corresponding to the fourth position in the circumferential direction after winding up the cathode foil by a prescribed length from the portion of the cathode foil corresponding to the third position in the circumferential direction. The first cathode lead tab terminal and the second cathode lead tab terminal are formed such that a position in a radial direction of the cathode lead is different from a position in a radial direction of the cathode connection portion in a state that the cathode foil is wound up.

A fourth electrolytic capacitor according to the present invention has band-shaped anode foil and cathode foil to be wound and four lead tab terminals. Each of the four lead tab terminals includes a connection portion connected in contact with any of the anode foil and the cathode foil and a lead electrically connected to the connection portion and serving as a terminal. The four lead tab terminals include such a lead tab terminal that the lead is arranged at a position shifted radially outward with respect to the connection portion and such a lead tab terminal that the lead is arranged at a position shifted radially inward with respect to the connection portion, in a state that the anode foil and the cathode foil are wound.

According to the third electrolytic capacitor of the present invention, the first anode (cathode) lead tab terminal and the second anode (cathode) lead tab terminal are formed such that the position in the radial direction of the anode (cathode) lead is different from the position in the radial direction of the anode (cathode) connection portion in a state that the anode (cathode) foil is wound up. Thus, the position in the radial direction of the anode lead of the first anode (cathode) lead tab terminal can be shifted toward the outer circumference and the position in the radial direction of the anode (cathode) lead of the second anode (cathode) lead can be shifted toward the inner circumference. Thus, even when the position in the radial direction of the anode (cathode) connection portion of the first anode (cathode) lead tab terminal is arranged on an inner circumferential side relative to the position in the radial direction of the anode (cathode) connection portion of the second anode (cathode) lead tab terminal, the position in the radial direction of the anode (cathode) lead of the first anode (cathode) lead tab terminal and the position in the radial direction of the lead of the second anode (cathode) lead tab terminal can be brought closer to each other. Therefore, since the lead of the first (second) anode (cathode) lead tab terminal can be arranged at a position corresponding to a vertex of a substantial square, position displacement of the anode (cathode) lead tab terminal can be avoided. In addition, since substantially regular pitches between the four anode (cathode) leads of the first (second) anode (cathode) lead tab terminals are achieved, ESL becomes lower and characteristics as an electrolytic capacitor can be maintained.

According to the fourth electrolytic capacitor of the present invention, the four lead tab terminals include such a lead tab terminal that the lead is arranged at a position shifted radially outward with respect to the connection portion and such a lead tab terminal that the lead is arranged at a position shifted radially inward with respect to the connection portion, in a state that the anode foil and the cathode foil are wound. Thus, registration of the positions in the radial direction of the leads of the lead tab terminals can be achieved. Consequently, registration in manufacturing is facilitated and characteristics as an electrolytic capacitor can be maintained.

A fifth electrolytic capacitor according to the present invention is an electrolytic capacitor formed by winding band-shaped anode foil and cathode foil, and the electrolytic capacitor includes an anode foil and a cathode foil, a first anode lead tab terminal, a second anode lead tab terminal, and one cathode lead tab terminal. The anode foil and the cathode foil are wound up in a prescribed orientation from one-end side in a longitudinal direction, in a manner opposed to each other. The first anode lead tab terminal is connected to a portion of the anode foil at a first distance from the one-end side of the anode foil and arranged at a prescribed first position in a circumferential direction in a wound-up state. The second anode lead tab terminal is connected to a portion of the anode foil at a second distance greater than the first distance from the one-end side of the anode foil and arranged at a prescribed second position in a circumferential direction with respect to the first position in the circumferential direction in the wound-up state. The cathode lead tab terminal is connected to a portion of the cathode foil at a third distance from the one-end side of the cathode foil and arranged at a prescribed third position in a circumferential direction with respect to the first position in the circumferential direction and the second position in the circumferential direction in the wound-up state. Each of the first anode lead tab terminal and the second anode lead tab terminal includes an anode connection portion connected in contact with the anode foil and an anode lead electrically connected to the anode connection portion and serving as an anode terminal. The cathode lead tab terminal includes a cathode connection portion connected in contact with the cathode foil and a cathode lead electrically connected to the cathode connection portion and serving as a cathode terminal. The second anode lead tab terminal is connected to a portion of the anode foil corresponding to the second position in the circumferential direction after winding up the anode foil by a prescribed length from the portion of the anode foil corresponding to the first position in the circumferential direction. At least one anode lead tab terminal of the first anode lead tab terminal and the second anode lead tab terminal is provided as a first type formed such that a position in a radial direction of the anode lead is different from a position in a radial direction of the anode connection portion in a state that the anode foil is wound up.

A sixth electrolytic capacitor according to the present invention has band-shaped anode foil and cathode foil to be wound and three lead tab terminals. Each of the three lead tab terminals includes a connection portion connected in contact with any of the anode foil and the cathode foil and a lead electrically connected to the connection portion and serving as a terminal. The three lead tab terminals include such a lead tab terminal that the lead is arranged at a position in a radial direction identical to that of the connection portion and such a lead tab terminal that the lead is arranged at a position shifted in the radial direction with respect to the connection portion, in a state that the anode foil and the cathode foil are wound.

A seventh electrolytic capacitor according to the present invention has band-shaped anode foil and cathode foil to be wound and three lead tab terminals. Each of the three lead tab terminals includes a connection portion connected in contact with any of the anode foil and the cathode foil and a lead electrically connected to the connection portion and serving as a terminal. The three lead tab terminals include such a lead tab terminal that the lead is arranged at a position shifted radially outward with respect to the connection portion and such a lead tab terminal that the lead is arranged at a position shifted radially inward with respect to the connection portion, in a state that the anode foil and the cathode foil are wound.

According to the fifth electrolytic capacitor of the present invention, at least one of the first anode lead tab terminal and the second anode lead tab terminal is formed such that the position in the radial direction of the anode lead is different from the position in the radial direction of the anode connection portion in a state that the anode foil is wound up. Thus, at least one of shifting toward the outer circumference of the position in the radial direction of the anode lead of the first anode lead tab terminal and shifting toward the inner circumference of the position in the radial direction of the anode lead of the second anode lead tab terminal can be made. Therefore, even when the position in the radial direction of the anode connection portion of the first anode lead tab terminal is arranged on the inner circumferential side relative to the position in the radial direction of the anode connection portion of the second anode lead tab terminal, the position in the radial direction of the anode lead of the first anode lead tab terminal and the position in the radial direction of the lead of the second anode lead tab terminal can be brought closer to each other. Therefore, since the lead of the first anode lead tab terminal can be arranged at a position corresponding to a vertex of a substantially equilateral triangle, position displacement of the anode lead tab terminal can be avoided. In addition, since substantially regular pitches between the three anode (cathode) leads of the first and second anode lead tab terminals and the cathode lead tab terminal are achieved, ESL becomes lower and characteristics as an electrolytic capacitor can be maintained.

According to the sixth electrolytic capacitor of the present invention, the three lead tab terminals include such a lead tab terminal that a lead is arranged at a position in the radial direction the same as that of the connection portion and such a lead tab terminal that a lead is arranged at a position shifted in the radial direction with respect to the connection portion, in a state that the anode foil and the cathode foil are wound. Thus, registration of the positions in the radial direction of the leads of the lead tab terminals can be achieved. Consequently, registration in manufacturing is facilitated and characteristics as an electrolytic capacitor can be maintained.

According to the seventh electrolytic capacitor of the present invention, the three lead tab terminals include such a lead tab terminal that a lead is arranged at a position shifted radially outward with respect to the connection portion and such a lead tab terminal that a lead is arranged at a position shifted radially inward with respect to the connection portion, in a state that the anode foil and the cathode foil are wound. Thus, registration of the positions in the radial direction of the leads of the lead tab terminals can be achieved. Consequently, registration in manufacturing is facilitated and characteristics as an electrolytic capacitor can be maintained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

First Embodiment

Here, an electrolytic capacitor in which a both-side pressed terminal is applied as a first anode (cathode) lead tab terminal and a one-side pressed terminal is applied as a second anode (cathode) lead tab terminal will be described.

Figure 1:
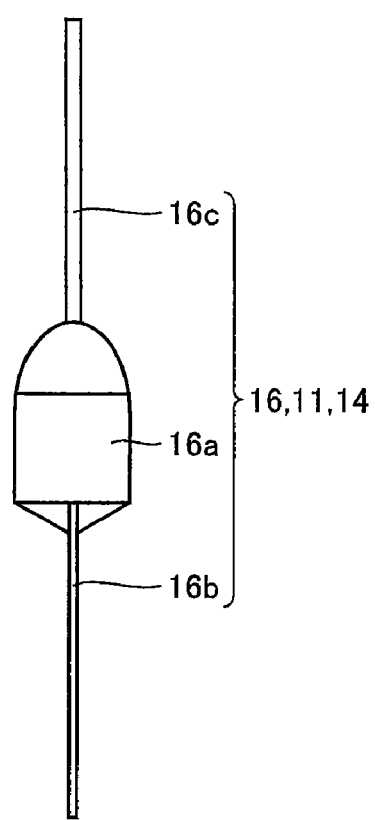
FIG. 1 is a side view showing a both-side pressed terminal applied to an electrolytic capacitor according to a first embodiment of the present invention.

As shown in FIG. 1, a both-side pressed terminal 16 is molded substantially symmetrical with respect to a lead 16c by using two identical molds, and a columnar boss portion 16a, a plate-shaped connection portion 16b connected to an anode (cathode) foil, and columnar lead 16c serving as an anode (cathode) terminal are molded. Lead 16c is provided on one-end side of boss portion 16a, and connection portion 16b is provided on the other end side of boss portion 16a. In FIG. 1, plate-shaped connection portion 16b is arranged in a direction perpendicular to the sheet surface.

Figure 2A:
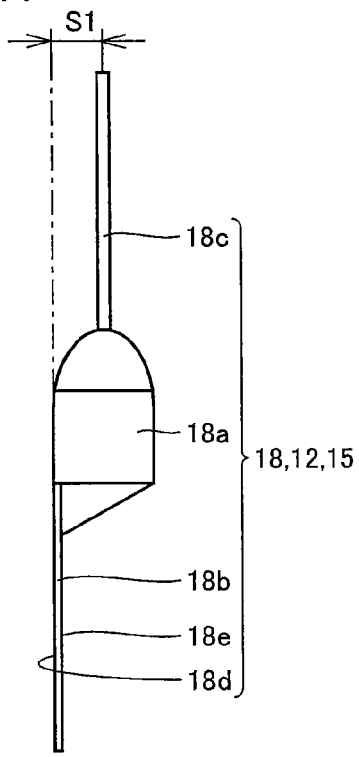
FIG. 2A is a side view showing one example of a one-side pressed terminal applied to the electrolytic capacitor in the first embodiment.
Figure 2B:
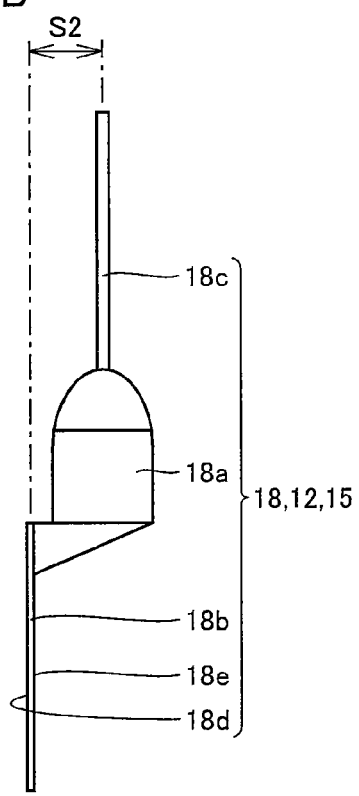
FIG. 2B is a side view showing another example of the one-side pressed terminal applied to the electrolytic capacitor in the first embodiment.

Meanwhile, as shown in FIGS. 2A and 2B, a one-side pressed terminal 18 is molded asymmetrical with respect to lead 16c by mainly using one mold of two identical molds. FIG. 2A shows a one-side pressed terminal relatively small in a shift amount (a distance S1) of a lead 18c with respect to a connection portion 18b, and FIG. 2B shows a one-side pressed terminal relatively great in a shift amount (a distance S2). In any one-side pressed terminal 18, a columnar boss portion 18a, plate-shaped connection portion 18b connected to an anode (cathode) foil, and columnar lead 18c serving as an anode (cathode) terminal are molded. Lead 18c is provided on one-end side of boss portion 18a, and connection portion 18b is provided on the other end side of boss portion 18a.

In FIGS. 2A and 2B, plate-shaped connection portion 18b is arranged in a direction perpendicular to the sheet surface. In addition, regarding a surface of connection of this one-side pressed terminal 18 to the anode (cathode) foil, for the sake of illustration, a connection surface of connection portion 18b located opposite to the side where lead 18c is shifted with respect to connection portion 18b is defined as a first connection surface 18d, and a connection surface of connection portion 18b located on the side where lead 18c is shifted is defined as a second connection surface 18e. As will be described later, in one-side pressed terminal 18, lead 18c and boss portion 18a can be arranged at positions shifted in a radial direction from the position of connection portion 18b connected to the anode (cathode) foil.

Figure 3:
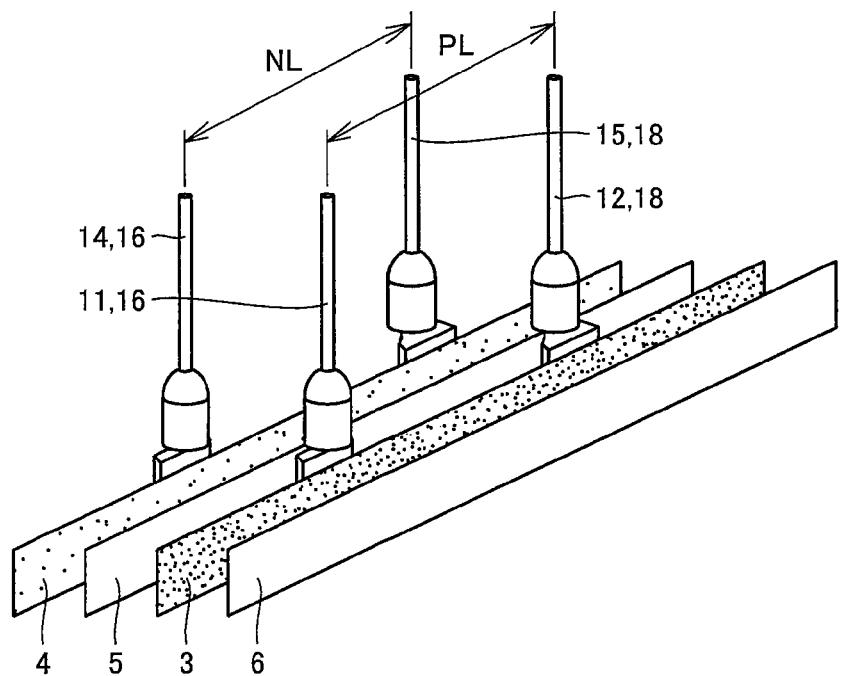
FIG. 3 is a perspective view showing a manner of connection of an anode (a cathode) lead tab terminal to an anode (a cathode) foil and a manner of arrangement of the anode (cathode) foil and a separator in the first embodiment.

A method of manufacturing an electrolytic capacitor will now be described. Initially, as shown in FIG. 3, at prescribed positions in a longitudinal direction of an anode foil 3, both-side pressed terminal 16 is connected as a first anode lead tab terminal 11 and one-side pressed terminal 18 is connected as a second anode lead tab terminal 12. In addition, at prescribed positions in a longitudinal direction of a cathode foil 4, both-side pressed terminal 16 is connected as a first cathode lead tab terminal 14 and one-side pressed terminal 18 is connected as a second cathode lead tab terminal 15.

Here, first anode lead tab terminal 11 is connected to a portion of anode foil 3 arranged at a prescribed distance (a first distance) from one-end side of anode foil 3, at a prescribed first position in a circumferential direction in a wound-up state. In addition, second anode lead tab terminal 12 is connected to a portion of anode foil 3 arranged at a distance greater than the prescribed distance (a second distance) from the one-end side of the anode foil, at a prescribed second position in a circumferential direction with respect to the first position in the circumferential direction in the wound-up state.

Interval PL between first anode lead tab terminal 11 and second anode lead tab terminal 12 is set to an interval between a portion of anode foil 3 corresponding to the first position in the circumferential direction in anode foil 3 and a portion of anode foil 3 corresponding to the second position in the circumferential direction after winding up a closest portion of anode foil 3 corresponding to the second position in the circumferential direction with respect to the first position in the circumferential direction and further winding up anode foil 3 again.

First cathode lead tab terminal 14 is connected to a portion of cathode foil 4 arranged at a prescribed distance (a third distance) from one-end side of cathode foil 4, at a prescribed third position in a circumferential direction with respect to the first position in the circumferential direction and the second position in the circumferential direction in the wound-up state. In addition, second cathode lead tab terminal 15 is connected to a portion of cathode foil 4 arranged at a distance greater than the prescribed distance (a fourth distance) from the one-end side of the cathode foil, at a prescribed fourth position in a circumferential direction with respect to the third position in the circumferential direction in the wound-up state.

An interval NL between first cathode lead tab terminal 14 and second cathode lead tab terminal 15 is set to an interval between a portion of cathode foil 4 corresponding to the third position in the circumferential direction in cathode foil 4 and a portion of cathode foil 4 corresponding to the fourth position in the circumferential direction after winding up a closest portion of cathode foil 4 corresponding to the fourth position in the circumferential direction with respect to the third position in the circumferential direction and further winding up cathode foil 4 again. Here, the circumferential direction refers to a circumferential direction with one-end sides of anode foil 3, cathode foil 4 and the like serving as the point of start of winding being defined as a central portion, and the radial direction refers to a direction substantially orthogonal to the circumferential direction from the central portion.

Then, as shown in FIG. 3, anode foil 3 and cathode foil 4 are arranged in such a manner that one sheet of separator paper 5 is sandwiched between anode foil 3 and cathode foil 4 and anode foil 3 is sandwiched between one sheet of separator paper 5 and the other sheet of separator paper 6.

Figure 4:
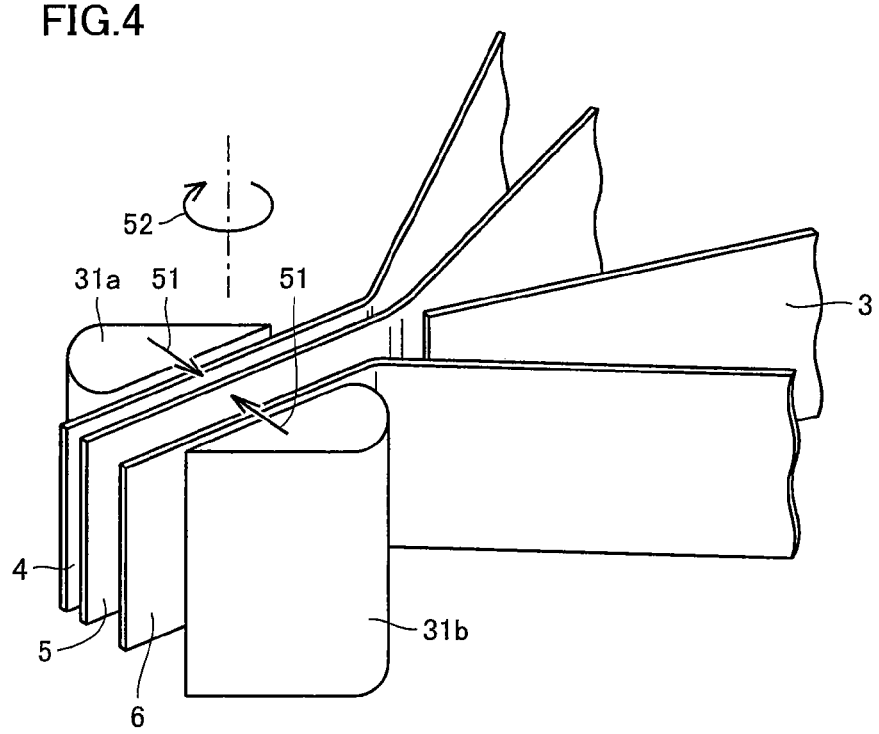
FIG. 4 is a partial perspective view showing one step of a method of manufacturing an electrolytic capacitor in the first embodiment.
Figure 5:
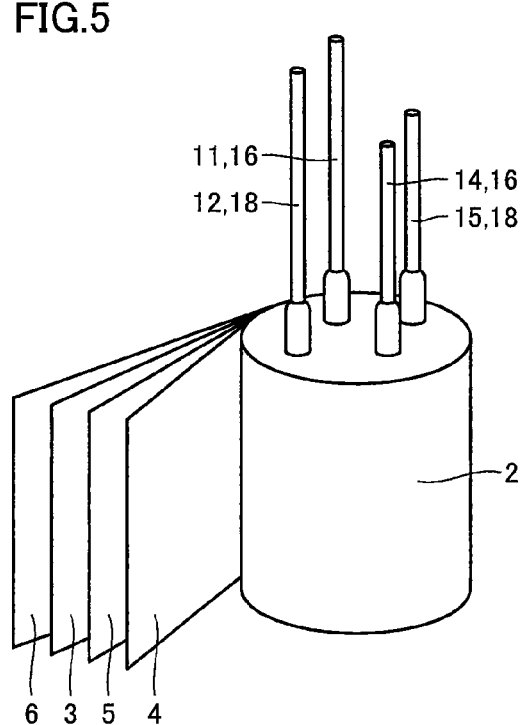
FIG. 5 is a perspective view showing a step performed subsequent to the step shown in FIG. 4 in the first embodiment.

Then, as shown in FIG. 4, one-end sides of arranged anode foil 3, cathode foil 4 and sheets of separator paper 5, 6 are sandwiched between a core 31*a* and a core 31*b* as shown with an arrow 51. Then, by turning cores 31*a*, 31*b* clockwise as shown with an arrow 52 in that state, anode foil 3, cathode foil 4 and the like are wound up from the one-end side in such a manner that first anode (cathode) lead tab terminal 11, 14 and second anode (cathode) lead tab terminal 12, 15 are located on an inner circumferential surface of anode (cathode) foil 3, 4, to thereby form a capacitor element 2 as shown in FIG. 5.

Then, a cut surface or the like of the anode foil or the like of capacitor element 2 is subjected to chemical conversion treatment and further to heat treatment at a temperature from 150° C. to 300° C. Then, capacitor element 2 is impregnated with a solution mixture of a monomer forming a conductive polymer through polymerization, such as 3,4-ethylenedioxythiophene, and a ferric p-toluenesulfonate alcohol solution representing an oxidizing agent solution. Thereafter, through thermochemical polymerization, a conductive polymer layer (not shown) is formed between electrodes of capacitor element 2. Other than these materials, a conductive polymer material such as polypyrrole, polyfuran or polyaniline, or TCNQ complex salt (7,7,8,8-tetracyanoquinodimethane) may be used as an electrolyte.

Figure 6:
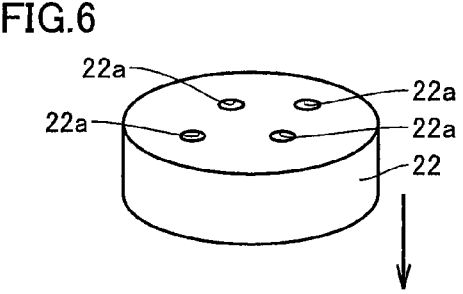
FIG. 6 is a perspective view showing a step performed subsequent to the step shown in FIG. 5 in the first embodiment.
Figure 6:
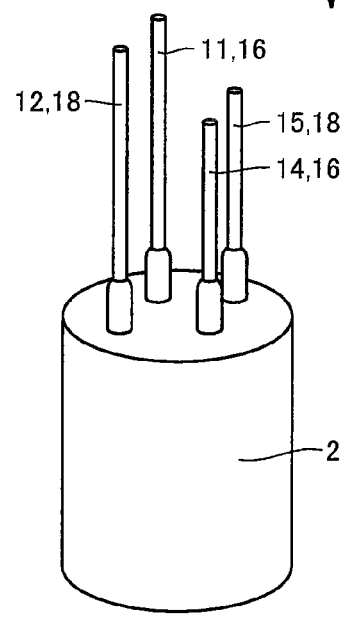
Figure 7:
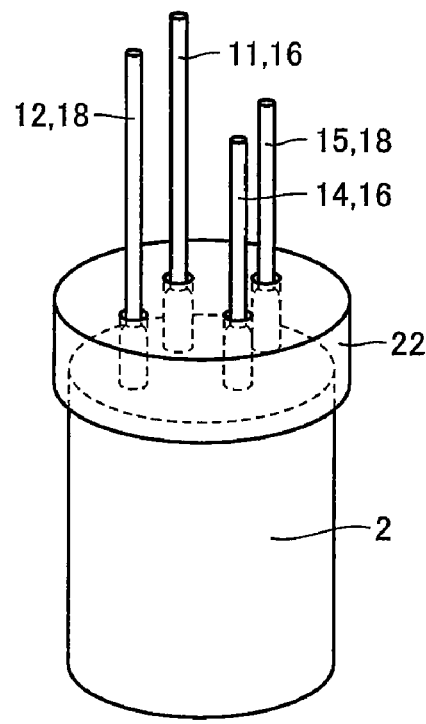
FIG. 7 is a perspective view showing a step performed subsequent to the step shown in FIG. 6 in the first embodiment.

Then, as shown in FIG. 6, a sealing rubber gasket 22 is attached to capacitor element 2. In sealing rubber gasket 22, four openings 22*a* are formed at prescribed positions corresponding to first anode (cathode) lead tab terminals 11, 14 and second anode (cathode) lead tab terminals 12, 15 respectively. As shown in FIG. 7, sealing rubber gasket 22 is attached to capacitor element 2 by inserting leads 16*c*, 18*c* and boss portions 16*a*, 18*a* of first (second) anode (cathode) lead tab terminals 11, 12, 14, 15 in corresponding openings 22*a* respectively.

Then, capacitor element 2 to which sealing rubber gasket 22 is attached is accommodated in an aluminum case 20 with a bottom (see FIG. 8) having a prescribed size. Then, an open-end side of aluminum case 20 is sealed by pressing in a lateral direction and curling and prescribed aging treatment is performed. Then, a seat plate 24 made of plastic is attached to a curled surface of aluminum case 20.

Figure 8:
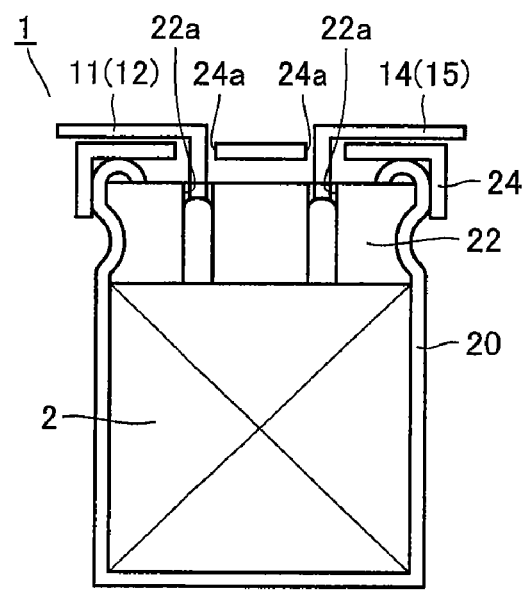
FIG. 8 is a cross-sectional view showing a step performed subsequent to the step shown in FIG. 7 in the first embodiment.
Figure 9:
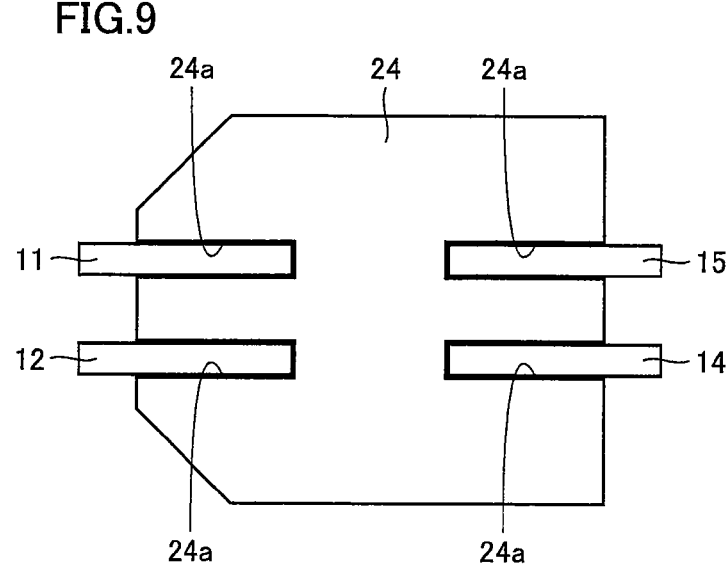
FIG. 9 is a top view in the step shown in FIG. 8 in the first embodiment.

As shown in FIG. 9, four openings 24*a* corresponding to positions of first (second) anode (cathode) lead tab terminals 11, 12, 14, 15 are formed in seat plate 24. Seat plate 24 is attached to capacitor element 2 by inserting leads 16*c*, 18*c* of first (second) anode (cathode) lead tab terminals 11, 12, 14, 15 in respective corresponding openings 24*a*. Thereafter, as shown in FIGS. 8 and 9, each lead 16*c*, 18*c* protruding through opening 24*a* in seat plate 24 and serving as an electrode terminal is pressed and bent, to thereby complete an electrolytic capacitor 1 having a four-terminal structure.

In the electrolytic capacitor described above, one-side pressed terminal 18 is applied as second anode (cathode) lead tab terminal 12, 15, and the position in the radial direction of lead 18*c* thereof is shifted inward so as to be able to be in registration with the position in the radial direction of lead 16*c* of first anode (cathode) lead tab terminal 11, 14 (both-side pressed terminal 16), which will now be described.

Figure 10:
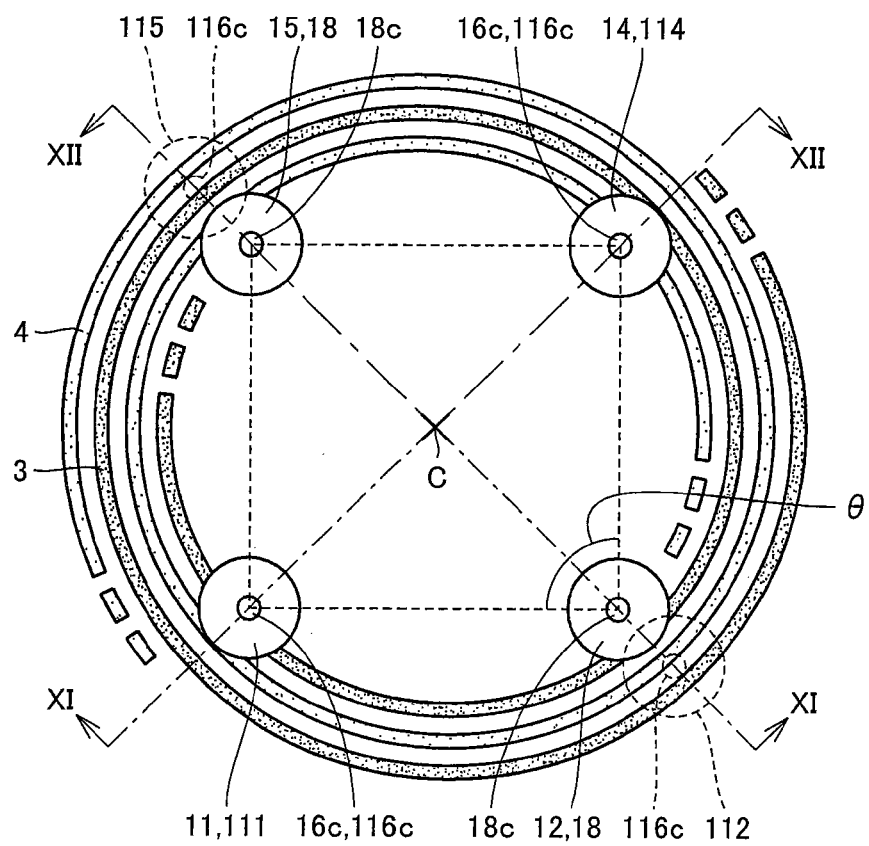
FIG. 10 is a plan view showing arrangement relation of anode (cathode) lead tab terminals in the first embodiment.

Initially, in a Comparative Example where a both-side pressed terminal is applied as the first anode (cathode) lead tab terminal and a both-side pressed terminal is applied as the second anode (cathode) lead tab terminal, as shown in FIG. 10, regarding the circumferential direction, second anode lead tab terminal 112 (lead 116*c*) is arranged at a prescribed second position in a circumferential direction with respect to the first position in the circumferential direction where first anode lead tab terminal 111 (lead 116*c*) is arranged. Regarding the radial direction, however, second anode lead tab terminal 112 (lead 116*c*) is arranged on the outer side relative to the position in the radial direction of first anode lead tab terminal 111 (lead 116*c*), because the anode (cathode) foil 3, 4 is wound up once. In FIG. 10 and the like, one-end sides of anode foil 3, cathode foil 4 and the like serving as the point of start of winding are shown as a central portion C.

Figure 11:
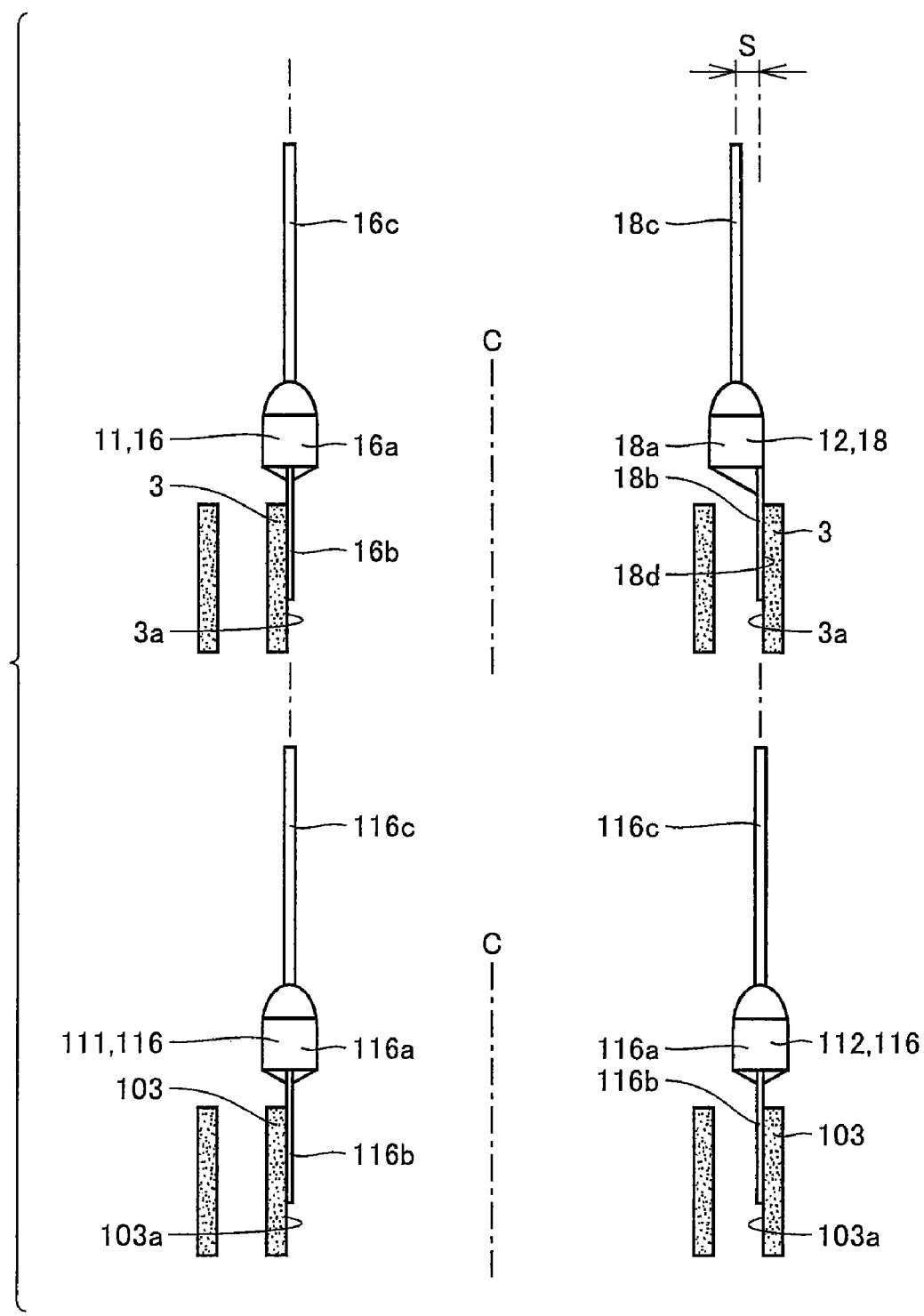
FIG. 11 is a cross-sectional view along the line XI-C-XI shown in FIG. 10 in the first embodiment and a cross-sectional view along that line in an electrolytic capacitor according to a Comparative Example.
Figure 12:
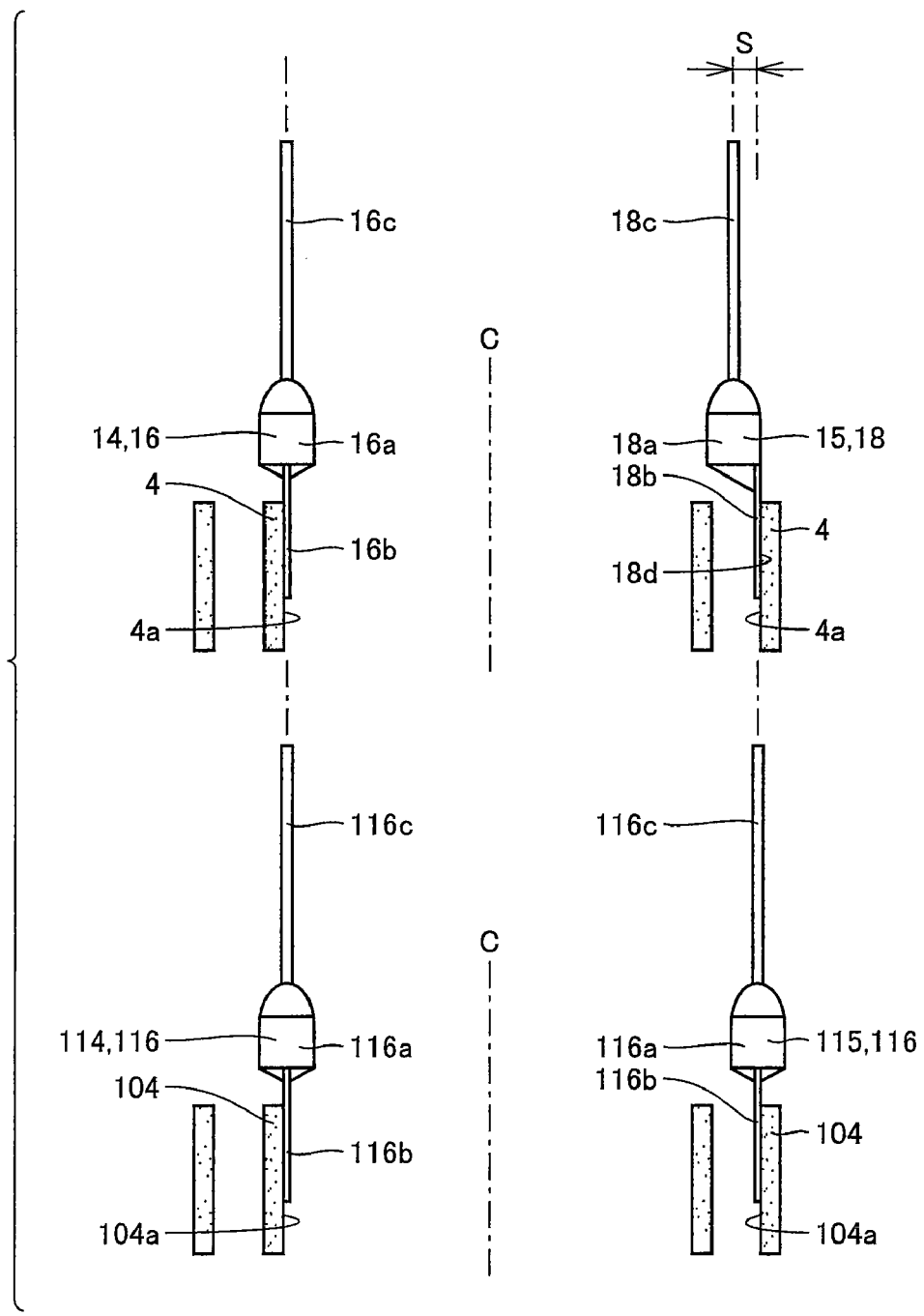
FIG. 12 is a cross-sectional view along the line XII-C-XII shown in FIG. 10 in the first embodiment and a cross-sectional view along that line in the electrolytic capacitor according to Comparative Example.

Similarly, regarding the circumferential direction, second cathode lead tab terminal 115 (lead 116*c*) is arranged at a prescribed second position in a circumferential direction with respect to the first position in the circumferential direction where first cathode lead tab terminal 114 (lead 116*c*) is arranged. Regarding the radial direction, however, second cathode lead tab terminal 115 (lead 116*c*) is arranged on the outer side relative to the position in the radial direction of first cathode lead tab terminal 114 (lead 116*c*), because anode (cathode) foil 3, 4 and the like are wound up once. FIGS. 11 and 12 show a cross-sectional structure of the electrolytic capacitor according to this Comparative Example in lower portions thereof.

In contrast, in the electrolytic capacitor described above, as shown in upper portions of FIGS. 11 and 12, one-side pressed terminal 18 is applied as second anode (cathode) lead tab terminal 12, 15 and in addition one-side pressed terminal 18 is connected to anode (cathode) foil 3, 4 in such a manner that first connection surface 18*d* of connection portion 18*b* is in contact with an inner circumferential surface 3*a*, 4*a* of anode (cathode) foil 3. Therefore, though the position in the radial direction of connection portion 18*b* is not different from the position in the radial direction of connection portion 116*b* in a case where both-side pressed terminal 116 is applied, the position in the radial direction of lead 18*c* (boss portion 18*a*) is shifted by a distance S toward the center (start of winding of anode foil 3 and the like) C side (inner side) of capacitor element 2 relative to the position in the radial direction of lead 116*c* (boss portion 116*a*) in a case where both-side pressed terminal 116 shown in the lower portions of FIGS. 11 and 12 is applied.

Thus, as shown in FIG. 10, the position in the radial direction of lead 18*c* (boss portion 18*a*) of one-side pressed terminal 18 serving as second anode (cathode) lead tab terminal 12, 15 is shifted inward to be in registration with the position in the radial direction of lead 16*c* (boss portion 16*a*) of both-side pressed terminal 16 serving as first anode (cathode) lead tab terminal 11, 14, so that leads 16*c*, 18*c* of first (second) anode (cathode) lead tab terminals 11, 12, 14, 15 can be arranged at positions corresponding to respective vertices of a square. Though a two-dimensional arrangement pattern of leads 16*c*, 18*c* is not limited to a square, an angle θ formed by one vertex is preferably in a range from 70 to 110° and more preferably around 90°. It is noted that the two-dimensional arrangement pattern refers to an arrangement pattern of leads in an electrolytic capacitor when a side from which first (second) anode (cathode) lead tab terminals 11, 12, 14, 15 protrude is two-dimensionally viewed.

Consequently, substantially regular pitches between first (second) anode (cathode) lead tab terminals 11, 12, 14, 15 are achieved, ESL is lowered, and lowering in characteristics as the electrolytic capacitor can be suppressed. In addition, leads or boss portions of first (second) anode (cathode) lead tab terminals 11, 12, 14, 15 can readily be inserted in openings 22*a* in sealing rubber gasket 22 or openings 24*a* in seat plate 24 and thus productivity can be improved.

Second Embodiment

Here, an electrolytic capacitor in which a one-side pressed terminal is applied as the first anode (cathode) lead tab terminal and a both-side pressed terminal is applied as the second anode (cathode) lead tab terminal will be described.

Figure 13:
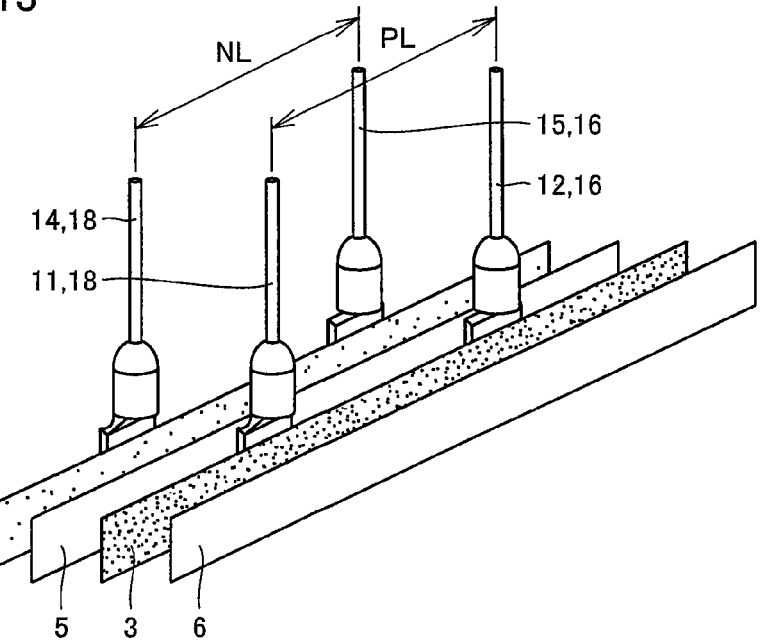
FIG. 13 is a perspective view showing a manner of connection of an anode (a cathode) lead tab terminal to an anode (a cathode) foil and a manner of arrangement of the anode (cathode) foil and a separator in an electrolytic capacitor according to a second embodiment of the present invention.

Initially, as shown in FIG. 13, at prescribed positions in a longitudinal direction of anode foil 3, one-side pressed terminal 18 is connected as first anode lead tab terminal 11 and both-side pressed terminal 16 is connected as second anode lead tab terminal 12. In addition, at prescribed positions in a longitudinal direction of cathode foil 4, one-side pressed terminal 18 is connected as first cathode lead tab terminal 14 and both-side pressed terminal 16 is connected as second cathode lead tab terminal 15.

Here, as in the electrolytic capacitor described previously, first anode lead tab terminal 11 is connected to a portion of anode foil 3 arranged at a prescribed distance (a first distance) from the one-end side of anode foil 3, at a prescribed first position in a circumferential direction in the wound-up state. In addition, second anode lead tab terminal 12 is connected to a portion of anode foil 3 arranged at a distance greater than the prescribed distance (a second distance) from the one-end side of the anode foil, at a prescribed second position in a circumferential direction with respect to the first position in the circumferential direction in the wound-up state.

Interval PL between first anode lead tab terminal 11 and second anode lead tab terminal 12 is set to an interval between a portion of anode foil 3 corresponding to the first position in the circumferential direction and a portion of anode foil 3 corresponding to the second position in the circumferential direction after winding up a closest portion of anode foil 3 corresponding to the second position in the circumferential direction with respect to the first position in the circumferential direction and further winding up anode foil 3 again.

Further, first cathode lead tab terminal 14 is connected to a portion of cathode foil 4 arranged at a prescribed distance (a third distance) from the one-end side of cathode foil 4, at a prescribed third position in a circumferential direction with respect to the first position in the circumferential direction and the second position in the circumferential direction in the wound-up state. In addition, second cathode lead tab terminal 15 is connected to a portion of cathode foil 4 arranged at a distance greater than the prescribed distance (a fourth distance) from the one-end side of the cathode foil, at a prescribed fourth position in a circumferential direction with respect to the third position in the circumferential direction in the wound-up state.

Interval NL between first cathode lead tab terminal 14 and second cathode lead tab terminal 15 is set to an interval between a portion of cathode foil 4 corresponding to the first position in the circumferential direction and a portion of cathode foil 4 corresponding to the second position in the circumferential direction after winding up a closest portion of cathode foil 4 corresponding to the second position in the circumferential direction with respect to the first position in the circumferential direction and further winding up cathode foil 4 again.

Then, as in the method shown in FIG. 4 described previously, one-end sides of arranged anode foil 3, cathode foil 4 and sheets of separator paper 5, 6 are sandwiched between core 31*a* and core 31*b*. Then, by turning cores 31*a*, 31*b* clockwise in that state, anode foil 3, cathode foil 4 and the like are wound up from the one-end side in such a manner that first anode (cathode) lead tab terminal 11, 14 and second anode (cathode) lead tab terminal 12, 15 are located on the inner circumferential surface of anode (cathode) foil 3, 4, to thereby form capacitor element 2. Then, the capacitor element is subjected to chemical conversion treatment or the like, and thereafter, as in the steps shown in FIGS. 6 to 9, attachment of the sealing rubber gasket, accommodation in an aluminum case and working, attachment of a seat plate, and the like are performed, to thereby complete an electrolytic capacitor.

In the electrolytic capacitor described above, one-side pressed terminal 18 is applied as first anode (cathode) lead tab terminal 11, 14 and the position in the radial direction of lead 18*c* thereof is shifted outward so as to be able to be in registration with the position in the radial direction of lead 16*c* of second anode (cathode) lead tab terminal 12, 15 (both-side pressed terminal 16), which will now be described.

Figure 14:
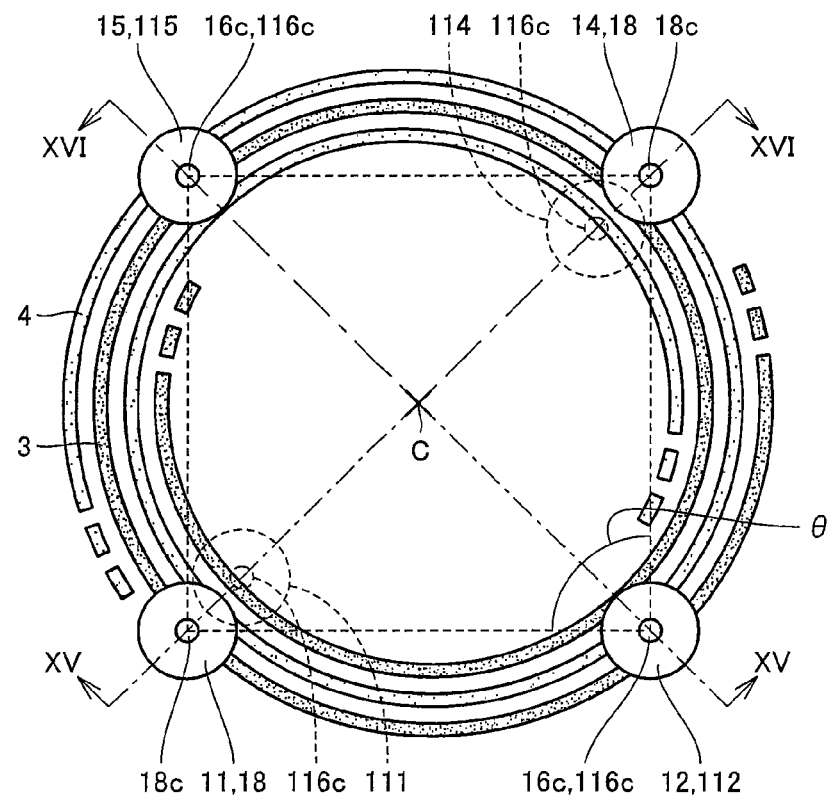
FIG. 14 is a plan view showing arrangement relation of anode (cathode) lead tab terminals in the second embodiment.

Initially, in a Comparative Example where a both-side pressed terminal is applied as the first anode (cathode) lead tab terminal and a both-side pressed terminal is applied as the second anode (cathode) lead tab terminal, as shown in FIG. 14, regarding the circumferential direction, second anode lead tab terminal 112 (lead 116*c*) is arranged at a prescribed second position in a circumferential direction with respect to the first position in the circumferential direction where first anode lead tab terminal 111 (lead 116*c*) is arranged. Regarding the radial direction, however, second anode lead tab terminal 112 (lead 116*c*) is arranged on the outer side relative to the position in the radial direction of first anode lead tab terminal 111 (lead 116*c*), because anode (cathode) foil 3, 4 and the like are wound up once.

Figure 15:
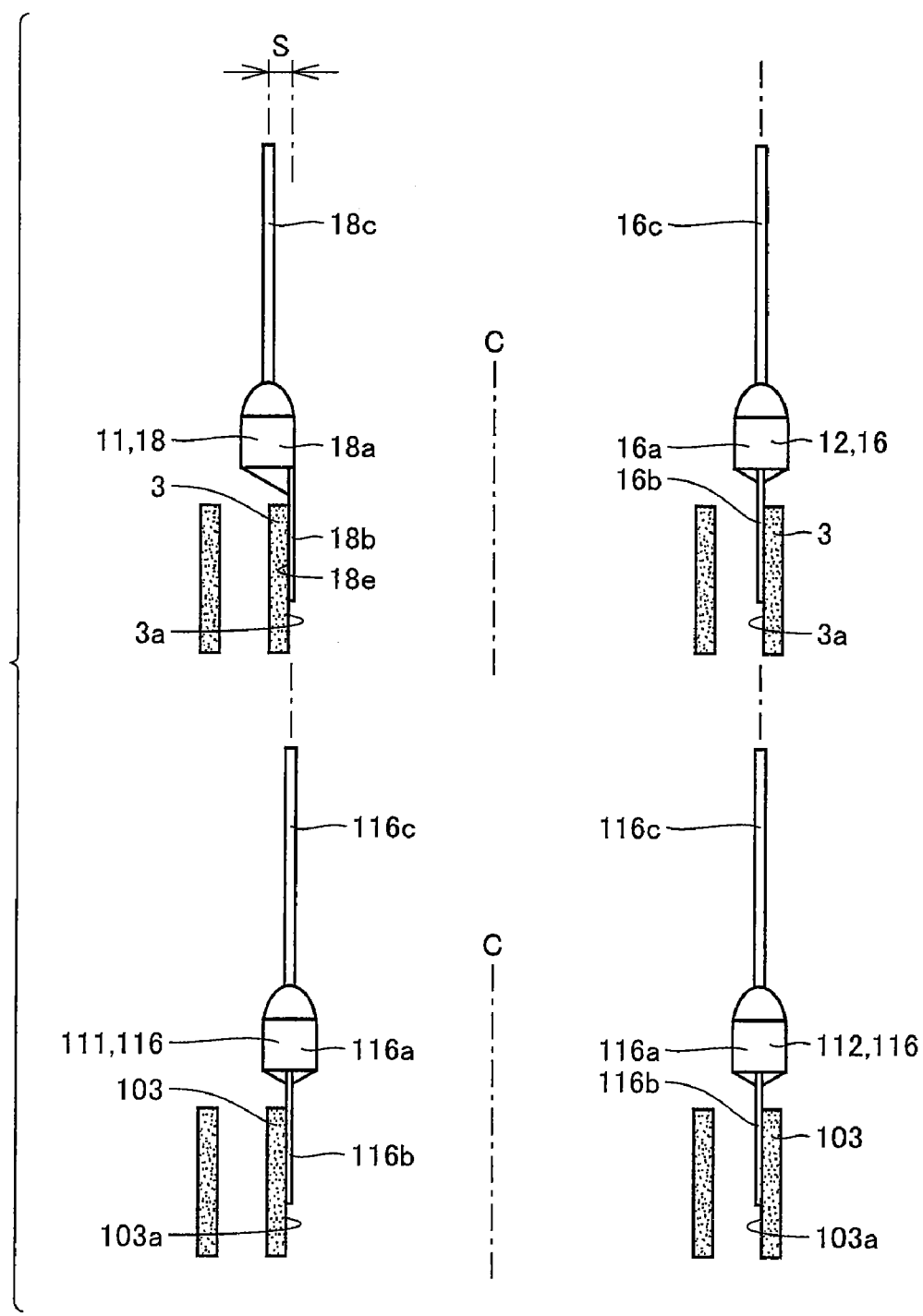
FIG. 15 is a cross-sectional view along the line XV-C-XV shown in FIG. 14 in the second embodiment and a cross-sectional view along that line in an electrolytic capacitor according to a Comparative Example.
Figure 16:
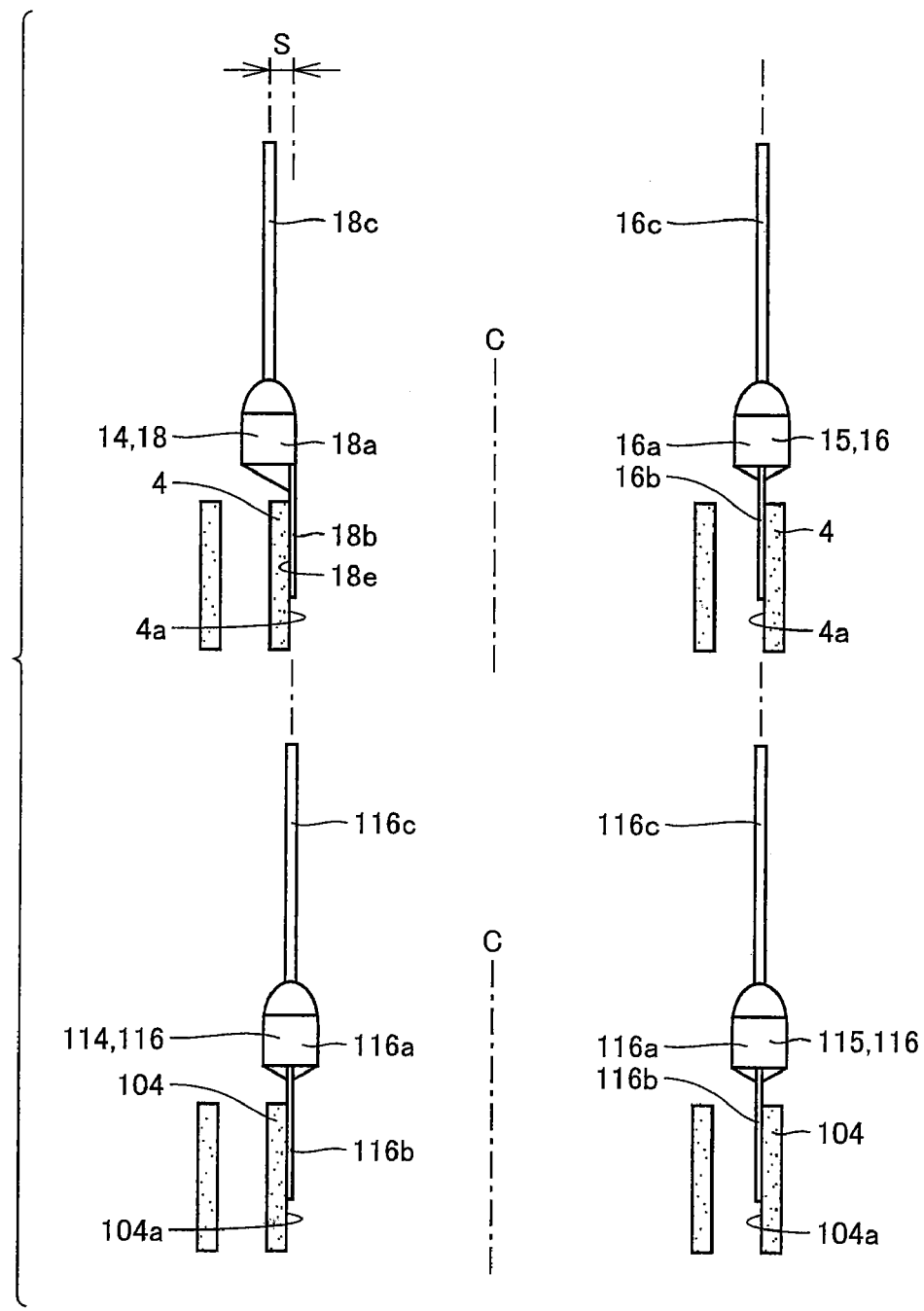
FIG. 16 is a cross-sectional view along the line XVI-C-XVI shown in FIG. 14 in the second embodiment and a cross-sectional view along that line in the electrolytic capacitor according to Comparative Example.

Similarly, regarding the circumferential direction, second cathode lead tab terminal 115 (lead 116*c*) is arranged at a prescribed second position in a circumferential direction with respect to the first position in the circumferential direction where first cathode lead tab terminal 114 (lead 116*c*) is arranged. Regarding the radial direction, however, second cathode lead tab terminal 115 (lead 116c) is arranged on the outer side relative to the position in the radial direction of first cathode lead tab terminal 114 (lead 116c), because anode (cathode) foil 3, 4 and the like are wound up once. FIGS. 15 and 16 show a cross-sectional structure of the electrolytic capacitor according to this Comparative Example in lower portions thereof.

In contrast, in the electrolytic capacitor described above, as shown in upper portions of FIGS. 15 and 16, one-side pressed terminal 18 is applied as first anode (cathode) lead tab terminal 11, 14 and in addition one-side pressed terminal 18 is connected to anode (cathode) foil 3 in such a manner that second connection surface 18e of connection portion 18b is in contact with inner circumferential surface 3a of anode (cathode) foil 3. Therefore, though the position in the radial direction of connection portion 18b is not different from the position in the radial direction of connection portion 116b in a case where both-side pressed terminal 116 is applied, the position in the radial direction of lead 18c (boss portion 18a) is shifted by distance S toward the side opposite to the center C side (outer side) of capacitor element 2 relative to the position in the radial direction of lead 116c (boss portion 116a) in a case where both-side pressed terminal 116 shown in the lower portions of FIGS. 15 and 16 is applied.

Thus, as shown in FIG. 14, the position in the radial direction of lead 18c (boss portion 18a) of one-side pressed terminal 18 serving as first anode (cathode) lead tab terminal 11, 14 is shifted outward to be in registration with the position in the radial direction of lead 16c (boss portion 16a) of both-side pressed terminal 16 serving as second anode (cathode) lead tab terminal 12, 15, so that leads 16c, 18c of first (second) anode (cathode) lead tab terminals 11, 12, 14, 15 can be arranged at positions corresponding to respective vertices of a square.

Consequently, substantially regular pitches between first (second) anode (cathode) lead tab terminals 11, 12, 14, 15 are achieved, ESL is lowered, and lowering in characteristics as the electrolytic capacitor can be suppressed. In addition, leads or boss portions of first (second) anode (cathode) lead tab terminals 11, 12, 14, 15 can readily be inserted in openings 22a in sealing rubber gasket 22 or openings 24a in seat plate 24 and thus productivity can be improved.

Variation

An electrolytic capacitor in which a connection portion of an anode (cathode) lead tab terminal is located on an inner circumferential surface of an anode (a cathode) foil in a state that the anode (cathode) foil and the like are wound up has been described by way of example of an electrolytic capacitor in each embodiment described above. A manner of arrangement of the anode (cathode) lead tab terminal and the anode (cathode) foil is not limited thereto, and an electrolytic capacitor in which a connection portion of an anode (cathode) lead tab terminal is located on an outer circumferential surface of an anode (a cathode) foil in a state that the anode (cathode) foil and the like are wound up is also applicable.

Initially, an electrolytic capacitor in which a both-side pressed terminal is applied as the first anode (cathode) lead tab terminal and a one-side pressed terminal is applied as the second anode (cathode) lead tab terminal will be described. In this case, as shown in upper portions of FIGS. 17 and 18, second connection surface 18e of connection portion 18b of one-side pressed terminal 18 serving as second anode (cathode) lead tab terminal 12, 15 is connected to anode (cathode) foil 3, 4.

Figure 17:
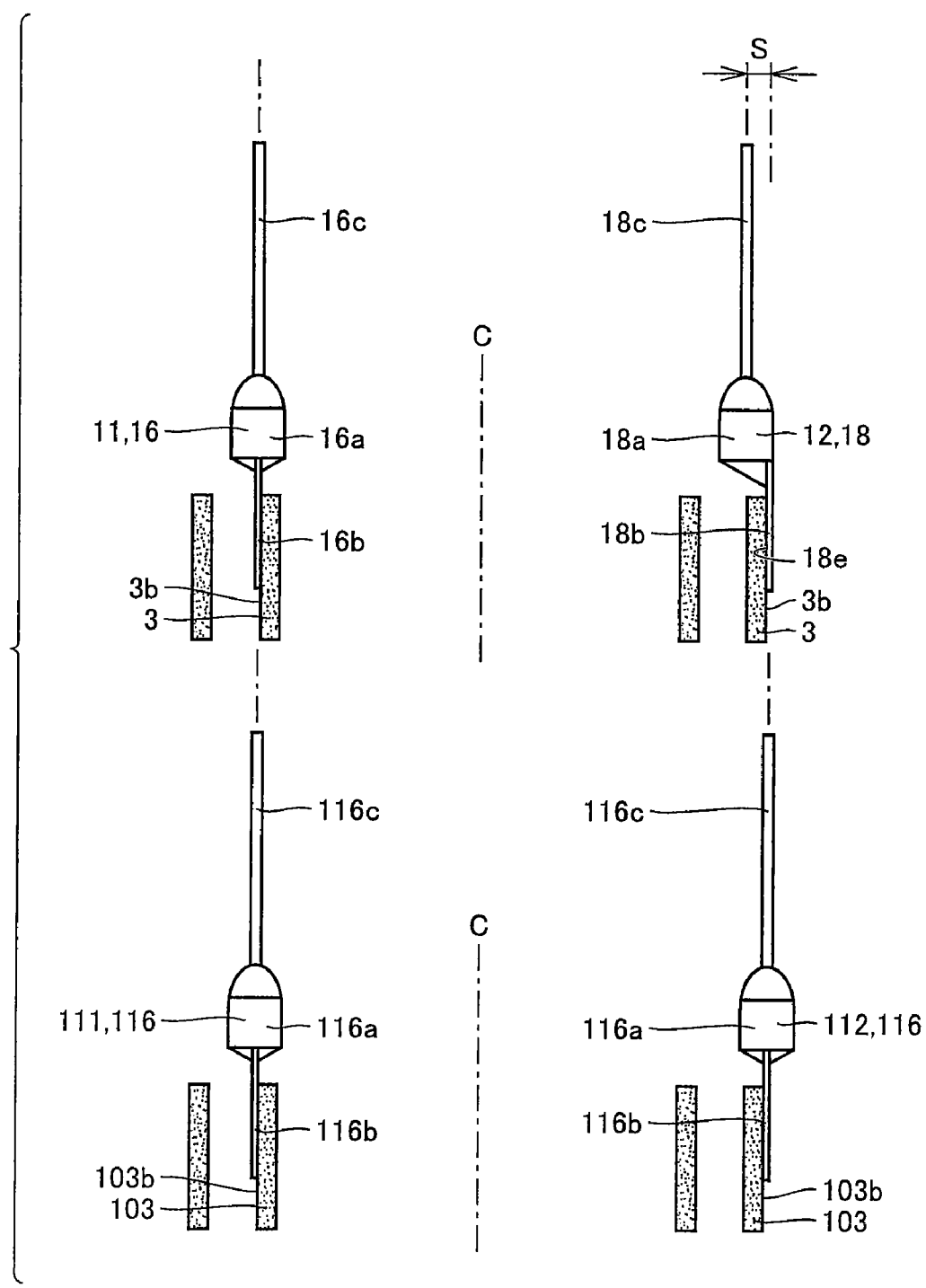
FIG. 17 is a cross-sectional view along the line XI-C-XI shown in FIG. 10 in an electrolytic capacitor according to a variation and a cross-sectional view along that line in an electrolytic capacitor according to a Comparative Example.
Figure 18:
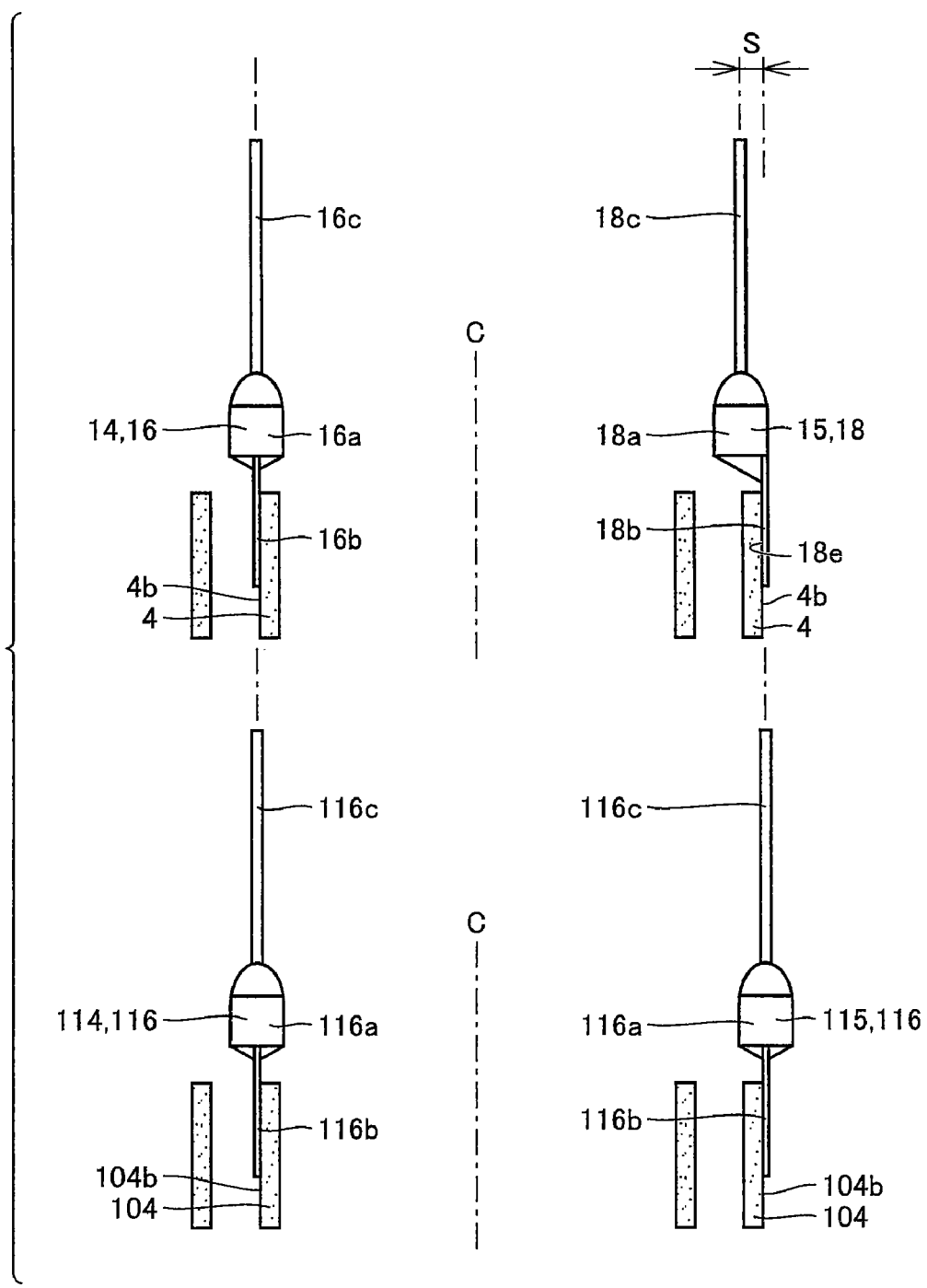
FIG. 18 is a cross-sectional view along the line XII-C-XII shown in FIG. 10 in the electrolytic capacitor according to the variation and a cross-sectional view along that line in the electrolytic capacitor according to a Comparative Example.

Therefore, though the position in the radial direction of connection portion 18b is not different from the position in the radial direction of connection portion 116b in a case where both-side pressed terminal 116 is applied, the position in the radial direction of lead 18c (boss portion 18a) is shifted by distance S toward the inner side relative to the position in the radial direction of lead 116c (boss portion 116a) in a case where both-side pressed terminal 116 shown in the lower portions of FIGS. 17 and 18 is applied.

Thus, the position in the radial direction of lead 18c (boss portion 18a) of one-side pressed terminal 18 serving as second anode (cathode) lead tab terminal 12, 15 is shifted inward to be in registration with the position in the radial direction of lead 16c (boss portion 16a) of both-side pressed terminal 16 serving as first anode (cathode) lead tab terminal 11, 14, so that leads 16c, 18c of first (second) anode (cathode) lead tab terminals 11, 12, 14, 15 can be arranged at positions corresponding to respective vertices of a square (see FIG. 10).

Then, an electrolytic capacitor in which a one-side pressed terminal is applied as the first anode (cathode) lead tab terminal and a both-side pressed terminal is applied as the second anode (cathode) lead tab terminal will be described. In this case, as shown in upper portions of FIGS. 19 and 20, first connection surface 18d of connection portion 18b of one-side pressed terminal 18 serving as first anode (cathode) lead tab terminal 11, 14 is connected to anode (cathode) foil 3, 4.

Figure 19:
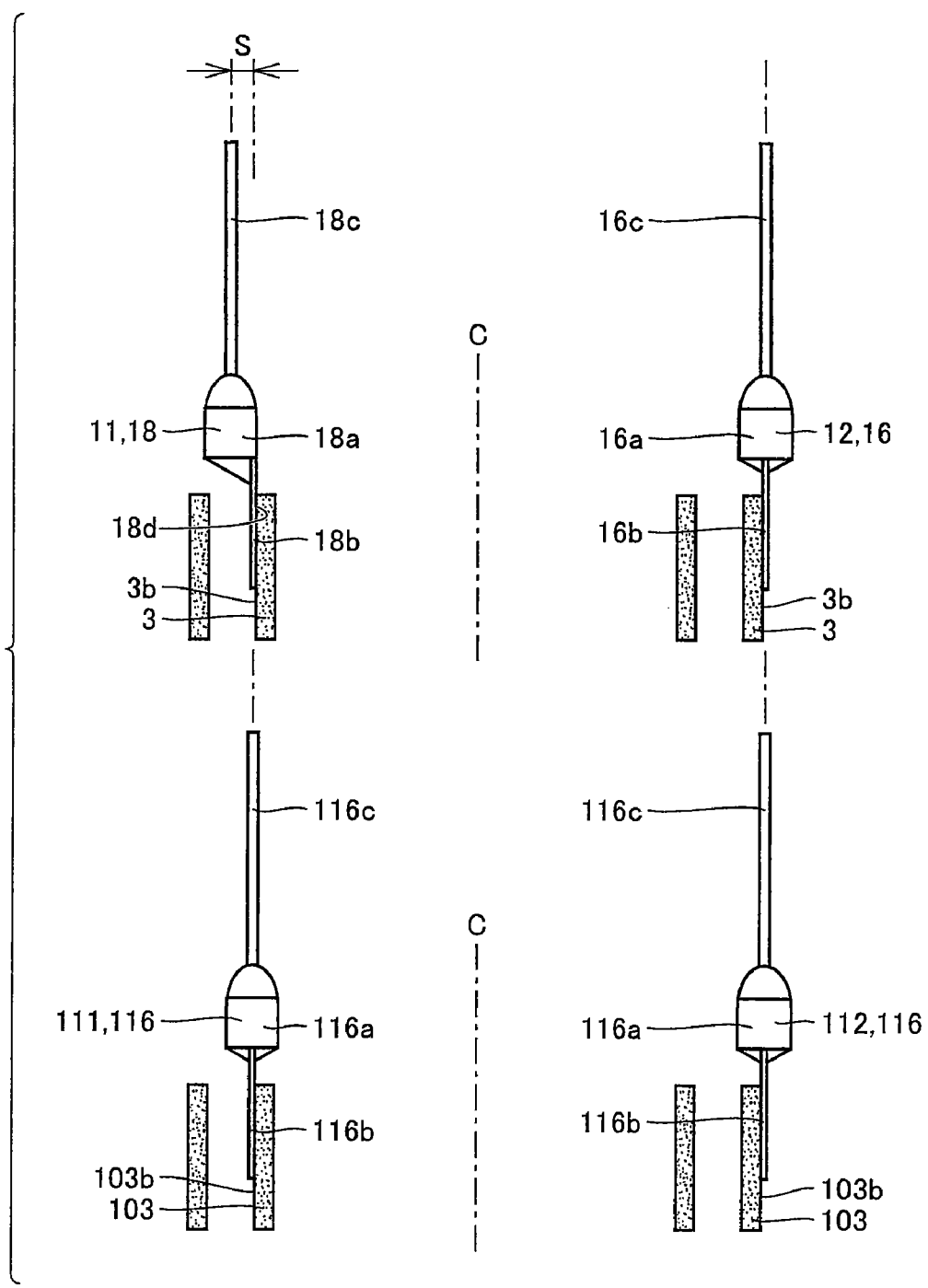
FIG. 19 is a cross-sectional view along the line XV-C-XV shown in FIG. 14 in an electrolytic capacitor according to a variation and a cross-sectional view along that line in an electrolytic capacitor according to a Comparative Example.
Figure 20:
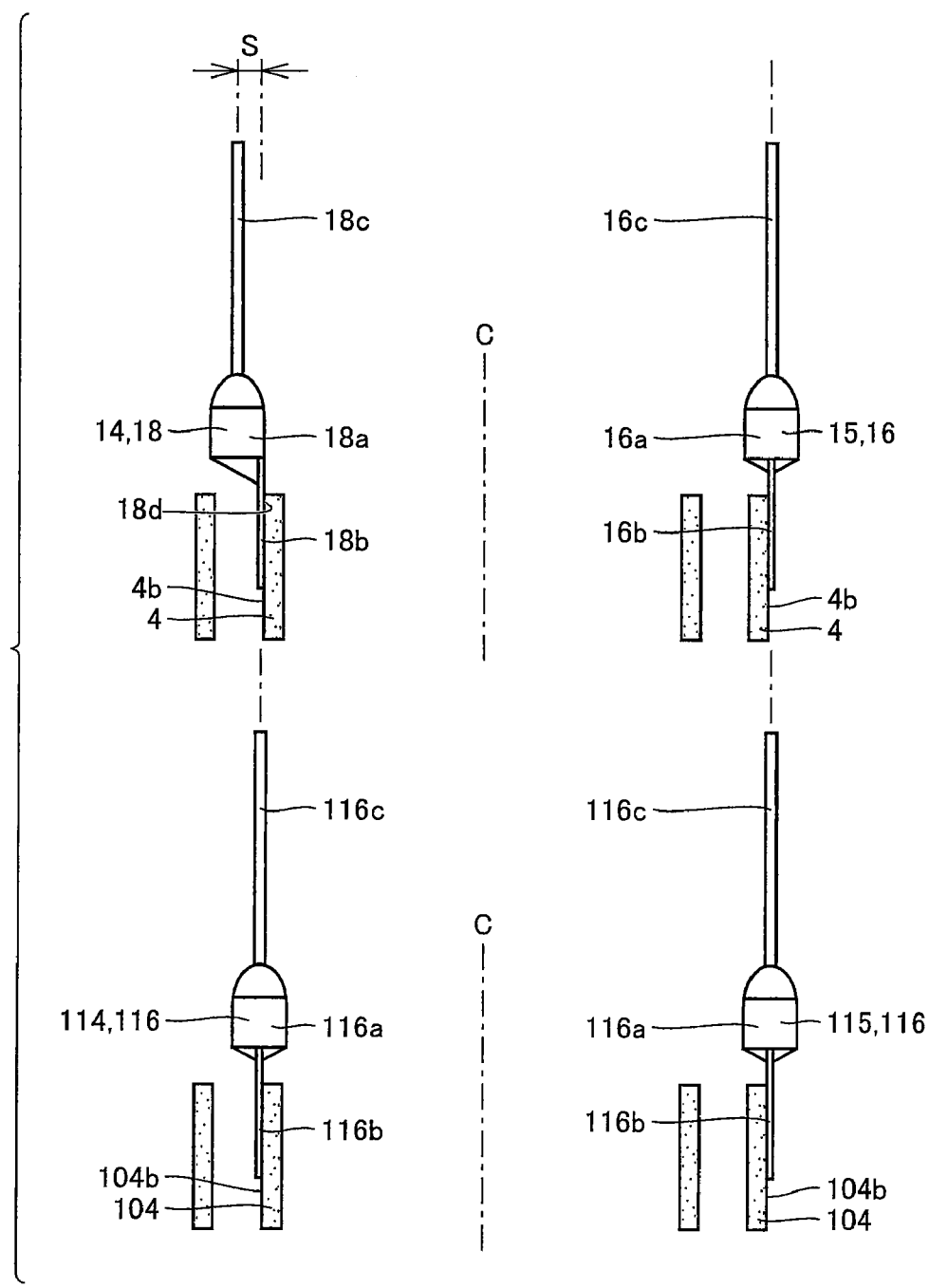
FIG. 20 is a cross-sectional view along the line XVI-C-XVI shown in FIG. 14 in the electrolytic capacitor according to the variation and a cross-sectional view along that line in the electrolytic capacitor according to Comparative Example.

Therefore, though the position in the radial direction of connection portion 18b is not different from the position in the radial direction of connection portion 116b in a case where both-side pressed terminal 116 is applied, the position in the radial direction of lead 18c (boss portion 18a) is shifted by distance S toward the outer side relative to the position in the radial direction of lead 116c (boss portion 116a) in a case where both-side pressed terminal 116 shown in the lower portions of FIGS. 19 and 20 is applied.

Thus, the position in the radial direction of lead 18c (boss portion 18a) of one-side pressed terminal 18 serving as first anode (cathode) lead tab terminal 11, 14 is shifted outward to be in registration with the position in the radial direction of lead 16c (boss portion 16a) of both-side pressed terminal 16 serving as second anode (cathode) lead tab terminal 12, 15, so that leads 16c, 18c of first (second) anode (cathode) lead tab terminals 11, 12, 14, 15 can be arranged at positions corresponding to respective vertices of a square (see FIG. 14).

Consequently, in the electrolytic capacitor in which the connection portion of the anode (cathode) lead tab terminal is located on the outer circumferential surface of the anode (cathode) foil as well, substantially regular pitches between first (second) anode (cathode) lead tab terminals 11, 12, 14, 15 are achieved, ESL is lowered, and lowering in characteristics as the electrolytic capacitor can be suppressed. In addition, leads or boss portions of first (second) anode (cathode) lead tab terminals 11, 12, 14, 15 can readily be inserted in openings 22a in sealing rubber gasket 22 or openings 24a in seat plate 24 and thus productivity can be improved.

In each embodiment described above, regarding a manner of connection of first anode (cathode) lead tab terminal 11, 14 and second anode (cathode) lead tab terminal 12, 15 to anode (cathode) foil 3, 4, a case in which interval P1 (NL) between first anode (cathode) lead tab terminal 11, 14 and second anode (cathode) lead tab terminal 12, 15 is set to an interval between a portion of anode (cathode) foil 3, 4 corresponding to the first (third) position in a circumferential direction in anode (cathode) foil 3, 4 and a portion of anode (cathode) foil 3, 4 corresponding to the second (fourth) position in a circumferential direction after winding up a closest portion of anode (cathode) foil 3, 4 corresponding to the second (fourth) position in the circumferential direction with respect to the first (third) position in the circumferential direction and further winding up anode (cathode) foil 3, 4 again has been described by way of example.

A manner of connection of first anode (cathode) lead tab terminal 11, 14 and second anode (cathode) lead tab terminal 12, 15 to anode (cathode) foil 3, 4 is not limited thereto, and for example, second anode (cathode) lead tab terminal 12, 15 may be connected to a prescribed portion of anode (cathode) foil 3, 4 after winding up the foil by a length shorter than a circumference from a portion of anode (cathode) foil 3, 4 to which first anode (cathode) lead tab terminal 11, 14 is connected. Alternatively, second anode (cathode) lead tab terminal 12, 15 may be connected to a prescribed portion of anode (cathode) foil 3, 4 after winding up the foil by a length longer than a circumference from a portion of anode (cathode) foil 3, 4 to which first anode (cathode) lead tab terminal 11, 14 is connected.

In such a case as well, both-side pressed terminal 16 is applied as first anode (cathode) lead tab terminal 11, 14 and one-side pressed terminal 18 is applied as second anode (cathode) lead tab terminal 12, 15, and second anode (cathode) lead tab terminal 12, 15 arranged radially outward relative to first anode (cathode) lead tab terminal 11, 14 is connected to anode (cathode) foil 3, 4 such that lead 18c thereof is shifted radially inward. Thus, the position in the radial direction of lead 18c of second anode (cathode) lead tab terminal 12, 15 can be in registration with the position in the radial direction of lead 16c of first anode (cathode) lead tab terminal 11, 14. Consequently, registration in manufacturing is further facilitated and characteristics as the electrolytic capacitor can also be maintained.

Meanwhile, one-side pressed terminal 18 is applied as first anode (cathode) lead tab terminal 11, 14 and both-side pressed terminal 16 is applied as second anode (cathode) lead tab terminal 12, 15, and first anode (cathode) lead tab terminal 11, 14 arranged radially inward relative to second anode (cathode) lead tab terminal 12, 15 is connected to anode (cathode) foil 3, 4 such that lead 18c thereof is shifted radially outward. Thus, the position in the radial direction of lead 18c of first anode (cathode) lead tab terminal 11, 14 can be in registration with the position in the radial direction of lead 16c of second anode (cathode) lead tab terminal 12, 15. Consequently, registration in manufacturing is further facilitated and characteristics as the electrolytic capacitor can also be maintained.

Though an electrolytic capacitor including four lead tab terminals has been described in each embodiment by way of example, an electrolytic capacitor in the present invention may include five or more lead tab terminals.

Example I

The inventors fabricated 500 electrolytic capacitors in which a both-side pressed terminal was applied as the first anode (cathode) lead tab terminal and a one-side pressed terminal was applied as the second anode (cathode) lead tab terminal (the first embodiment) and 500 electrolytic capacitors in which a one-side pressed terminal was applied as the first anode (cathode) lead tab terminal and a both-side pressed terminal was applied as the second anode (cathode) lead tab terminal (the second embodiment), and evaluated positions of four completed anode (cathode) lead tab terminals (leads) (arrangement geometry).

It is noted that a specific method of manufacturing an electrolytic capacitor is as described in the first embodiment and the second embodiment above and a diameter was set to 8.0 mm. In addition, 500 electrolytic capacitors in which a both-side pressed terminal was applied as the first (second) anode (cathode) lead tab terminal were fabricated as Comparative Example 1 and positions of four anode (cathode) lead tab terminals (leads) were evaluated.

Regarding the criteria for determining whether a sample is good or defective, an angle of one vertex of a quadrangle formed by connecting to one another, points where leads of four anode (cathode) lead tab terminals are located was measured, and a sample of which angle is within a range of 90±20° was determined as good and a sample otherwise was determined as defective. Table 1 shows the results.

TABLE 1

Table for Comparison of Lead Position Defects Produced

|  | The Number of Defects Produced/Total Number (pieces) |
|---|---|
| Example 1 of the Present Invention | 0/500 |
| Example 2 of the Present Invention | 0/500 |
| Comparative Example 1 | 500/500 |

As shown in Table 1, regarding the electrolytic capacitors according to Comparative Example 1 in all of which the both-side pressed terminal was applied, all of 500 evaluated samples were determined as defective. In contrast, regarding the electrolytic capacitors according to each of the first embodiment and the second embodiment, all of 500 evaluated samples were determined as good. Based on this evaluation result, it was demonstrated that the electrolytic capacitor described above can contribute to lowering in ESL, facilitate registration with a sealing rubber gasket, a seat plate and the like, and improve productivity.

Third Embodiment

Here, an electrolytic capacitor in which a one-side pressed terminal is applied as the first anode (cathode) lead tab terminal and the second anode (cathode) lead tab terminal will be described.

Figure 21:
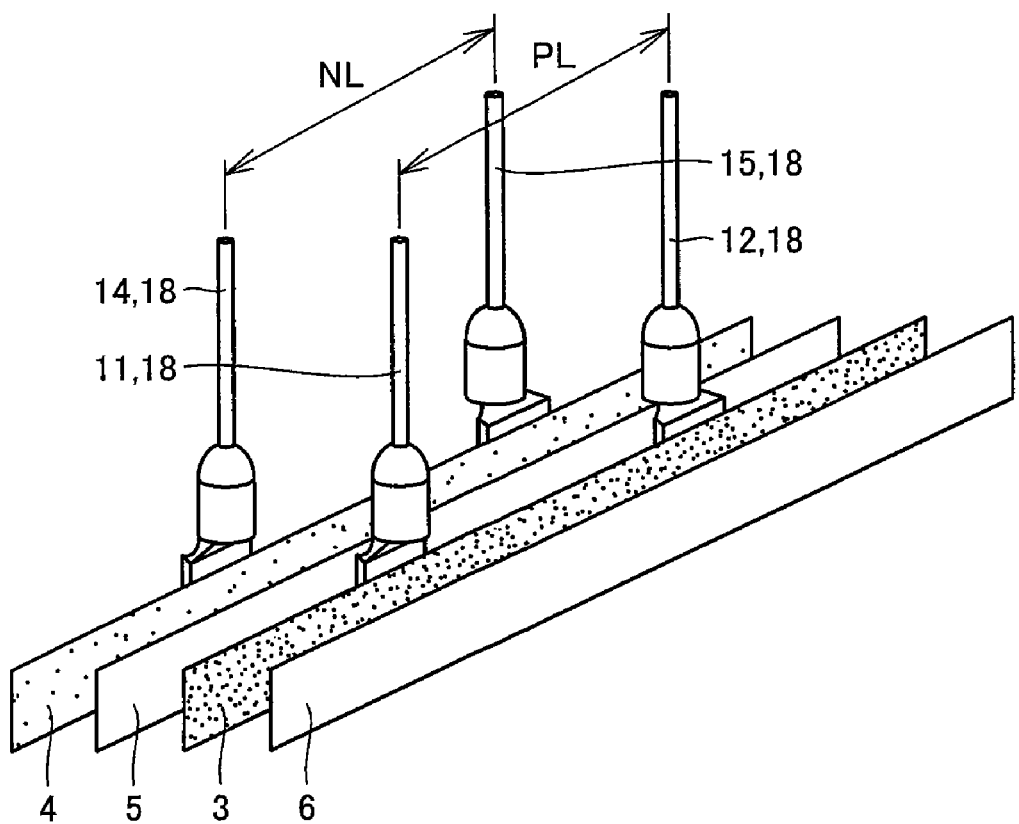
FIG. 21 is a perspective view showing a manner of connection of an anode (a cathode) lead tab terminal to an anode (a cathode) foil and a manner of arrangement of the anode (cathode) foil and a separator in an electrolytic capacitor according to a third embodiment of the present invention.

Initially, as shown in FIG. 21, at prescribed positions in a longitudinal direction of anode foil 3, one-side pressed terminal 18 is connected as first anode lead tab terminal 11 and one-side pressed terminal 18 is connected as second anode lead tab terminal 12. In addition, at prescribed positions in a longitudinal direction of cathode foil 4, one-side pressed terminal 18 is connected as first cathode lead tab terminal 14 and one-side pressed terminal 18 is connected as second cathode lead tab terminal 15.

Here, first anode lead tab terminal 11 is connected to a portion of anode foil 3 arranged at a prescribed distance (a first distance) from the one-end side of anode foil 3 (in the present embodiment, on the left side of anode foil 3 in FIG. 21), at a prescribed first position in a circumferential direction in a wound-up state. In addition, second anode lead tab terminal 12 is connected to a portion of anode foil 3 arranged at a distance greater than the prescribed distance (a second distance) from the one-end side of the anode foil, at a prescribed second position in a circumferential direction with respect to the first position in the circumferential direction in the wound-up state.

Interval PL between first anode lead tab terminal 11 and second anode lead tab terminal 12 is set to an interval between a portion of anode foil 3 corresponding to the first position in the circumferential direction in anode foil 3 and a portion of anode foil 3 corresponding to the second position in the circumferential direction after winding up a closest portion of anode foil 3 corresponding to the second position in the circumferential direction with respect to the first position in the circumferential direction and further winding up anode foil 3 again.

First cathode lead tab terminal 14 is connected to a portion of cathode foil 4 arranged at a prescribed distance (a third distance) from the one-end side of cathode foil 4, at a prescribed third position in a circumferential direction with respect to the first position in the circumferential direction and the second position in the circumferential direction in the wound-up state. In addition, second cathode lead tab terminal 15 is connected to a portion of cathode foil 4 arranged at a distance greater than the prescribed distance (a fourth distance) from the one-end side of the cathode foil, at a prescribed fourth position in a circumferential direction with respect to the third position in the circumferential direction in the wound-up state.

Interval NL between first cathode lead tab terminal 14 and second cathode lead tab terminal 15 is set to an interval between a portion of cathode foil 4 corresponding to the third position in the circumferential direction in cathode foil 4 and a portion of cathode foil 4 corresponding to the fourth position in the circumferential direction after winding up a closest portion of cathode foil 4 corresponding to the fourth position in the circumferential direction with respect to the third position in the circumferential direction and further winding up cathode foil 4 again. Here, the circumferential direction refers to a circumferential direction with the one-end sides of anode foil 3, cathode foil 4 and the like serving as the point of start of winding being defined as a central portion, and the radial direction refers to a direction substantially orthogonal to the circumferential direction from the central portion.

Then, as shown in FIG. 21, anode foil 3 and cathode foil 4 are arranged in such a manner that one sheet of separator paper 5 is sandwiched between anode foil 3 and cathode foil 4 and anode foil 3 is sandwiched between one sheet of separator paper 5 and the other sheet of separator paper 6.

Figure 22:
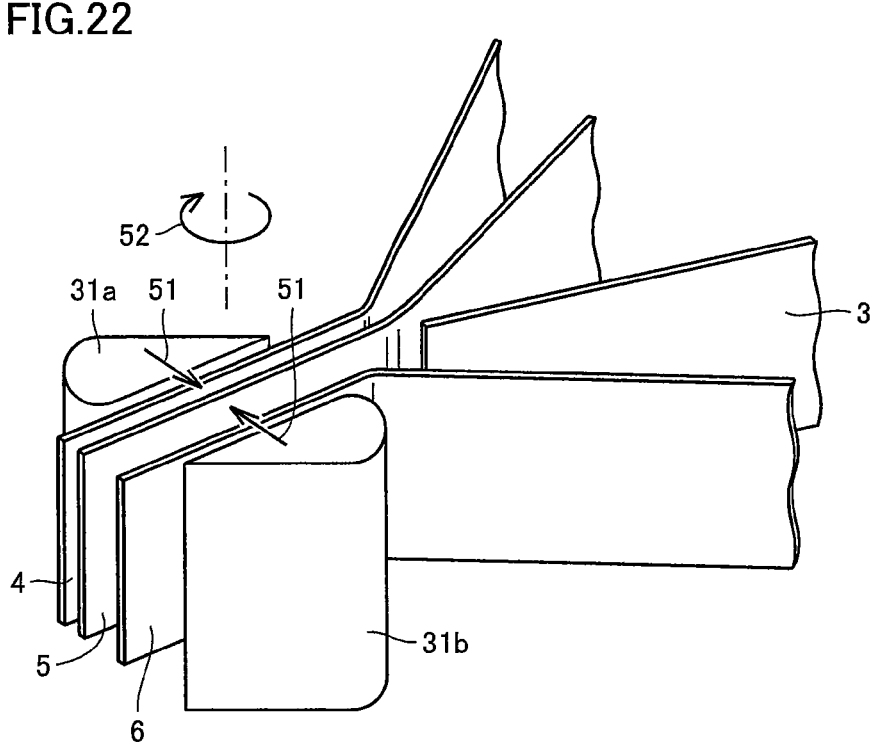
FIG. 22 is a partial perspective view showing one step of a method of manufacturing an electrolytic capacitor in the third embodiment.
Figure 23:
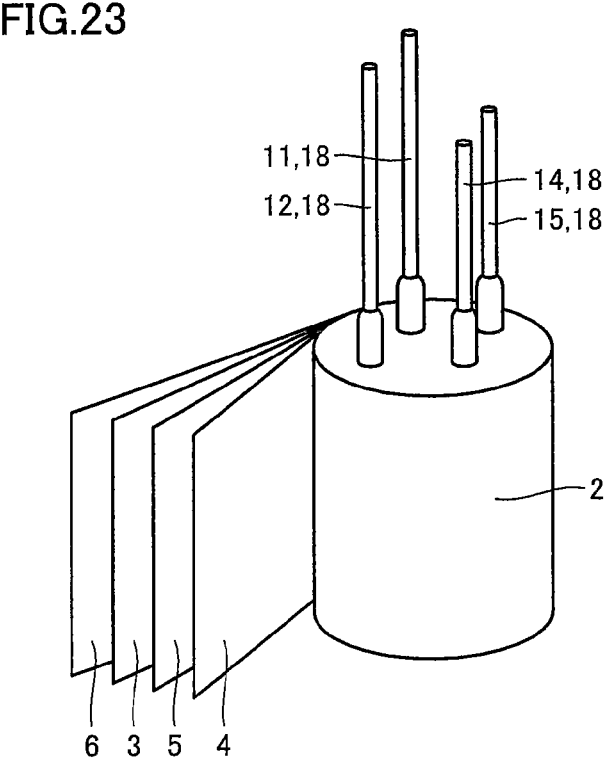
FIG. 23 is a perspective view showing a step performed subsequent to the step shown in FIG. 22 in the third embodiment.

Then, as shown in FIG. 22, one-end sides of arranged anode foil 3, cathode foil 4 and sheets of separator paper 5, 6 are sandwiched between core 31a and core 31b as shown with arrow 51. Then, by turning cores 31a, 31b clockwise as shown with arrow 52 in that state, anode foil 3, cathode foil 4 and the like are wound up from the one-end side in such a manner that first anode (cathode) lead tab terminal 11, 14 and second anode (cathode) lead tab terminal 12, 15 are located on the inner circumferential surface of anode (cathode) foil 3, 4, to thereby form capacitor element 2 as shown in FIG. 23.

Then, a cut surface or the like of the anode foil or the like of capacitor element 2 is subjected to chemical conversion treatment and further to heat treatment at a temperature from 150° C. to 300° C. Then, capacitor element 2 is impregnated with a solution mixture of a monomer forming a conductive polymer through polymerization, such as 3,4-ethylenedioxythiophene, and a ferric p-toluenesulfonate alcohol solution representing an oxidizing agent solution. Thereafter, through thermochemical polymerization, a conductive polymer layer (not shown) is formed between electrodes of capacitor element 2. Other than these materials, a conductive polymer material such as polypyrrole, polyfuran or polyaniline, or TCNQ complex salt (7,7,8,8-tetracyanoquinodimethane) may be used as an electrolyte.

Figure 24:
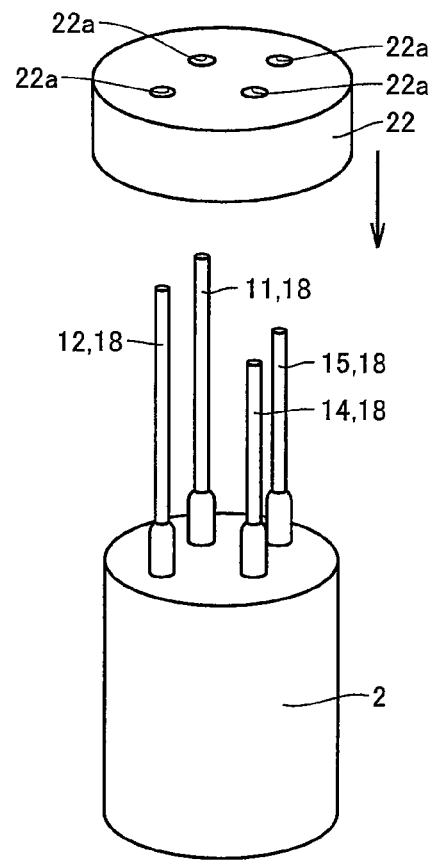
FIG. 24 is a perspective view showing a step performed subsequent to the step shown in FIG. 23 in the third embodiment.

Then, as shown in FIG. 24, sealing rubber gasket 22 is attached to capacitor element 2. In sealing rubber gasket 22, four openings 22a are formed at prescribed positions corresponding to first anode (cathode) lead tab terminals 11, 14 and second anode (cathode) lead tab terminals 12, 15 respectively.

Figure 25:
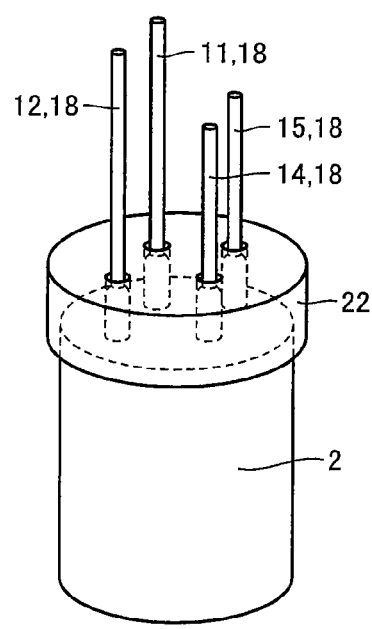
FIG. 25 is a perspective view showing a step performed subsequent to the step shown in FIG. 24 in the third embodiment.

As shown in FIG. 25, sealing rubber gasket 22 is attached to capacitor element 2 by inserting leads 18c and boss portions 18a of first (second) anode (cathode) lead tab terminals 11, 12, 14, 15 in corresponding openings 22a respectively.

Then, capacitor element 2 to which sealing rubber gasket 22 is attached is accommodated in aluminum case 20 with a bottom (see FIG. 26) having a prescribed size. Then, an open-end side of aluminum case 20 is sealed by pressing in a lateral direction and curling and prescribed aging treatment is performed. Then, seat plate 24 made of plastic is attached to a curled surface of aluminum case 20.

Figure 26:
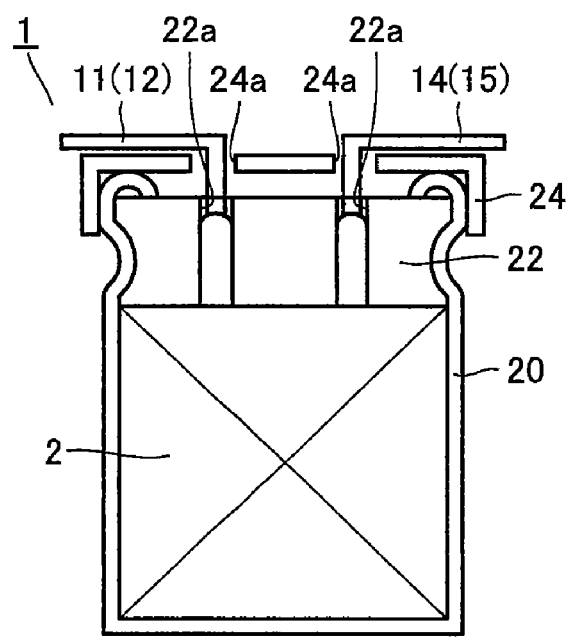
FIG. 26 is a cross-sectional view showing a step performed subsequent to the step shown in FIG. 25 in the third embodiment.
Figure 27:
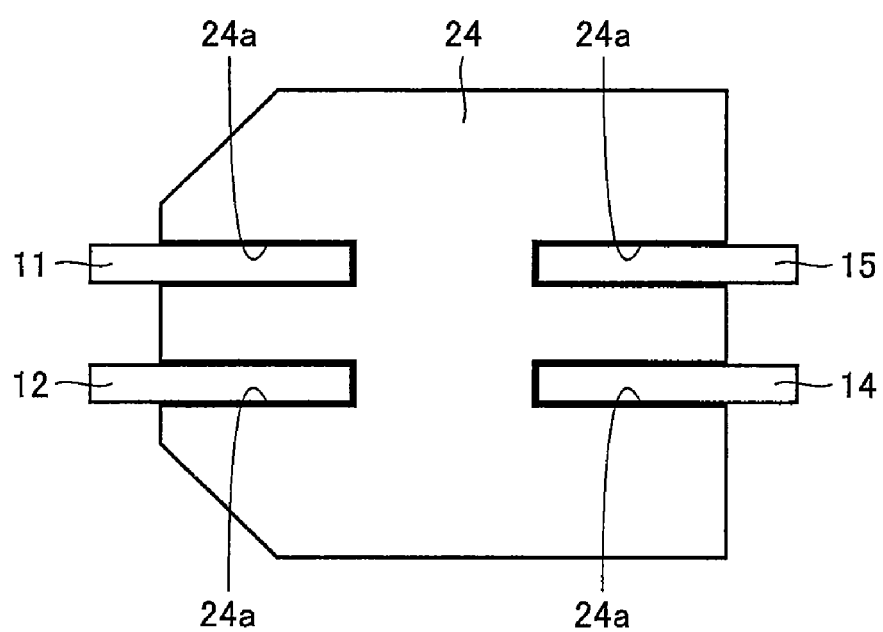
FIG. 27 is a top view in the step shown in FIG. 26 in the third embodiment.

As shown in FIG. 27, four openings 24a corresponding to positions of respective first (second) anode (cathode) lead tab terminals 11, 12, 14, 15 are formed in seat plate 24. Seat plate 24 is attached to capacitor element 2 by inserting leads 18c of first (second) anode (cathode) lead tab terminals 11, 12, 14, 15 in corresponding openings 24a. Thereafter, as shown in FIGS. 26 and 27, each lead 18c protruding through opening 24a in seat plate 24 and serving as an electrode terminal is pressed and bent, to thereby complete electrolytic capacitor 1 having a four-terminal structure.

In the electrolytic capacitor described above, one-side pressed terminal 18 is applied as first anode (cathode) lead tab terminal 11, 14 and the position in the radial direction of lead 18c thereof is shifted outward and one-side pressed terminal 18 is applied as second anode (cathode) lead tab terminal 12, 15 and the position in the radial direction of lead 18c thereof is shifted inward, so that the position in the radial direction of lead 18c of first anode (cathode) lead tab terminal 11, 14 can be in registration with the position in the radial direction of lead 18c of second anode (cathode) lead tab terminal 12, 15, which will now be described.

Figure 28:
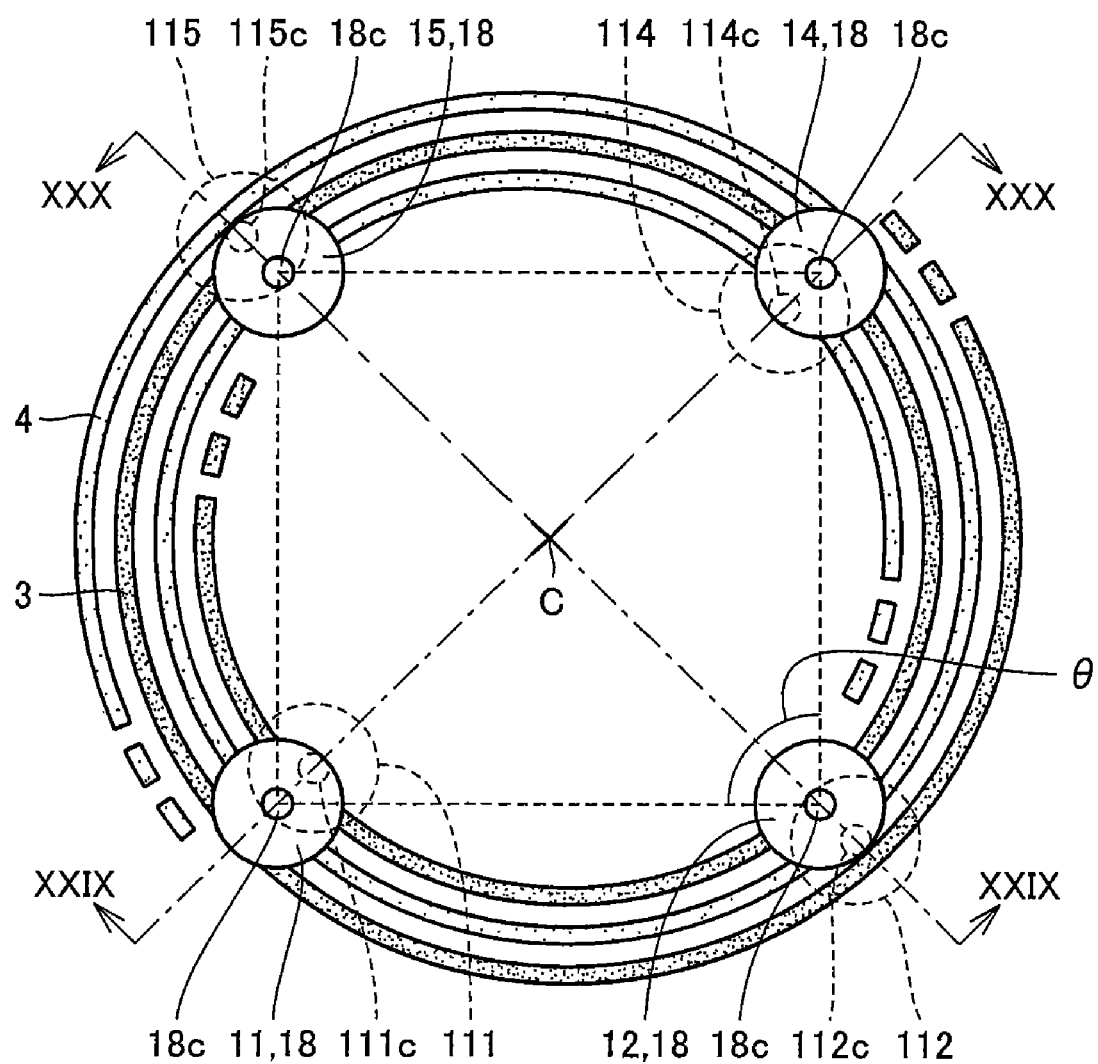
FIG. 28 is a plan view showing arrangement relation of anode (cathode) lead tab terminals in the third embodiment.
Figure 53:
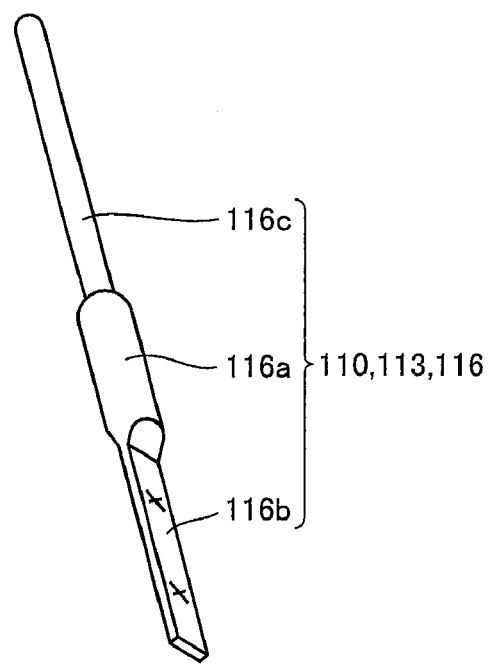
FIG. 53 is a perspective view showing a both-side pressed terminal.
Figure 54:
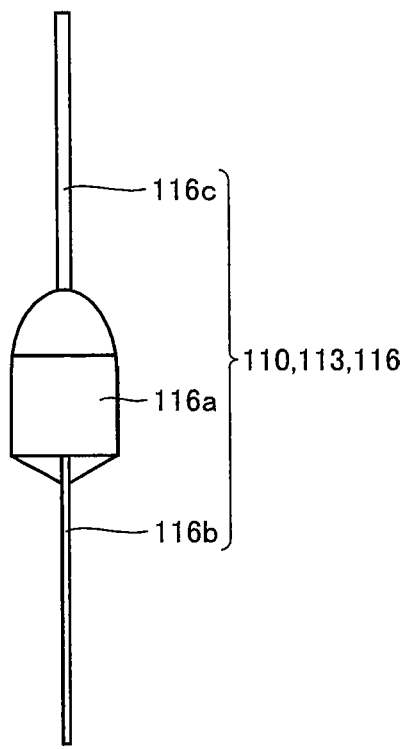
FIG. 54 is a side view showing the both-side pressed terminal.
Figure 55:
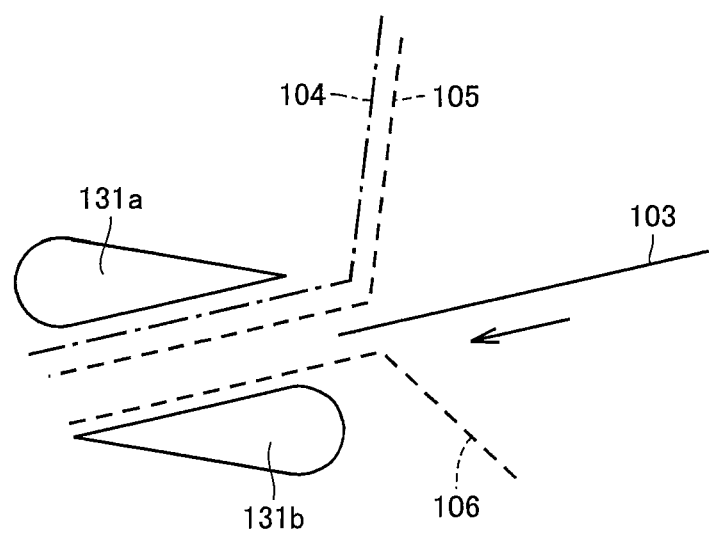
FIG. 55 is a partial perspective view showing one step of a method of manufacturing an electrolytic capacitor according to the first conventional technique.
Figure 56:
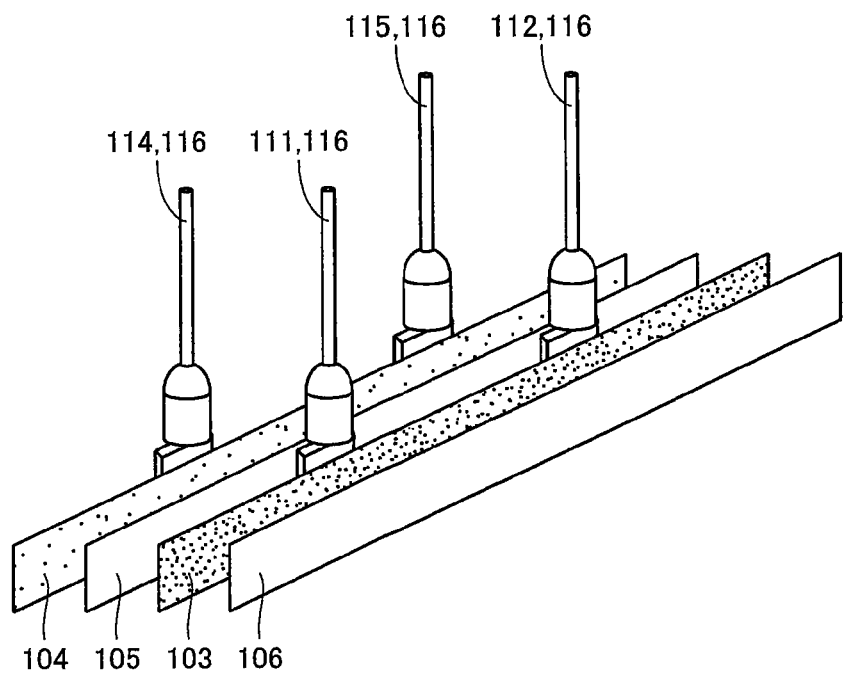
FIG. 56 is a perspective view showing one step of a method of manufacturing an electrolytic capacitor according to a second conventional technique.
Figure 57:
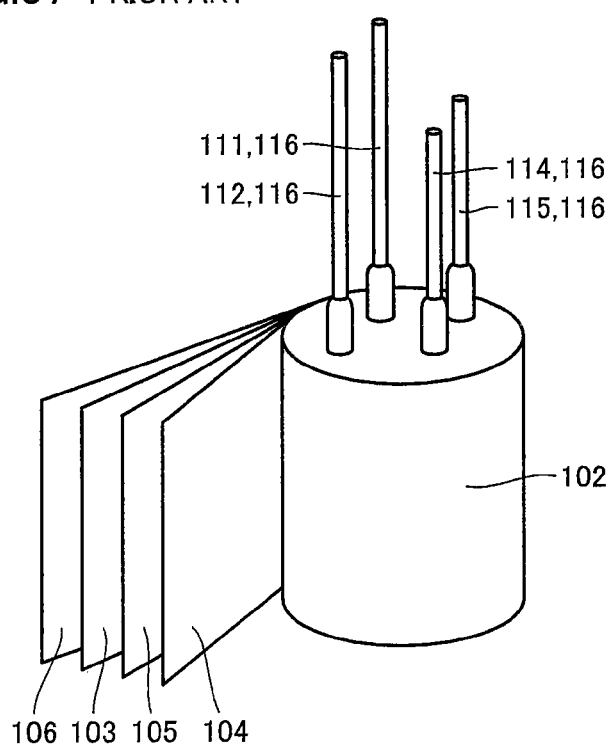
FIG. 57 is a cross-sectional view showing a step performed subsequent to the step shown in FIG. 56.
Figure 58:
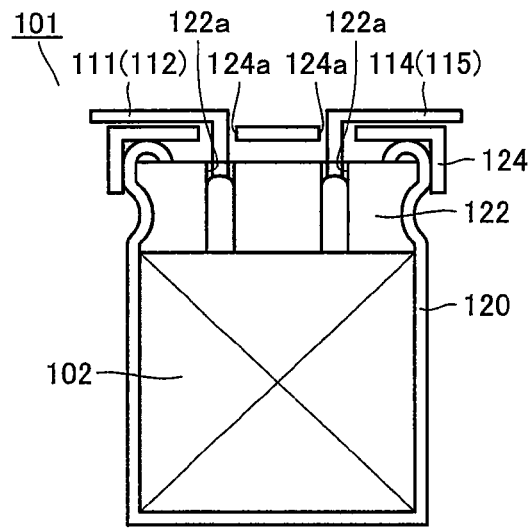
FIG. 58 is a cross-sectional view showing a step performed subsequent to the step shown in FIG. 57.
Figure 59:
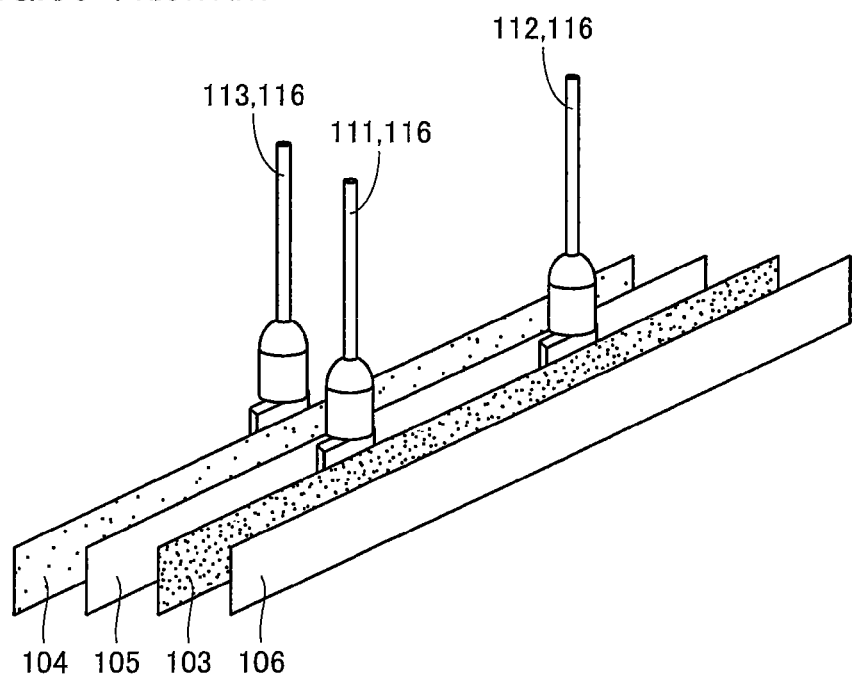
FIG. 59 is a perspective view showing one step of a method of manufacturing an electrolytic capacitor according to the second conventional technique.
Figure 60:
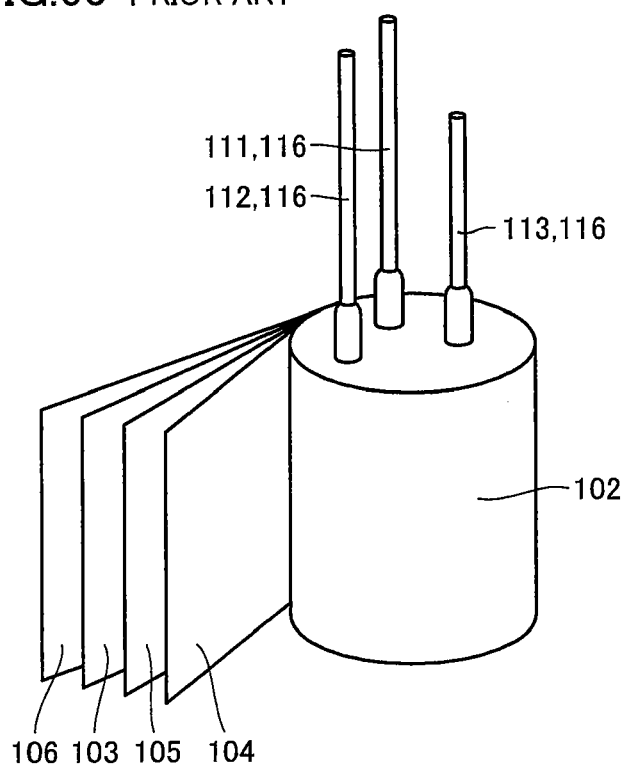
FIG. 60 is a perspective view showing a step performed subsequent to the step shown in FIG. 59.
Figure 61:
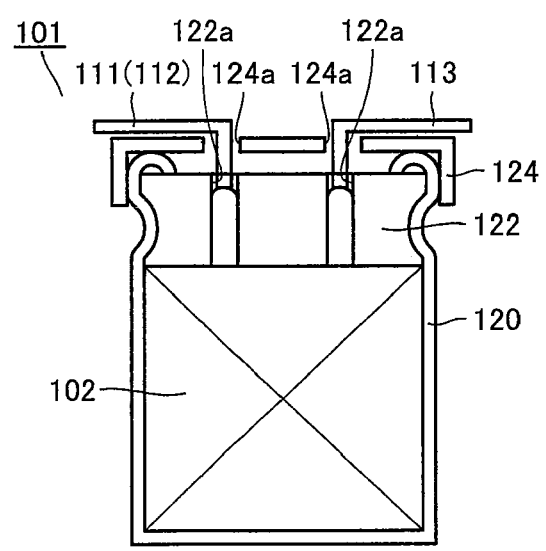
FIG. 61 is a cross-sectional view showing a step performed subsequent to the step shown in FIG. 60.
Figure 62:
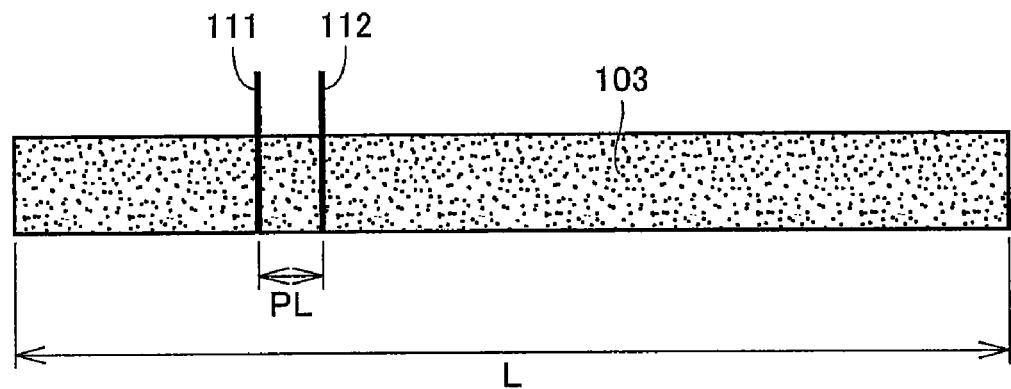
FIG. 62 is a side view showing a first example of a manner of connection of an anode lead tab terminal to an anode foil.
Figure 63:
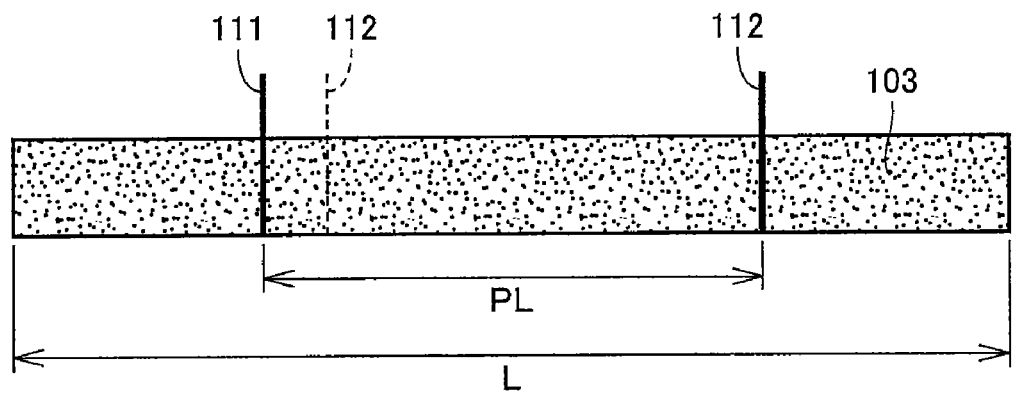
FIG. 63 is a side view showing a second example of a manner of connection of an anode lead tab terminal to an anode foil.
Figure 64:
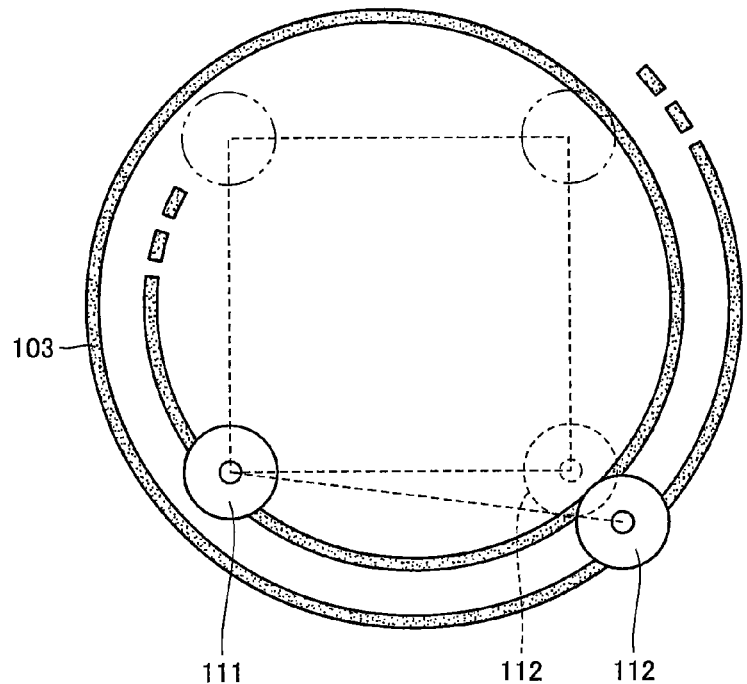
FIGS. 64 and 65 are plan views showing arrangement relation of anode lead tab terminals for illustrating a problem of a conventional electrolytic capacitor.
Figure 65:
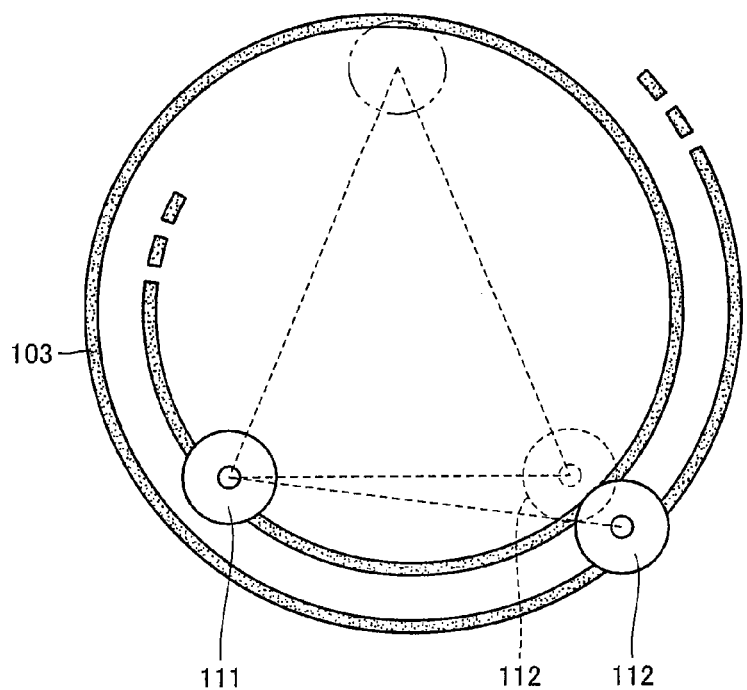

Initially, in a Comparative Example where a both-side pressed terminal shown in FIGS. 53 and 54 is applied as the first anode (cathode) lead tab terminal and the second anode (cathode) lead tab terminal, as shown in FIG. 28, regarding the circumferential direction, second anode lead tab terminal 112 (lead 116c) is arranged at a prescribed second position in a circumferential direction with respect to the first position in the circumferential direction where first anode lead tab terminal 111 (lead 116c) is arranged. Regarding the radial direction, however, second anode lead tab terminal 112 (lead 116c) is arranged on the outer side relative to the position in the radial direction of first anode lead tab terminal 111 (lead 116c), because anode (cathode) foils 3, 4 are wound up once. In FIG. 28 and the like, one-end sides of anode foil 3, cathode foil 4 and the like serving as the point of start of winding are shown as central portion C.

Figure 29:
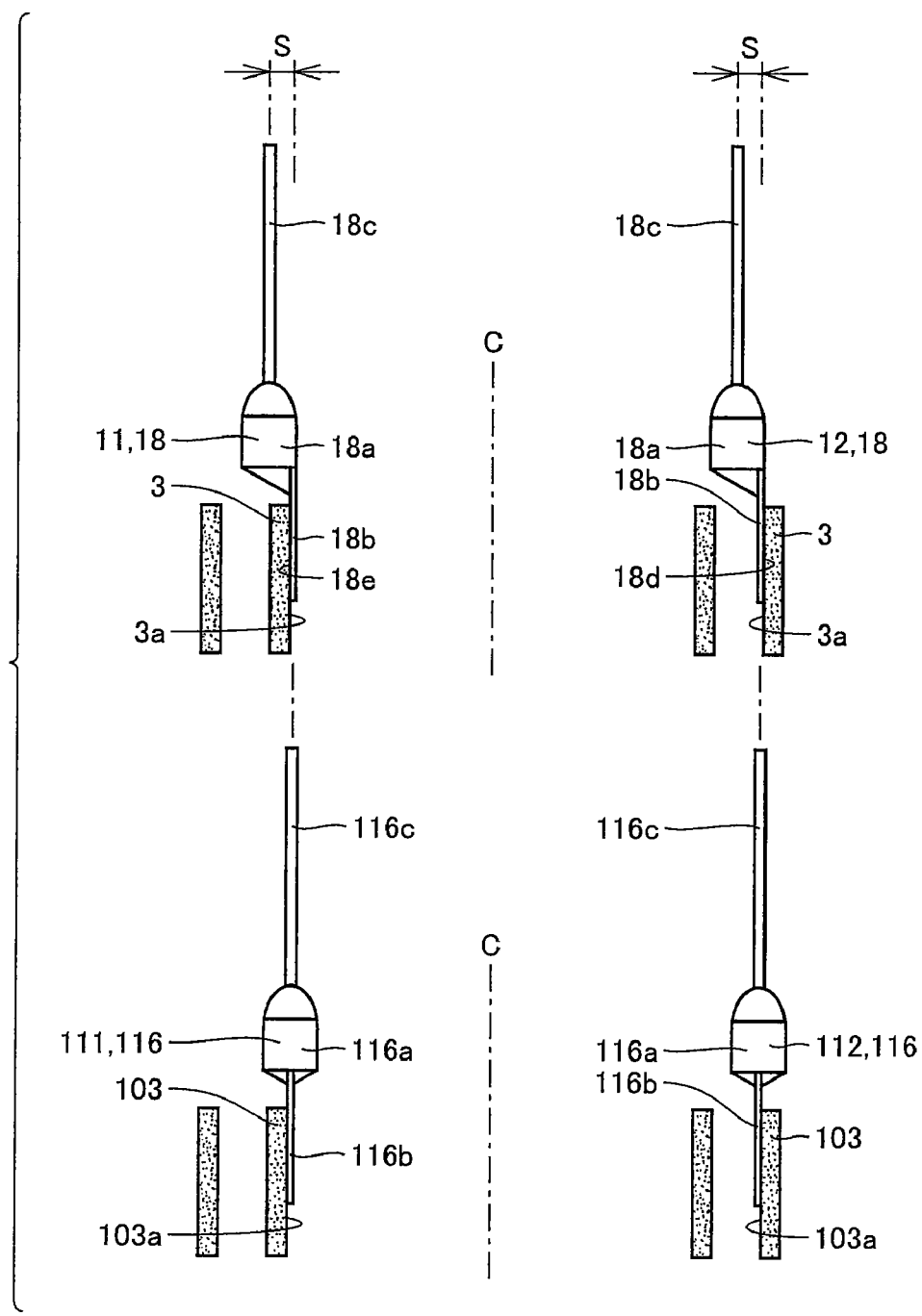
FIG. 29 is a cross-sectional view along the line XXIX-C-XXIX shown in FIG. 28 in the third embodiment and a cross-sectional view along that line in an electrolytic capacitor according to a Comparative Example.
Figure 30:
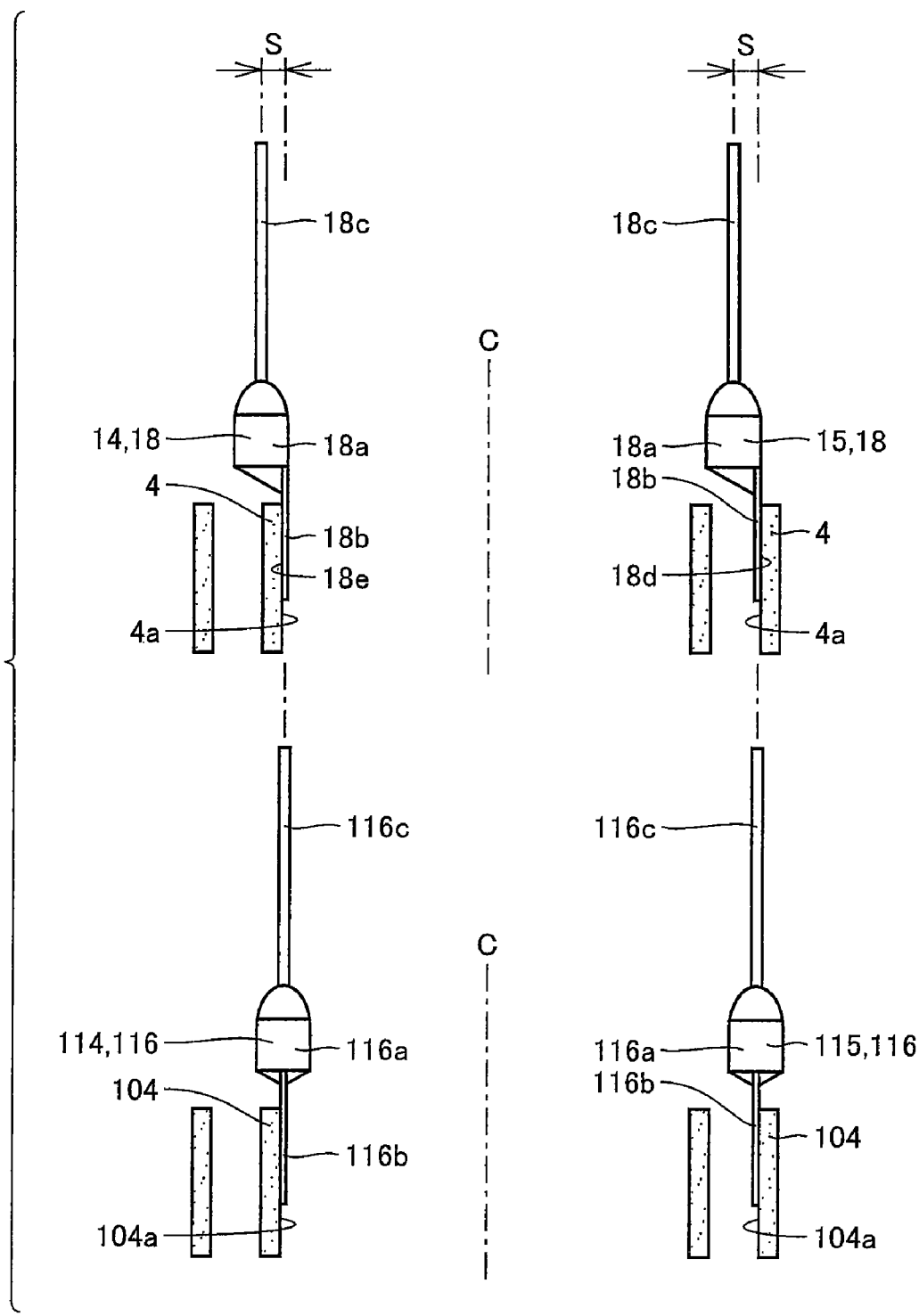
FIG. 30 is a cross-sectional view along the line XXX-C-XXX shown in FIG. 28 in the third embodiment and a cross-sectional view along that line in the electrolytic capacitor according to Comparative Example.

Similarly, regarding the circumferential direction, second cathode lead tab terminal 115 (lead 116c) is arranged at a prescribed fourth position in a circumferential direction with respect to the third position in the circumferential direction where first cathode lead tab terminal 114 (lead 116c) is arranged. Regarding the radial direction, however, second cathode lead tab terminal 115 (lead 116c) is arranged on the outer side relative to the position in the radial direction of first cathode lead tab terminal 114 (lead 116c), because anode (cathode) foil 3, 4 and the like are wound up once. FIGS. 29 and 30 show a cross-sectional structure of the electrolytic capacitor according to this Comparative Example in lower portions thereof.

In contrast, in the electrolytic capacitor described above, as shown in upper portions of FIGS. 29 and 30, one-side pressed terminal 18 is applied as first anode (cathode) lead tab terminal 11 and in addition one-side pressed terminal 18 is connected to anode (cathode) foil 3 in such a manner that second connection surface 18e of connection portion 18b is in contact with inner circumferential surface 3a of anode (cathode) foil 3. Therefore, though the position in the radial direction of connection portion 18b is not different from the position in the radial direction of connection portion 116b in a case where both-side pressed terminal 116 is applied, the position in the radial direction of lead 18c (boss portion 18a) is shifted by distance S toward the side opposite to the center (start of winding of anode foil 3 and the like) C side (outer side) of capacitor element 2 relative to the position in the radial direction of lead 116c (boss portion 116a) in a case where both-side pressed terminal 116 shown in the lower portions of FIGS. 29 and 30 is applied.

In addition, one-side pressed terminal 18 is applied as second anode (cathode) lead tab terminal 12, 15 and moreover one-side pressed terminal 18 is connected to anode (cathode) foil 3, 4 in such a manner that first connection surface 18d of connection portion 18b is in contact with inner circumferential surface 3a, 4a of anode (cathode) foil 3, 4. Therefore, though the position in the radial direction of connection portion 18b is not different from the position in the radial direction of connection portion 116b in a case where both-side pressed terminal 116 is applied, the position in the radial direction of lead 18c (boss portion 18a) is shifted by distance S toward the center (start of winding of anode foil 3 or the like) C side (inner side) of capacitor element 2 relative to the position in the radial direction of lead 116c (boss portion 116a) in a case where both-side pressed terminal 116 shown in the lower portions of FIGS. 29 and 30 is applied.

Thus, as shown in FIG. 28, the position in the radial direction of lead 18c (boss portion 18a) of one-side pressed terminal 18 serving as first anode (cathode) lead tab terminal 11, 14 is shifted outward and the position in the radial direction of lead 18c (boss portion 18a) of one-side pressed terminal 18 serving as second anode (cathode) lead tab terminal 12, 15 is shifted inward. Therefore, the position in the radial direction of lead 18c (boss portion 18a) of one-side pressed terminal 18 serving as first anode (cathode) lead tab terminal 11, 14 is in registration with the position in the radial direction of lead 18c (boss portion 18a) of one-side pressed terminal 18 serving as second anode (cathode) lead tab terminal 12, 15, so that leads 18c of first (second) anode (cathode) lead tab terminals 11, 12, 14, 15 can be arranged at positions corresponding to respective vertices of a square. Though a two-dimensional arrangement pattern of leads 18c is not limited to a square, an angle θ formed by one vertex is preferably in a range from 70 to 110° and more preferably around 90°. It is noted that the two-dimensional arrangement pattern refers to an arrangement pattern of leads in electrolytic capacitor 1 when a side from which first (second) anode (cathode) lead tab terminals 11, 12, 14, 15 protrude is two-dimensionally viewed.

Consequently, substantially regular pitches between first (second) anode (cathode) lead tab terminals 11, 12, 14, 15 are achieved, ESL is lowered, and lowering in characteristics as the electrolytic capacitor can be suppressed. In addition, leads or boss portions of first (second) anode (cathode) lead tab terminals 11, 12, 14, 15 can readily be inserted in openings 22a in sealing rubber gasket 22 or openings 24a in seat plate 24 and thus productivity can be improved.

(Variation)

An electrolytic capacitor in which a connection portion of an anode (cathode) lead tab terminal is located on the inner circumferential surface of the anode (cathode) foil in a state that the anode (cathode) foil and the like are wound up has been described by way of example of an electrolytic capacitor in the embodiment described above. A manner of arrangement of the anode (cathode) lead tab terminal and the anode (cathode) foil is not limited thereto, and an electrolytic capacitor shown in FIG. 31 in which a connection portion of an anode (cathode) lead tab terminal is located on an outer circumferential surface of an anode (cathode) foil in a state that the anode (cathode) foil and the like are wound up is also applicable.

Figure 32:
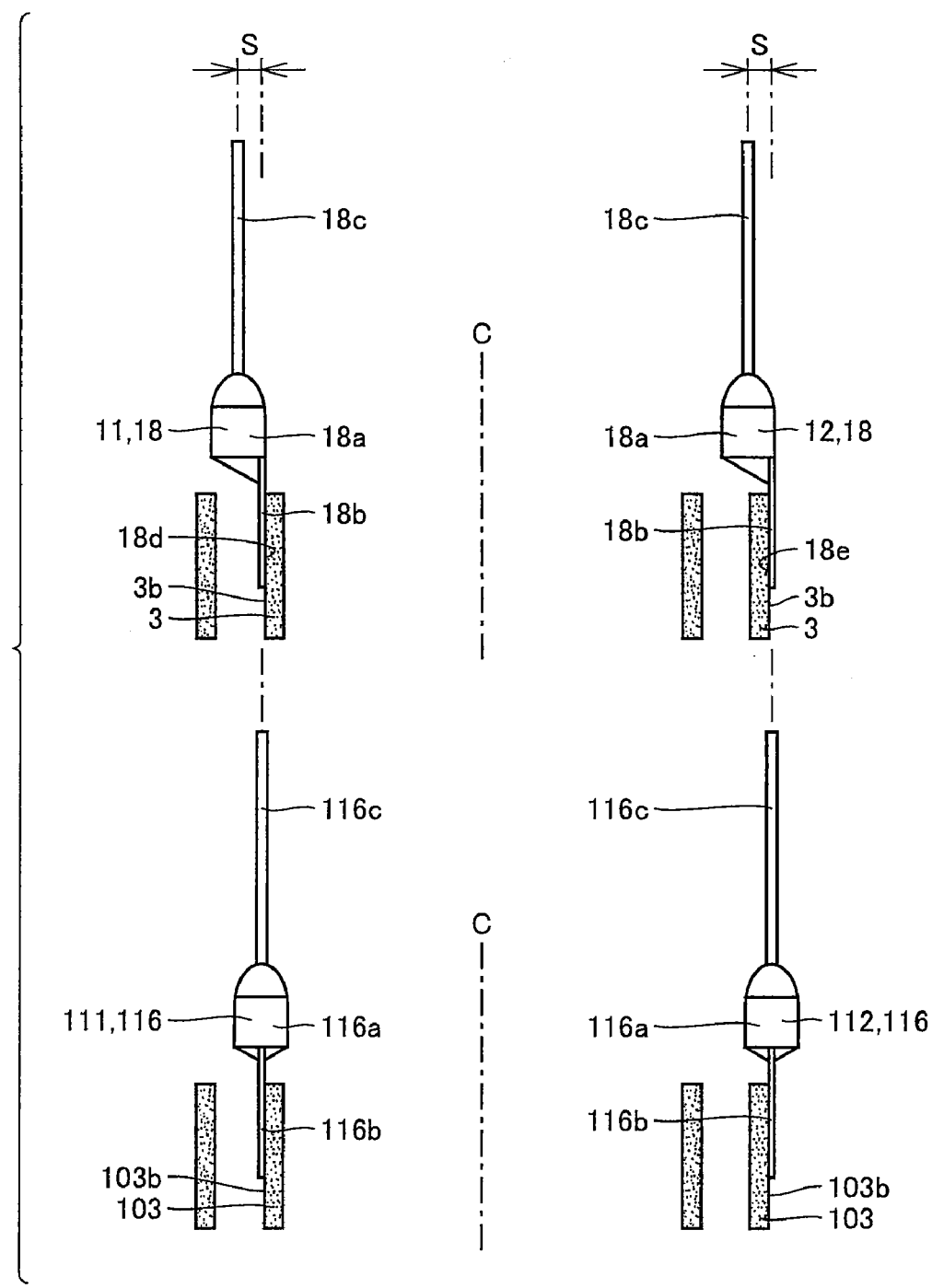
FIG. 32 is a cross-sectional view along the line XXXII-C-XXXII shown in FIG. 31 in the electrolytic capacitor according to the variation and a cross-sectional view along that line in an electrolytic capacitor according to a Comparative Example.
Figure 33:
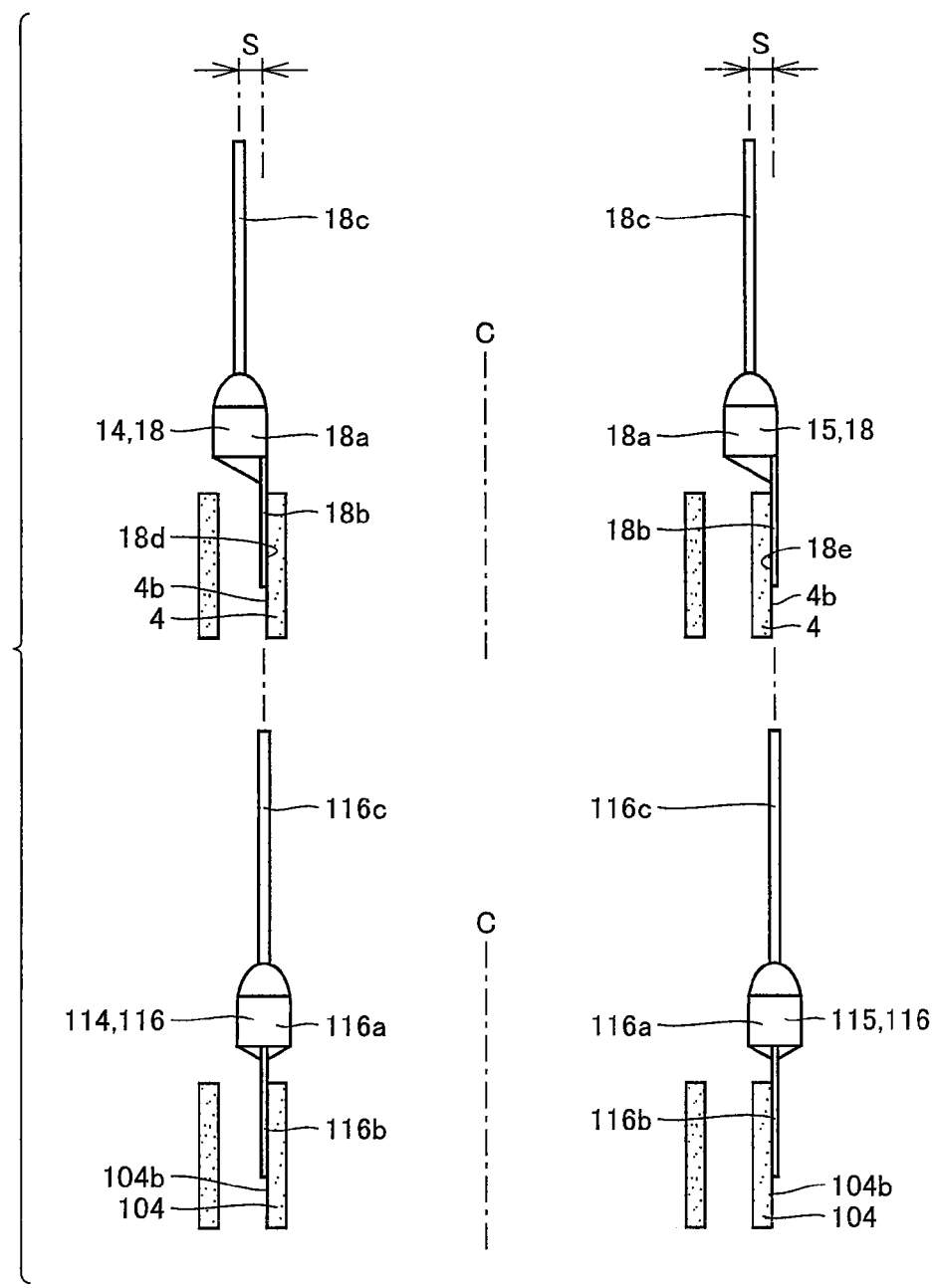
FIG. 33 is a cross-sectional view along the line XXXIII-C-XXXIII shown in FIG. 31 in the electrolytic capacitor according to the variation and a cross-sectional view along that line in the electrolytic capacitor according to Comparative Example.

Specifically, as shown in upper portions of FIGS. 32 and 33, first connection surface 18d of connection portion 18b of one-side pressed terminal 18 serving as first anode (cathode) lead tab terminal 11, 14 is connected to an outer circumferential surface 3b, 4b of anode (cathode) foil 3, 4.

Therefore, though the position in the radial direction of connection portion 18b is not different from the position in the radial direction of connection portion 116b in a case where both-side pressed terminal 116 is applied, the position in the radial direction of lead 18c (boss portion 18a) is shifted by distance S outward relative to the position in the radial direction of lead 116c (boss portion 116a) in a case where both-side pressed terminal 116 shown in the lower portions of FIGS. 32 and 33 is applied.

In addition, as shown in upper portions of FIGS. 32 and 33, second connection surface 18e of connection portion 18b of one-side pressed terminal 18 serving as second anode (cathode) lead tab terminal 12, 15 is connected to outer circumferential surface 3b, 4b of anode (cathode) foil 3, 4.

Therefore, though the position in the radial direction of connection portion 18b is not different from the position in the radial direction of connection portion 116b in a case where both-side pressed terminal 116 is applied, the position in the radial direction of lead 18c (boss portion 18a) is shifted by distance S inward relative to the position in the radial direction of lead 116c (boss portion 116a) in a case where both-side pressed terminal 116 shown in the lower portions of FIGS. 32 and 33 is applied.

Figure 31:
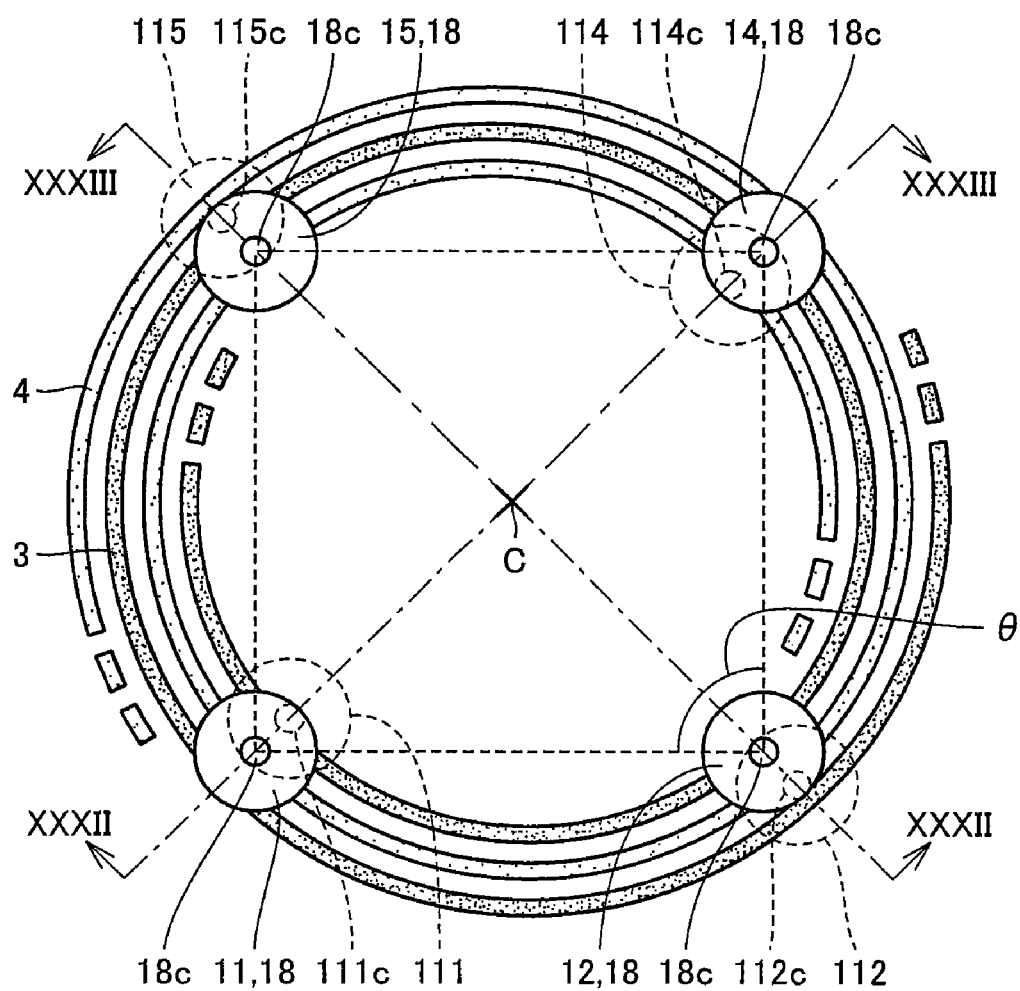
FIG. 31 is a plan view showing arrangement relation of anode (cathode) lead tab terminals in an electrolytic capacitor according to a variation.

Thus, as shown in FIG. 31, the position in the radial direction of lead 18c (boss portion 18a) of one-side pressed terminal 18 serving as first anode (cathode) lead tab terminal 11, 14 is shifted outward and the position in the radial direction of lead 18c (boss portion 18a) of one-side pressed terminal 18 serving as second anode (cathode) lead tab terminal 12, 15 is shifted inward. Therefore, the position in the radial direction of lead 18c (boss portion 18a) of one-side pressed terminal 18 serving as first anode (cathode) lead tab terminal 11, 14 is in registration with the position in the radial direction of lead 18c (boss portion 18a) of one-side pressed terminal 18 serving as second anode (cathode) lead tab terminal 12, 15, so that leads 18c of first (second) anode (cathode) lead tab terminals 11, 12, 14, 15 can be arranged at positions corresponding to respective vertices of a square.

Consequently, in the electrolytic capacitor in which the connection portion of the anode (cathode) lead tab terminal is located on the outer circumferential surface of the anode (cathode) foil as well, substantially regular pitches between first (second) anode (cathode) lead tab terminals 11, 12, 14, 15 are achieved, ESL is lowered, and lowering in characteristics as the electrolytic capacitor can be suppressed. In addition, leads or boss portions of first (second) anode (cathode) lead tab terminals 11, 12, 14, 15 can readily be inserted in openings 22a in sealing rubber gasket 22 or openings 24a in seat plate 24 and thus productivity can be improved.

In the embodiments described above, regarding a manner of connection of first anode (cathode) lead tab terminal 11, 14 and second anode (cathode) lead tab terminal 12, 15 to anode (cathode) foil 3, 4, a case in which interval P1 (NL) between first anode (cathode) lead tab terminal 11, 14 and second anode (cathode) lead tab terminal 12, 15 is set to an interval between a portion of anode (cathode) foil 3, 4 corresponding to the first (third) position in the circumferential direction in anode (cathode) foil 3, 4 and a portion of anode (cathode) foil 3, 4 corresponding to the second (fourth) position in the circumferential direction after winding up a closest portion of anode (cathode) foil 3, 4 corresponding to the second (fourth) position in the circumferential direction with respect to the first (third) position in the circumferential direction and further winding up anode (cathode) foil 3, 4 again has been described by way of example.

A manner of connection of first anode (cathode) lead tab terminal 11, 14 and second anode (cathode) lead tab terminal 12, 15 to anode (cathode) foil 3, 4 is not limited thereto, and for example, second anode (cathode) lead tab terminal 12, 15 may be connected to a prescribed portion of anode (cathode) foil 3, 4 after winding up the foil by a length shorter than a circumference from a portion of anode (cathode) foil 3, 4 to which first anode (cathode) lead tab terminal 11, 14 is connected. Alternatively, second anode (cathode) lead tab terminal 12, 15 may be connected to a prescribed portion of anode (cathode) foil 3, 4 after winding up the foil by a length longer than a circumference from a portion of anode (cathode) foil 3, 4 to which first anode (cathode) lead tab terminal 11, 14 is connected.

In such a case as well, one-side pressed terminal 18 is applied as first anode (cathode) lead tab terminal 11, 14 and second anode (cathode) lead tab terminal 12, 15, second anode (cathode) lead tab terminal 12, 15 arranged radially outward relative to first anode (cathode) lead tab terminal 11, 14 is connected to anode (cathode) foil 3, 4 such that lead 18c thereof is shifted radially inward, and first anode (cathode) lead tab terminal 11, 14 arranged radially inward relative to second anode (cathode) lead tab terminal 12, 15 is connected to anode (cathode) foil 3, 4 such that lead 18c thereof is shifted radially outward. In other words, the electrolytic capacitor includes one-side pressed terminal 18 having first connection surface 18d connected to anode foil 3 or cathode foil 4 and one-side pressed terminal 18 having second connection surface 18e connected to anode foil 3 or cathode foil 4. Thus, the position in the radial direction of lead 18c of second anode (cathode) lead tab terminal 12, 15 can be in registration with the position in the radial direction of lead 18c of first anode (cathode) lead tab terminal 11, 14. Consequently, registration in manufacturing is further facilitated and characteristics as the electrolytic capacitor can also be maintained.

Though an electrolytic capacitor including four lead tab terminals has been described in the present embodiment by way of example, an electrolytic capacitor in the present invention may include five or more lead tab terminals.

Example II

The inventors fabricated 500 electrolytic capacitors according to the embodiment in which a one-side pressed terminal was applied as the first anode (cathode) lead tab terminal and the second anode (cathode) lead tab terminal. It is noted that a specific method of manufacturing an electrolytic capacitor is as described in the embodiment above and a diameter was set to 8.0 mm.

In addition, 500 electrolytic capacitors in which a both-side pressed terminal was applied as the first (second) anode (cathode) lead tab terminal were fabricated as Comparative Example 2.

With regard to the electrolytic capacitors in Example 3 of the present invention and Comparative Example 2, positions of four anode (cathode) lead tab terminals (leads) (arrangement geometry) and characteristics were evaluated.

Regarding the criteria for determining whether a sample is good or defective in connection with positions of four anode (cathode) lead tab terminals (leads), an angle of one vertex of a quadrangle formed by connecting to one another, points where leads of four anode (cathode) lead tab terminals are located was measured, and a sample of which angle is within a range of 90±20° was determined as good and a sample otherwise was determined as defective. Table 2 shows the results.

Regarding the characteristics, an LCR meter was used to measure a capacitance (Cap.), phase shift loss (tan δ), ESR, and a leakage current (LC). For a condition for measurement of a capacitance and phase shift loss, a frequency of 120 Hz was adopted. For a condition for measurement of ESR, 100 kHz was adopted. For a condition for measurement of LC, a value thereof 2 minutes after application of a rated voltage was adopted. Table 3 shows the results.

TABLE 2

|  | The Number of Defects Produced/ Total Number (pieces) |
| --- | --- |
| Example 3 of the Present Invention | 0/500 |
| Comparative Example 2 | 500/500 |

TABLE 3

|  | Capacitance (μF) | Phase Shift Loss (%) | ESR (mΩ) | LC (μA) |
| --- | --- | --- | --- | --- |
| Example 3 of the Present Invention | 1544 | 3.2 | 3.8 | 42 |
| Comparative Example 2 | 1545 | 3.3 | 4.4 | 43 |

As shown in Table 2, regarding the electrolytic capacitors according to Comparative Example 2 in all of which the both-side pressed terminal was applied, all of 500 evaluated samples were determined as defective. In contrast, regarding the electrolytic capacitors according to Example 3 of the present invention, all of 500 evaluated samples were determined as good.

In addition, as shown in Table 3, the capacitors in Example 3 of the present invention and Comparative Example 2 were substantially equal in capacitance, however, the electrolytic capacitors according to Example 3 of the present invention, in all of which a one-side pressed terminal was applied, could achieve reduction in phase shift loss, ESR, and LC, as compared with the electrolytic capacitors according to Comparative Example 2.

Based on this evaluation result, it was demonstrated that the electrolytic capacitor described above can contribute to lowering in ESL, facilitate registration with a sealing rubber gasket, a seat plate and the like, and improve productivity.

Fourth Embodiment

Here, an electrolytic capacitor in which a both-side pressed terminal is applied as the first anode lead tab terminal and a one-side pressed terminal is applied as the second anode lead tab terminal will be described by way of example of an electrolytic capacitor including three lead tab terminals.

Figure 34:
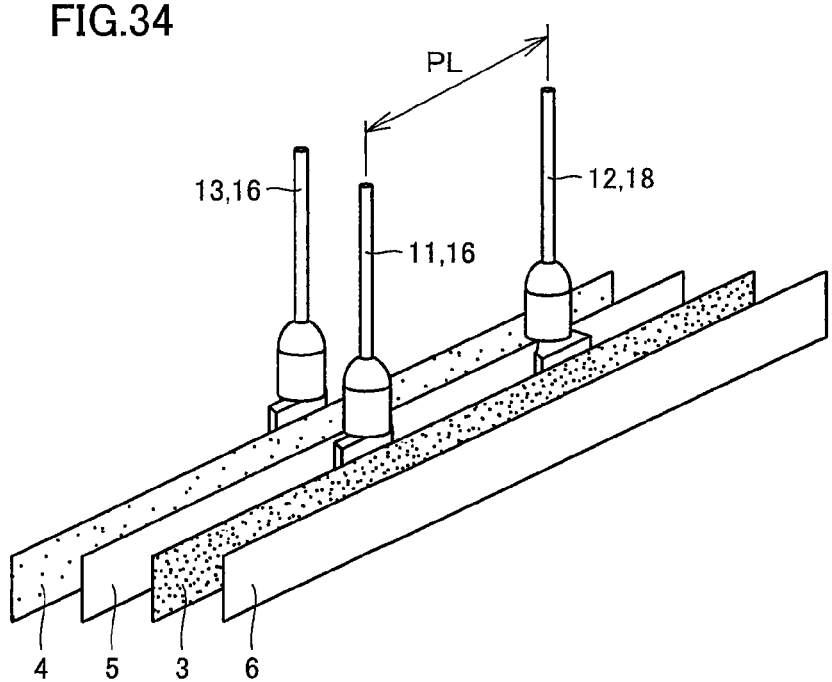
FIG. 34 is a perspective view showing a manner of connection of an anode (a cathode) lead tab terminal to an anode (a cathode) foil and a manner of arrangement of the anode (cathode) foil and a separator in an electrolytic capacitor according to a fourth embodiment of the present invention.

Initially, as shown in FIG. 34, at prescribed positions in a longitudinal direction of anode foil 3, both-side pressed terminal 16 is connected as first anode lead tab terminal 11 and one-side pressed terminal 18 is connected as second anode lead tab terminal 12. In addition, at a prescribed position in a longitudinal direction of cathode foil 4, both-side pressed terminal 16 is connected as cathode lead tab terminal 13.

Here, first anode lead tab terminal 11 is connected to a portion of anode foil 3 arranged at a prescribed distance (a first distance) from the one-end side of anode foil 3 (in the present embodiment, on the left side of anode foil 3 in FIG. 34), at a prescribed first position in a circumferential direction in the wound-up state. In addition, second anode lead tab terminal 12 is connected to a portion of anode foil 3 arranged at a distance greater than the prescribed distance (a second distance) from the one-end side of the anode foil, at a prescribed second position in a circumferential direction with respect to the first position in the circumferential direction in the wound-up state.

Interval PL between first anode lead tab terminal 11 and second anode lead tab terminal 12 is set to an interval between a portion of anode foil 3 corresponding to the first position in the circumferential direction in anode foil 3 and a portion of anode foil 3 corresponding to the second position in the circumferential direction after winding up a closest portion of anode foil 3 corresponding to the second position in the circumferential direction with respect to the first position in the circumferential direction and further winding up anode foil 3 again.

Further, cathode lead tab terminal 13 is connected to a portion of cathode foil 4 arranged at a prescribed distance (a third distance) from the one-end side of cathode foil 4, at a prescribed third position in a circumferential direction with respect to the first position in the circumferential direction and the second position in the circumferential direction in the wound-up state.

Here, the circumferential direction refers to a circumferential direction with the one-end sides of anode foil 3, cathode foil 4 and the like serving as the point of start of winding being defined as a central portion, and the radial direction refers to a direction substantially orthogonal to the circumferential direction from the central portion.

Then, as shown in FIG. 34, anode foil 3 and cathode foil 4 are arranged in such a manner that one sheet of separator paper 5 is sandwiched between anode foil 3 and cathode foil 4 and anode foil 3 is sandwiched between one sheet of separator paper 5 and the other sheet of separator paper 6.

Figure 35:
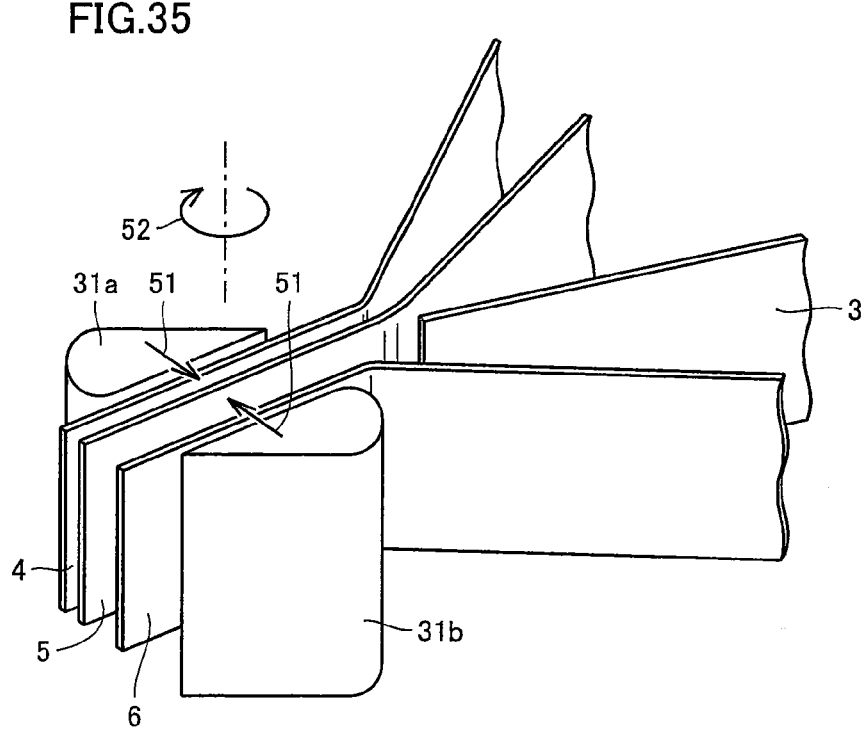
FIG. 35 is a partial perspective view showing one step of a method of manufacturing an electrolytic capacitor in the fourth embodiment.
Figure 36:
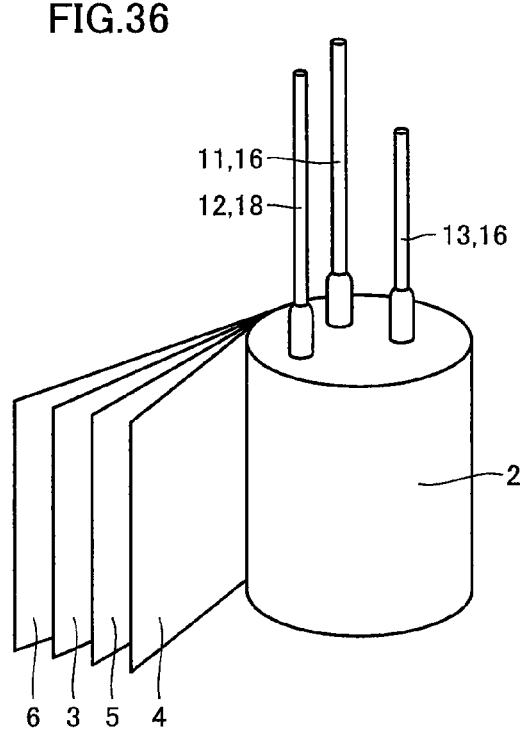
FIG. 36 is a perspective view showing a step performed subsequent to the step shown in FIG. 35 in the fourth embodiment.

Then, as shown in FIG. 35, one-end sides of arranged anode foil 3, cathode foil 4 and sheets of separator paper 5, 6 are sandwiched between core 31*a* and core 31*b* as shown with arrow 51. Then, by turning cores 31*a*, 31*b* clockwise as shown with arrow 52 in that state, anode foil 3, cathode foil 4 and the like are wound up from the one-end side in such a manner that first anode lead tab terminal 11, second anode lead tab terminal 12, and cathode lead tab terminal 13 are located on the inner circumferential surface of anode (cathode) foil 3, 4, to thereby form capacitor element 2 as shown in FIG. 36.

Then, a cut surface or the like of the anode foil or the like of capacitor element 2 is subjected to chemical conversion treatment and further to heat treatment at a temperature from 150° C. to 300° C. Then, capacitor element 2 is impregnated with a solution mixture of a monomer forming a conductive polymer through polymerization, such as 3,4-ethylenedioxythiophene, and a ferric p-toluenesulfonate alcohol solution representing an oxidizing agent solution. Thereafter, through thermochemical polymerization, a conductive polymer layer (not shown) is formed between electrodes of capacitor element 2. Other than these materials, a conductive polymer material such as polypyrrole, polyfuran or polyaniline, or TCNQ complex salt (7,7,8,8-tetracyanoquinodimethane) may be used as an electrolyte.

Figure 37:
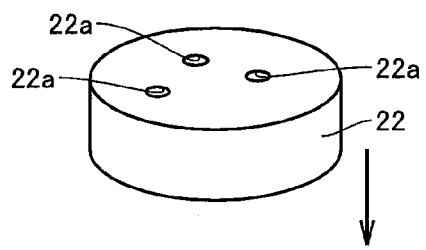
FIG. 37 is a perspective view showing a step performed subsequent to the step shown in FIG. 36 in the fourth embodiment.
Figure 37:
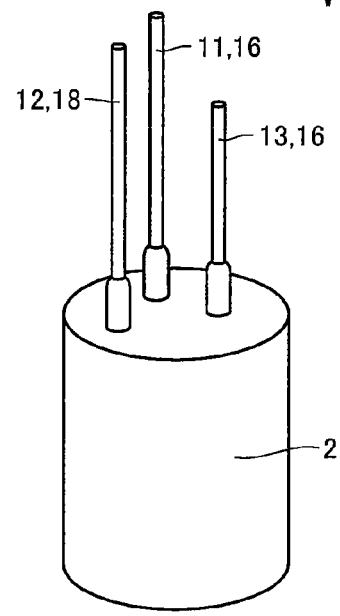
Figure 38:
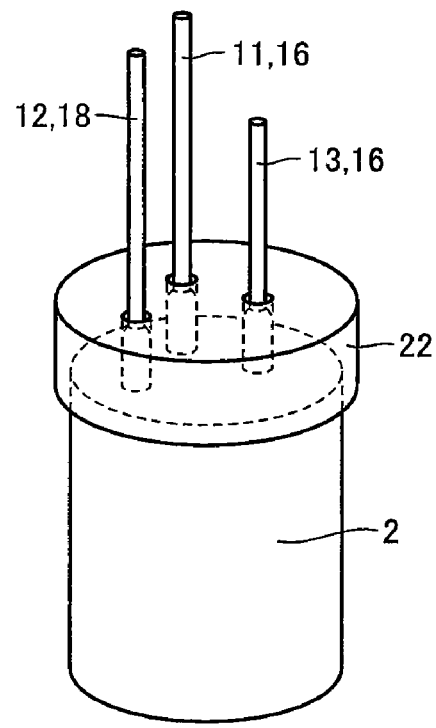
FIG. 38 is a perspective view showing a step performed subsequent to the step shown in FIG. 37 in the fourth embodiment.

Then, as shown in FIG. 37, sealing rubber gasket 22 is attached to capacitor element 2. In sealing rubber gasket 22, three openings 22*a* are formed at prescribed positions corresponding to first anode lead tab terminal 11, second anode lead tab terminal 12 and cathode lead tab terminal 13 respectively. As shown in FIG. 38, sealing rubber gasket 22 is attached to capacitor element 2 by inserting leads 16*c*, 18*c* and boss portions 16*a*, 18*a* of first and second anode lead tab terminals 11, 12 and cathode lead tab terminal 13 in corresponding openings 22*a* respectively.

Then, capacitor element 2 to which sealing rubber gasket 22 is attached is accommodated in aluminum case 20 with a bottom (see FIG. 39) having a prescribed size. Then, an open-end side of aluminum case 20 is sealed by pressing in a lateral direction and curling and prescribed aging treatment is performed. Then, seat plate 24 made of plastic is attached to a curled surface of aluminum case 20.

Figure 39:
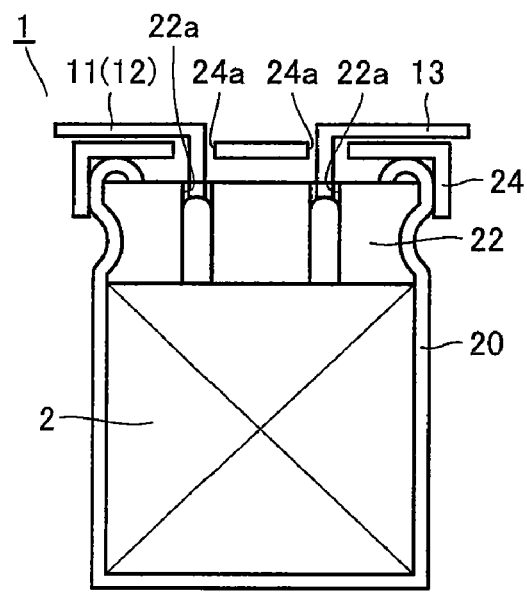
FIG. 39 is a cross-sectional view showing a step performed subsequent to the step shown in FIG. 38 in the fourth embodiment.
Figure 40:
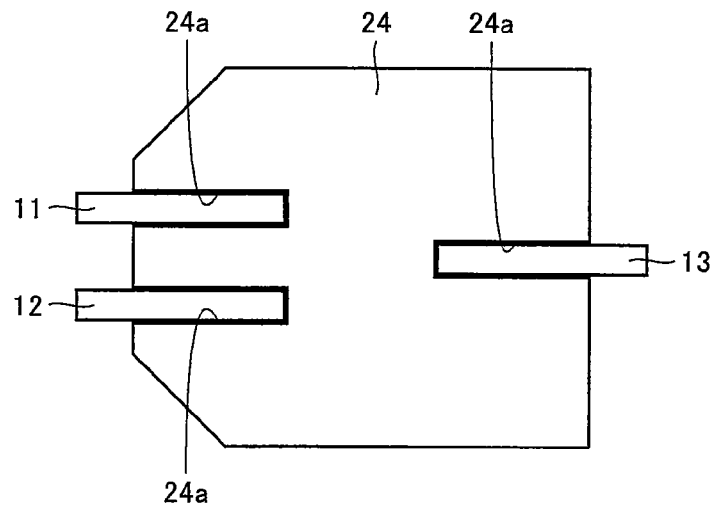
FIG. 40 is a top view in the step shown in FIG. 39 in the fourth embodiment.

As shown in FIG. 40, three openings 24*a* corresponding to positions of respective first and second anode lead tab terminals 11, 12 and cathode lead tab terminal 13 are formed in seat plate 24. Seat plate 24 is attached to capacitor element 2 by inserting leads 16*c*, 18*c* of first and second anode lead tab terminals 11, 12 and cathode lead tab terminal 13 in corresponding openings 24*a*. Thereafter, as shown in FIGS. 39 and 40, each lead 16*c*, 18*c* protruding through opening 24*a* in seat plate 24 and serving as an electrode terminal is pressed and bent, to thereby complete electrolytic capacitor 1 having a three-terminal structure.

In the electrolytic capacitor described above, one-side pressed terminal 18 is applied as second anode lead tab terminal 12, and the position in the radial direction of lead 18*c* thereof is shifted inward so as to be able to be in registration with the position in the radial direction of leads 16*c* of first anode lead tab terminal 11 and cathode lead tab terminal 13 (both-side pressed terminal 16), which will now be described.

Figure 41:
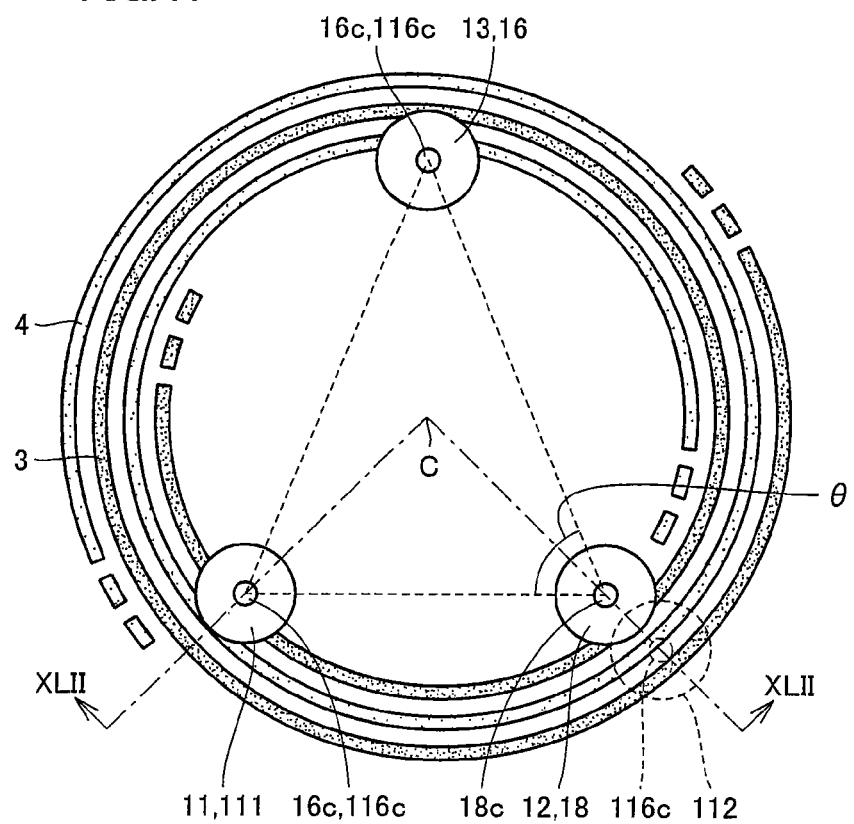
FIG. 41 is a plan view showing arrangement relation of anode (cathode) lead tab terminals in the fourth embodiment.
Figure 42:
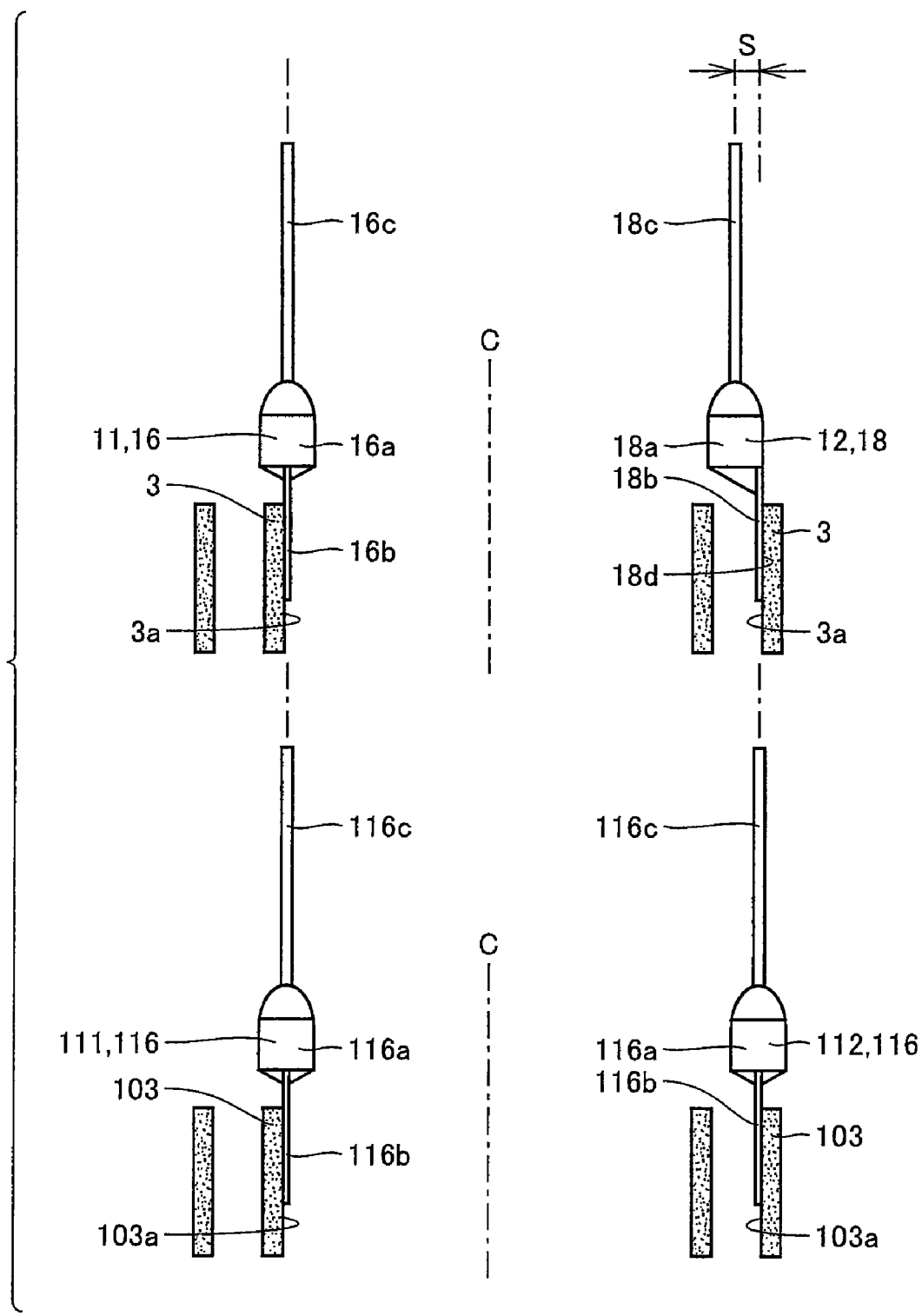
FIG. 42 is a cross-sectional view along the line XLII-C-XLII shown in FIG. 41 in the fourth embodiment and a cross-sectional view along that line in an electrolytic capacitor according to a Comparative Example.

Initially, in a Comparative Example where a both-side pressed terminal is applied as the first anode lead tab terminal and a both-side pressed terminal is applied as the second anode lead tab terminal, as shown in FIG. 41, regarding the circumferential direction, second anode lead tab terminal 112 (lead 116*c*) is arranged at a prescribed second position in a circumferential direction with respect to the first position in the circumferential direction where first anode lead tab terminal 111 (lead 116*c*) is arranged. Regarding the radial direction, however, second anode lead tab terminal 112 (lead 116*c*) is arranged on the outer side relative to the position in the radial direction of first anode lead tab terminal 111 (lead 116*c*), because anode (cathode) foil 3, 4 and the like are wound up once. In FIG. 41 and the like, one-end sides of anode foil 3, cathode foil 4 and the like serving as the point of start of winding are shown as central portion C. In addition, FIG. 42 shows a cross-sectional structure of the electrolytic capacitor according to this Comparative Example in a lower portion thereof.

In contrast, in the electrolytic capacitor described above, as shown in the upper portion of FIG. 42, one-side pressed terminal 18 is applied as second anode lead tab terminal 12 and in addition one-side pressed terminal 18 is connected to anode foil 3 in such a manner that first connection surface 18*d* of connection portion 18*b* is in contact with inner circumferential surface 3*a* of anode foil 3. Therefore, though the position in the radial direction of connection portion 18*b* is not different from the position in the radial direction of connection portion 116*b* in a case where both-side pressed terminal 116 is applied, the position in the radial direction of lead 18c (boss portion 18a) is shifted by distance S toward the center (start of winding of anode foil 3 and the like) C side (inner side) of capacitor element 2 relative to the position in the radial direction of lead 116c (boss portion 116a) in a case where both-side pressed terminal 116 shown in the lower portion of FIG. 42 is applied.

Thus, as shown in FIG. 41, the position in the radial direction of lead 18c (boss portion 18a) of one-side pressed terminal 18 serving as second anode lead tab terminal 12 is shifted inward to be in registration with the position in the radial direction of lead 16c (boss portion 16a) of both-side pressed terminal 16 serving as first anode lead tab terminal 11, so that leads 16c, 18c of first and second anode lead tab terminals 11, 12 and cathode lead tab terminal 13 can be arranged at positions corresponding to respective vertices of an equilateral triangle. Though a two-dimensional arrangement pattern of leads 16c, 18c is not limited to the equilateral triangle, an angle θ formed by one vertex is preferably in a range from 20 to 140° and more preferably around 60°. It is noted that the two-dimensional arrangement pattern refers to an arrangement pattern of leads in electrolytic capacitor 1 when a side from which first and second anode lead tab terminals 11, 12 and cathode lead tab terminal 13 protrude is two-dimensionally viewed.

Consequently, substantially regular pitches between first and second anode lead tab terminals 11, 12 and cathode lead tab terminal 13 are achieved, ESL is lowered, and lowering in characteristics as the electrolytic capacitor can be suppressed. In addition, leads or boss portions of first and second anode lead tab terminals 11, 12 and cathode lead tab terminal 13 can readily be inserted in openings 22a in sealing rubber gasket 22 or openings 24a in seat plate 24 and thus productivity can be improved. Thus, since a three-terminal electrolytic capacitor capable of suppressing lowering in characteristics as the electrolytic capacitor and achieving improved productivity can be implemented, reduction in size of an electrolytic capacitor can be achieved.

Fifth Embodiment

Here, an electrolytic capacitor in which a one-side pressed terminal is applied as the first anode lead tab terminal and a both-side pressed terminal is applied as the second anode lead tab terminal will be described by way of another example of an electrolytic capacitor including three lead tab terminals.

Figure 43:
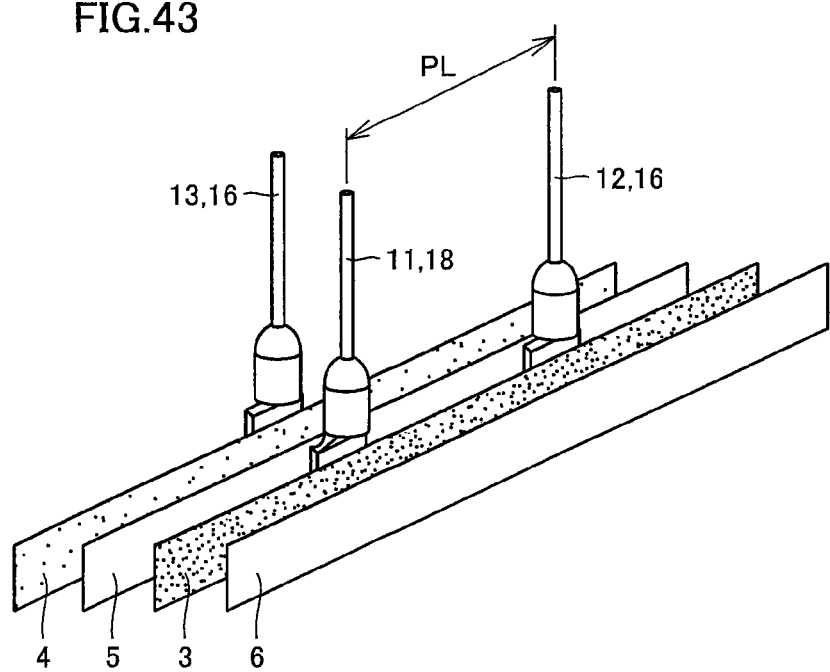
FIG. 43 is a perspective view showing a manner of connection of an anode (a cathode) lead tab terminal to an anode (a cathode) foil and a manner of arrangement of the anode (cathode) foil and a separator in an electrolytic capacitor according to a fifth embodiment of the present invention.

Initially, as shown in FIG. 43, at prescribed positions in a longitudinal direction of anode foil 3, one-side pressed terminal 18 is connected as first anode lead tab terminal 11 and both-side pressed terminal 16 is connected as second anode lead tab terminal 12. In addition, at a prescribed position in a longitudinal direction of cathode foil 4, both-side pressed terminal 16 is connected as cathode lead tab terminal 13.

Here, as in the electrolytic capacitor described previously, first anode lead tab terminal 11 is connected to a portion of anode foil 3 arranged at a prescribed distance (a first distance) from the one-end side of anode foil 3, at a prescribed first position in a circumferential direction in the wound-up state. In addition, second anode lead tab terminal 12 is connected to a portion of anode foil 3 arranged at a distance greater than the prescribed distance (a second distance) from the one-end side of the anode foil, at a prescribed second position in a circumferential direction with respect to the first position in the circumferential direction in the wound-up state.

Interval PL between first anode lead tab terminal 11 and second anode lead tab terminal 12 is set to an interval between a portion of anode foil 3 corresponding to the first position in the circumferential direction and a portion of anode foil 3 corresponding to the second position in the circumferential direction after winding up a closest portion of anode foil 3 corresponding to the second position in the circumferential direction with respect to the first position in the circumferential direction and further winding up anode foil 3 again.

Further, cathode lead tab terminal 13 is connected to a portion of cathode foil 4 arranged at a prescribed distance (a third distance) from the one-end side of cathode foil 4, at a prescribed third position in a circumferential direction with respect to the first position in the circumferential direction and the second position in the circumferential direction in the wound-up state.

Then, as in the method shown in FIG. 35 described previously, one-end sides of arranged anode foil 3, cathode foil 4 and sheets of separator paper 5, 6 are sandwiched between core 31a and core 31b. Then, by turning cores 31a, 31b clockwise in that state, anode foil 3, cathode foil 4 and the like are wound up from the one-end side in such a manner that first and second anode lead tab terminals 11, 12 and cathode lead tab terminal 13 are located on the inner circumferential surface of anode (cathode) foil 3, 4, to thereby form capacitor element 2. Then, the capacitor element is subjected to chemical conversion treatment or the like, and thereafter, as in the steps shown in FIGS. 37 to 40, attachment of the sealing rubber gasket, accommodation in an aluminum case and working, attachment of a seat plate, and the like are performed, to thereby complete an electrolytic capacitor.

In the electrolytic capacitor described above, one-side pressed terminal 18 is applied as first anode lead tab terminal 11 and the position in the radial direction of lead 18c thereof is shifted outward so as to be able to be in registration with the position in the radial direction of lead 16c of second anode lead tab terminal 12 (both-side pressed terminal 16), which will now be described.

Figure 44:
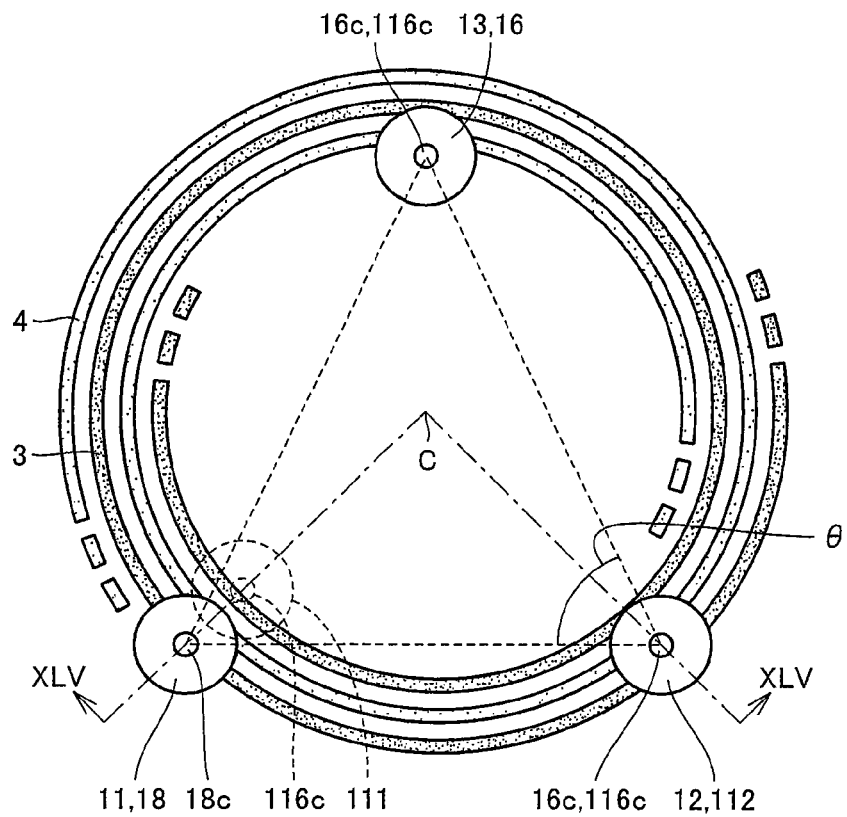
FIG. 44 is a plan view showing arrangement relation of anode (cathode) lead tab terminals in the fifth embodiment.

Initially, in a Comparative Example where a both-side pressed terminal is applied as the first anode lead tab terminal and a both-side pressed terminal is applied as the second anode lead tab terminal, as shown in FIG. 44, regarding the circumferential direction, second anode lead tab terminal 112 (lead 116c) is arranged at a prescribed second position in a circumferential direction with respect to the first position in the circumferential direction where first anode lead tab terminal 111 (lead 116c) is arranged. Regarding the radial direction, however, second anode lead tab terminal 112 (lead 116c) is arranged on the outer side relative to the position in the radial direction of first anode lead tab terminal 111 (lead 116c), because anode (cathode) foil 3, 4 and the like are wound up once.

Figure 45:
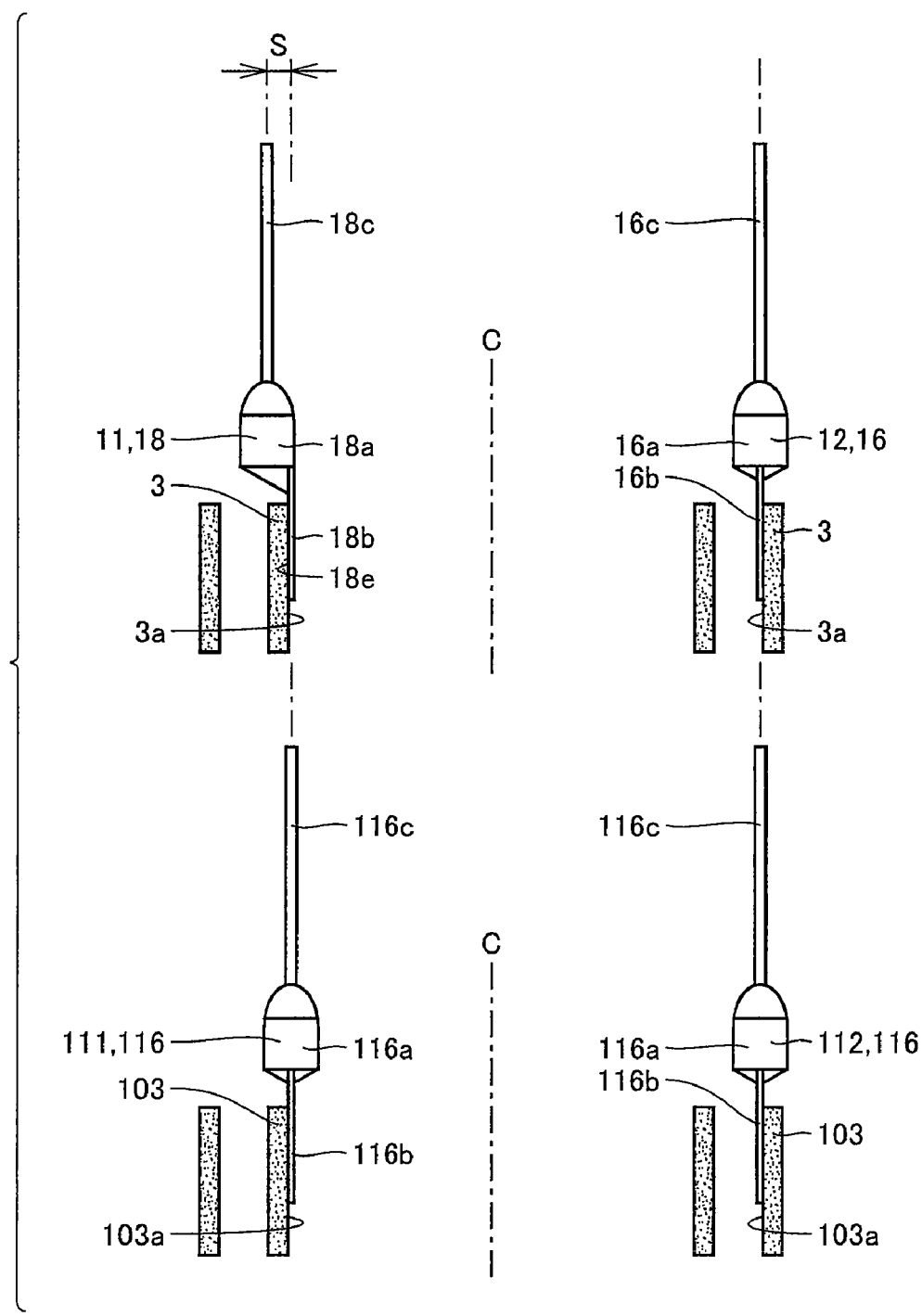
FIG. 45 is a cross-sectional view along the line XLV-C-XLV shown in FIG. 44 in the fifth embodiment and a cross-sectional view along that line in an electrolytic capacitor according to a Comparative Example.

In contrast, in the electrolytic capacitor described above, as shown in an upper portion of FIG. 45, one-side pressed terminal 18 is applied as first anode lead tab terminal 11 and in addition one-side pressed terminal 18 is connected to anode foil 3 in such a manner that second connection surface 18e of connection portion 18b is in contact with inner circumferential surface 3a of anode foil 3. Therefore, though the position in the radial direction of connection portion 18b is not different from the position in the radial direction of connection portion 116b in a case where both-side pressed terminal 116 is applied, the position in the radial direction of lead 18c (boss portion 18a) is shifted by distance S toward the side opposite to the center C side (outer side) of capacitor element 2 relative to the position in the radial direction of lead 116c (boss portion 116a) in a case where both-side pressed terminal 116 shown in the lower portion of FIG. 45 is applied.

Thus, as shown in FIG. 44, the position in the radial direction of lead 18c (boss portion 18a) of one-side pressed terminal 18 serving as first anode lead tab terminal 11 is shifted outward to be in registration with the position in the radial direction of lead 16c (boss portion 16a) of both-side pressed terminal 16 serving as second anode lead tab terminal 12, so that leads 16c, 18c of first and second anode lead tab terminals 11, 12 and cathode lead tab terminal 13 can be arranged at positions corresponding to respective vertices of an equilateral triangle.

Consequently, substantially regular pitches between first and second anode lead tab terminals 11, 12 and cathode lead tab terminal 13 are achieved, ESL is lowered, and lowering in characteristics as the electrolytic capacitor can be suppressed. In addition, leads or boss portions of first and second anode lead tab terminals 11, 12 and cathode lead tab terminal 13 can readily be inserted in openings 22a in sealing rubber gasket 22 or openings 24a in seat plate 24 and thus productivity can be improved.

Sixth Embodiment

Here, an electrolytic capacitor in which a one-side pressed terminal is applied as the first anode lead tab terminal and a one-side pressed terminal is applied as the second anode lead tab terminal will be described.

Figure 46:
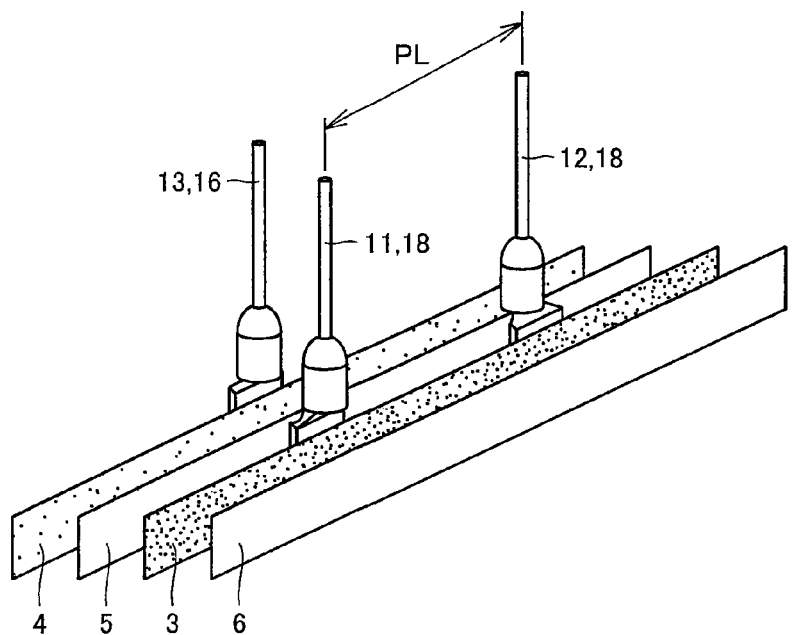
FIG. 46 is a perspective view showing a manner of connection of an anode (a cathode) lead tab terminal to an anode (a cathode) foil and a manner of arrangement of the anode (cathode) foil and a separator in an electrolytic capacitor according to a sixth embodiment of the present invention.

Initially, as shown in FIG. 46, at prescribed positions in a longitudinal direction of anode foil 3, one-side pressed terminal 18 is connected as first anode lead tab terminal 11 and one-side pressed terminal 18 is connected as second anode lead tab terminal 12. In addition, both-side pressed terminal 16 is connected as cathode lead tab terminal 13 at a prescribed position in a longitudinal direction of cathode foil 4.

Here, as in the electrolytic capacitor described previously, first anode lead tab terminal 11 is connected to a portion of anode foil 3 arranged at a prescribed distance (a first distance) from the one-end side of anode foil 3, at a prescribed first position in a circumferential direction in the wound-up state. In addition, second anode lead tab terminal 12 is connected to a portion of anode foil 3 arranged at a distance greater than the prescribed distance (a second distance) from the one-end side of the anode foil, at a prescribed second position in a circumferential direction with respect to the first position in the circumferential direction in the wound-up state.

Interval PL between first anode lead tab terminal 11 and second anode lead tab terminal 12 is set to an interval between a portion of anode foil 3 corresponding to the first position in the circumferential direction and a portion of anode foil 3 corresponding to the second position in the circumferential direction after winding up a closest portion of anode foil 3 corresponding to the second position in the circumferential direction with respect to the first position in the circumferential direction and further winding up anode foil 3 again.

Further, cathode lead tab terminal 13 is connected to a portion of cathode foil 4 arranged at a prescribed distance (a third distance) from the one-end side of cathode foil 4, at a prescribed third position in a circumferential direction with respect to the first position in the circumferential direction and the second position in the circumferential direction in the wound-up state.

Then, as in the method shown in FIG. 35 described previously, one-end sides of arranged anode foil 3, cathode foil 4 and sheets of separator paper 5, 6 are sandwiched between core 31a and core 31b. Then, by turning cores 31a, 31b clockwise in that state, anode foil 3, cathode foil 4 and the like are wound up from one-end side in such a manner that first and second anode lead tab terminals 11, 12 and cathode lead tab terminal 13 are located on the inner circumferential surface of anode (cathode) foil 3, 4, to thereby form capacitor element 2. Then, the capacitor element is subjected to chemical conversion treatment or the like, and thereafter, as in the steps shown in FIGS. 37 to 40, attachment of the sealing rubber gasket, accommodation in an aluminum case and working, attachment of a seat plate, and the like are performed, to thereby complete an electrolytic capacitor.

In the electrolytic capacitor described above, one-side pressed terminal 18 is applied as first anode lead tab terminal 11 and the position in the radial direction of lead 18c thereof is shifted outward, and one-side pressed terminal 18 is applied as second anode lead tab terminal 12 and the position in the radial direction of lead 18c thereof is shifted inward, so that the position in the radial direction of lead 18c of first anode lead tab terminal 11 can be in registration with the position in the radial direction of lead 18c of second anode lead tab terminal 12, which will now be described.

Figure 47:
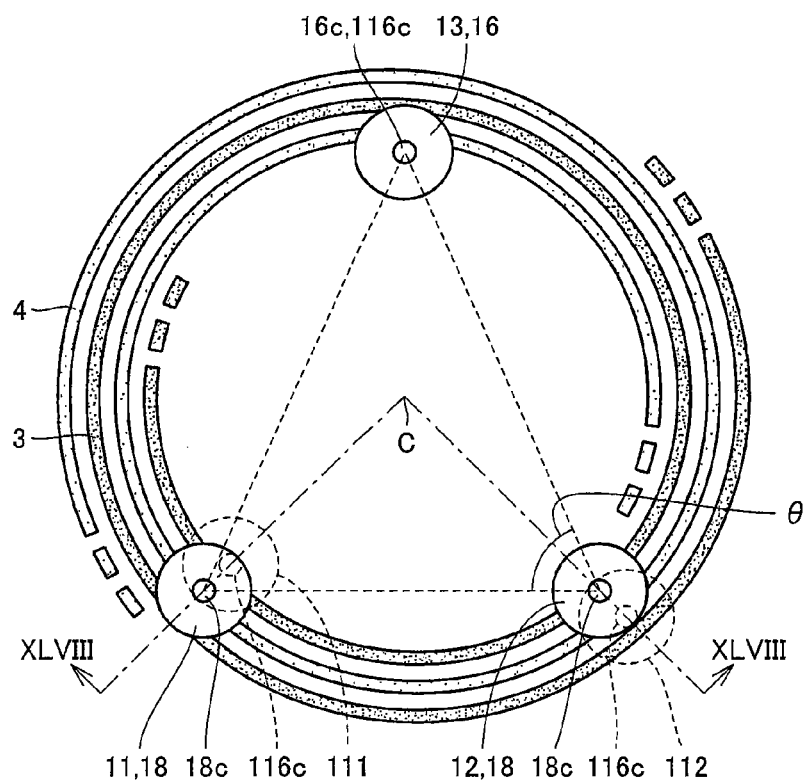
FIG. 47 is a plan view showing arrangement relation of anode (cathode) lead tab terminals in the sixth embodiment.

Initially, in a Comparative Example where a both-side pressed terminal is applied as the first anode lead tab terminal and the second anode lead tab terminal, as shown in FIG. 47, regarding the circumferential direction, second anode lead tab terminal 112 (lead 116c) is arranged at a prescribed second position in a circumferential direction with respect to the first position in the circumferential direction where first anode lead tab terminal 111 (lead 116c) is arranged. Regarding the radial direction, however, second anode lead tab terminal 112 (lead 116c) is arranged on the outer side relative to the position in the radial direction of first anode lead tab terminal 111 (lead 116c), because anode (cathode) foils 3, 4 are wound up once.

Figure 48:
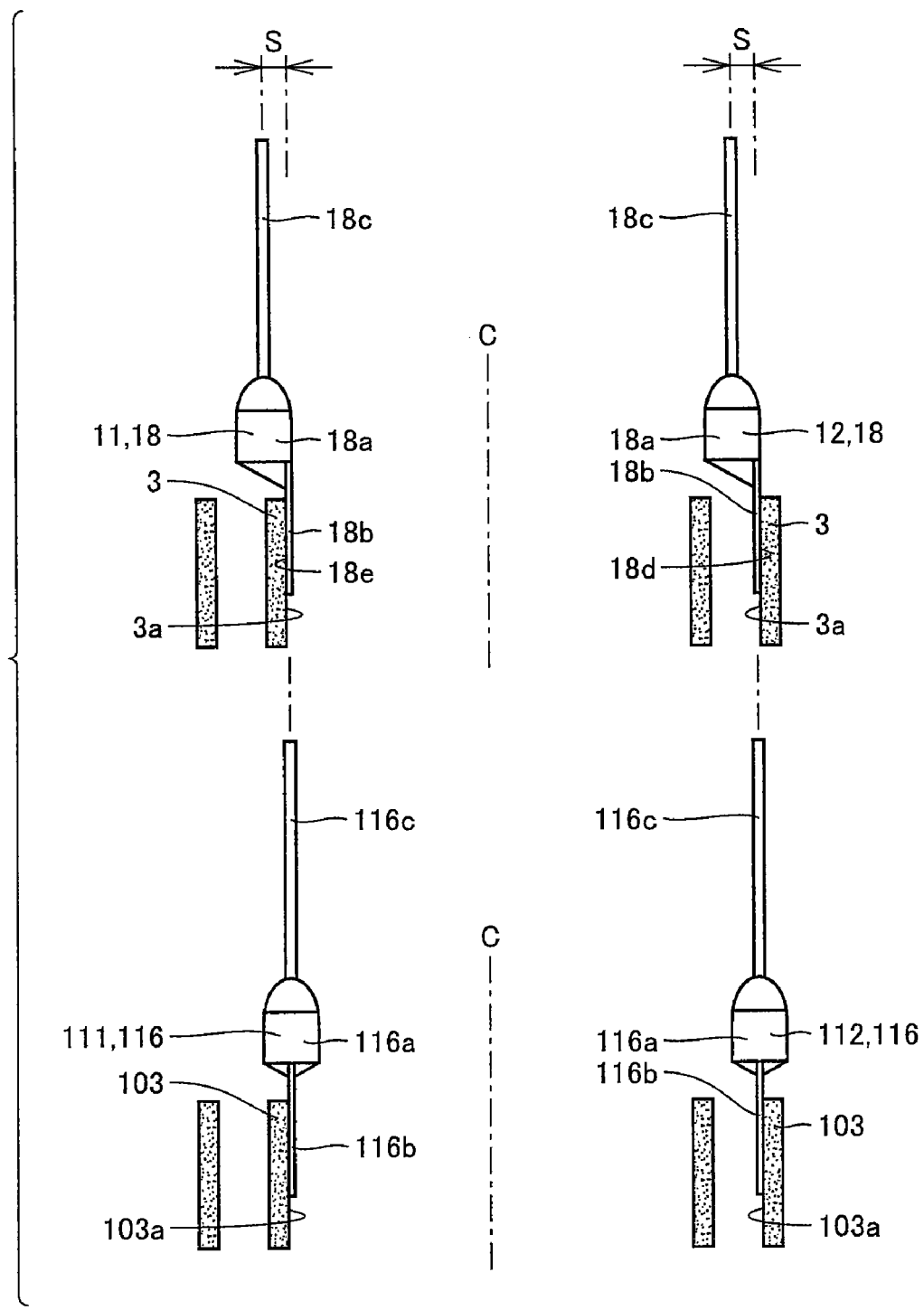
FIG. 48 is a cross-sectional view along the line XLVIII-C-XLVIII shown in FIG. 47 in the sixth embodiment and a cross-sectional view along that line in an electrolytic capacitor according to a Comparative Example.

In contrast, in the electrolytic capacitor described above, as shown in an upper portion of FIG. 48, one-side pressed terminal 18 is applied as first anode lead tab terminal 11 and in addition one-side pressed terminal 18 is connected to anode (cathode) foil 3 in such a manner that second connection surface 18e of connection portion 18b is in contact with inner circumferential surface 3a of anode foil 3. Therefore, though the position in the radial direction of connection portion 18b is not different from the position in the radial direction of connection portion 116b in a case where both-side pressed terminal 116 is applied, the position in the radial direction of lead 18c (boss portion 18a) is shifted by distance S toward the side opposite to the center C side (outer side) of capacitor element 2 relative to the position in the radial direction of lead 116c (boss portion 116a) in a case where both-side pressed terminal 116 shown in the lower portion of FIG. 48 is applied.

Further, one-side pressed terminal 18 is applied as second anode lead tab terminal 12 and in addition one-side pressed terminal 18 is connected to anode foil 3 in such a manner that first connection surface 18d of connection portion 18b is in contact with inner circumferential surface 3a of anode foil 3. Therefore, though the position in the radial direction of connection portion 18b is not different from the position in the radial direction of connection portion 116b in a case where both-side pressed terminal 116 is applied, the position in the radial direction of lead 18c (boss portion 18a) is shifted by distance S toward the center (start of winding of anode foil 3 and the like) C side (inner side) of capacitor element 2 relative to the position in the radial direction of lead 116c (boss portion 116a) in a case where both-side pressed terminal 116 shown in the lower portion of FIG. 48 is applied.

Thus, as shown in FIG. 47, the position in the radial direction of lead 18c (boss portion 18a) of one-side pressed terminal 18 serving as first anode lead tab terminal 11 is shifted outward and the position in the radial direction of lead 18c (boss portion 18a) of one-side pressed terminal 18 serving as second anode lead tab terminal 12 is shifted inward. Thus, the position in the radial direction of lead 18c (boss portion 18a)

of one-side pressed terminal 18 serving as first anode lead tab terminal 11 is in registration with the position in the radial direction of lead 18*c* (boss portion 18*a*) of one-side pressed terminal 18 serving as second anode lead tab terminal 12, so that leads 16*c*, 18*c* of first and second anode lead tab terminals 11, 12 and cathode lead tab terminal 13 can be arranged at positions corresponding to respective vertices of an equilateral triangle.

Consequently, substantially regular pitches between first and second anode lead tab terminals 11, 12 and cathode lead tab terminal 13 are achieved, ESL is lowered, and lowering in characteristics as the electrolytic capacitor can be suppressed. In addition, leads or boss portions of first and second anode lead tab terminals 11, 12 and cathode lead tab terminal 13 can readily be inserted in openings 22*a* in sealing rubber gasket 22 or openings 24*a* in seat plate 24 and thus productivity can be improved.

(Variation)

An electrolytic capacitor in which a connection portion of an anode (cathode) lead tab terminal is located on an inner circumferential surface of an anode (cathode) foil in a state that the anode (cathode) foil and the like are wound up has been described by way of example of an electrolytic capacitor in each embodiment described above. A manner of arrangement of the anode (cathode) lead tab terminal and the anode (cathode) foil is not limited thereto, and an electrolytic capacitor in which a connection portion of an anode (cathode) lead tab terminal is located on an outer circumferential surface of an anode (cathode) foil in a state that the anode (cathode) foil and the like are wound up is also applicable.

Initially, an electrolytic capacitor in which a both-side pressed terminal is applied as the first anode lead tab terminal and a one-side pressed terminal is applied as the second anode lead tab terminal will be described. In this case, as shown in an upper portion of FIG. 49, second connection surface 18*e* of connection portion 18*b* of one-side pressed terminal 18 serving as second anode lead tab terminal 12 is connected to outer circumferential surface 3*b* of anode foil 3.

Figure 49:
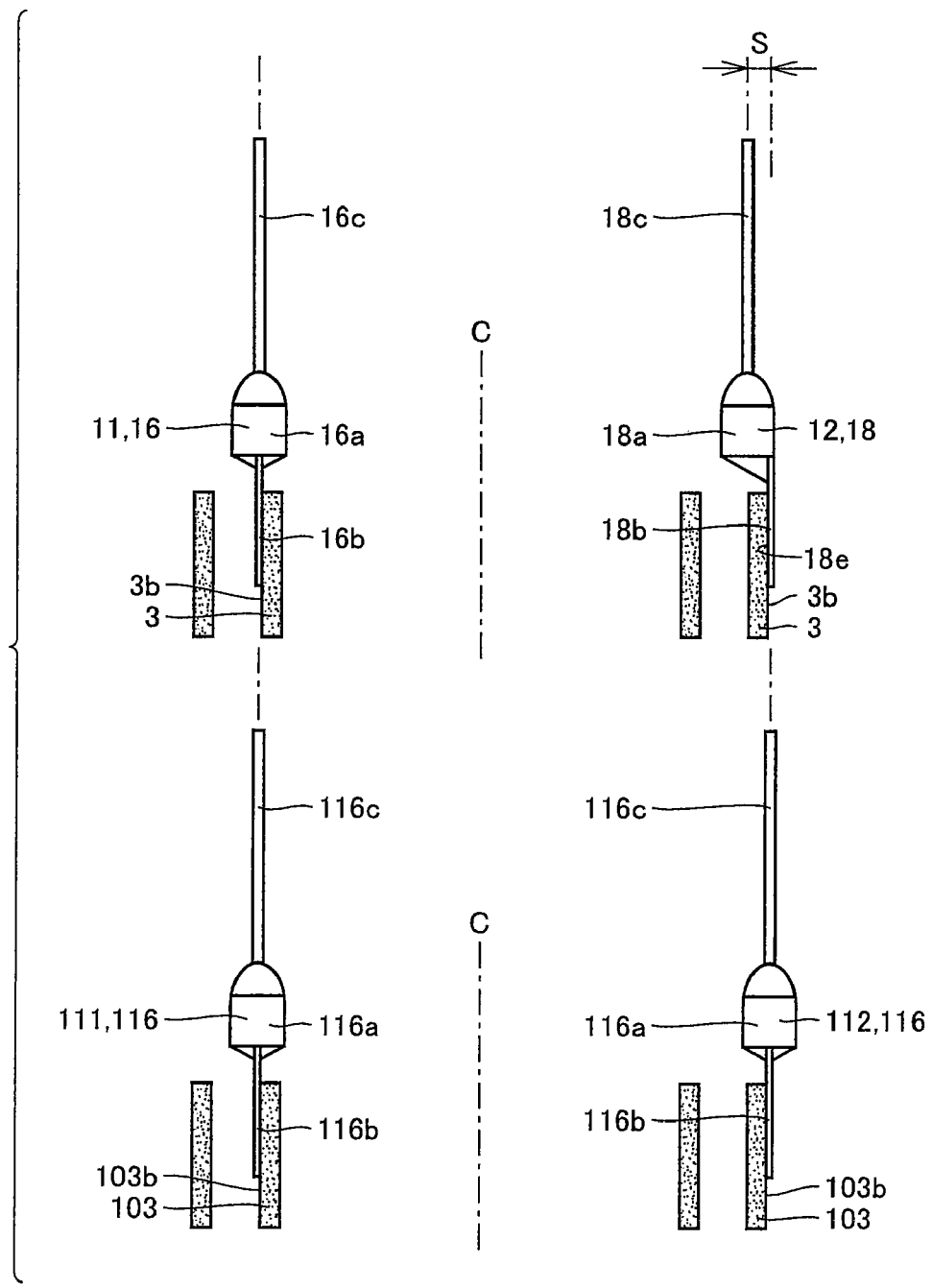
FIG. 49 is a cross-sectional view along the line XLII-C-XLII shown in FIG. 41 in an electrolytic capacitor according to a variation and a cross-sectional view along that line in an electrolytic capacitor according to a Comparative Example.

Therefore, though the position in the radial direction of connection portion 18*b* is not different from the position in the radial direction of connection portion 116*b* in a case where both-side pressed terminal 116 is applied, the position in the radial direction of lead 18*c* (boss portion 18*a*) is shifted by distance S inward relative to the position in the radial direction of lead 116*c* (boss portion 116*a*) in a case where both-side pressed terminal 116 shown in the lower portion of FIG. 49 is applied.

Thus, the position in the radial direction of lead 18*c* (boss portion 18*a*) of one-side pressed terminal 18 serving as second anode lead tab terminal 12 is shifted inward to be in registration with the position in the radial direction of lead 16*c* (boss portion 16*a*) of both-side pressed terminal 16 serving as first anode lead tab terminal 11, so that leads 16*c*, 18*c* of first and second anode lead tab terminals 11, 12 and cathode lead tab terminal 13 can be arranged at positions corresponding to respective vertices of an equilateral triangle (see FIG. 41).

Then, an electrolytic capacitor in which a one-side pressed terminal is applied as the first anode lead tab terminal and a both-side pressed terminal is applied as the second anode lead tab terminal will be described. In this case, as shown in an upper portion of FIG. 50, first connection surface 18*d* of connection portion 18*b* of one-side pressed terminal 18 serving as first anode lead tab terminal 11 is connected to outer circumferential surface 3*b* of anode foil 3.

Figure 50:
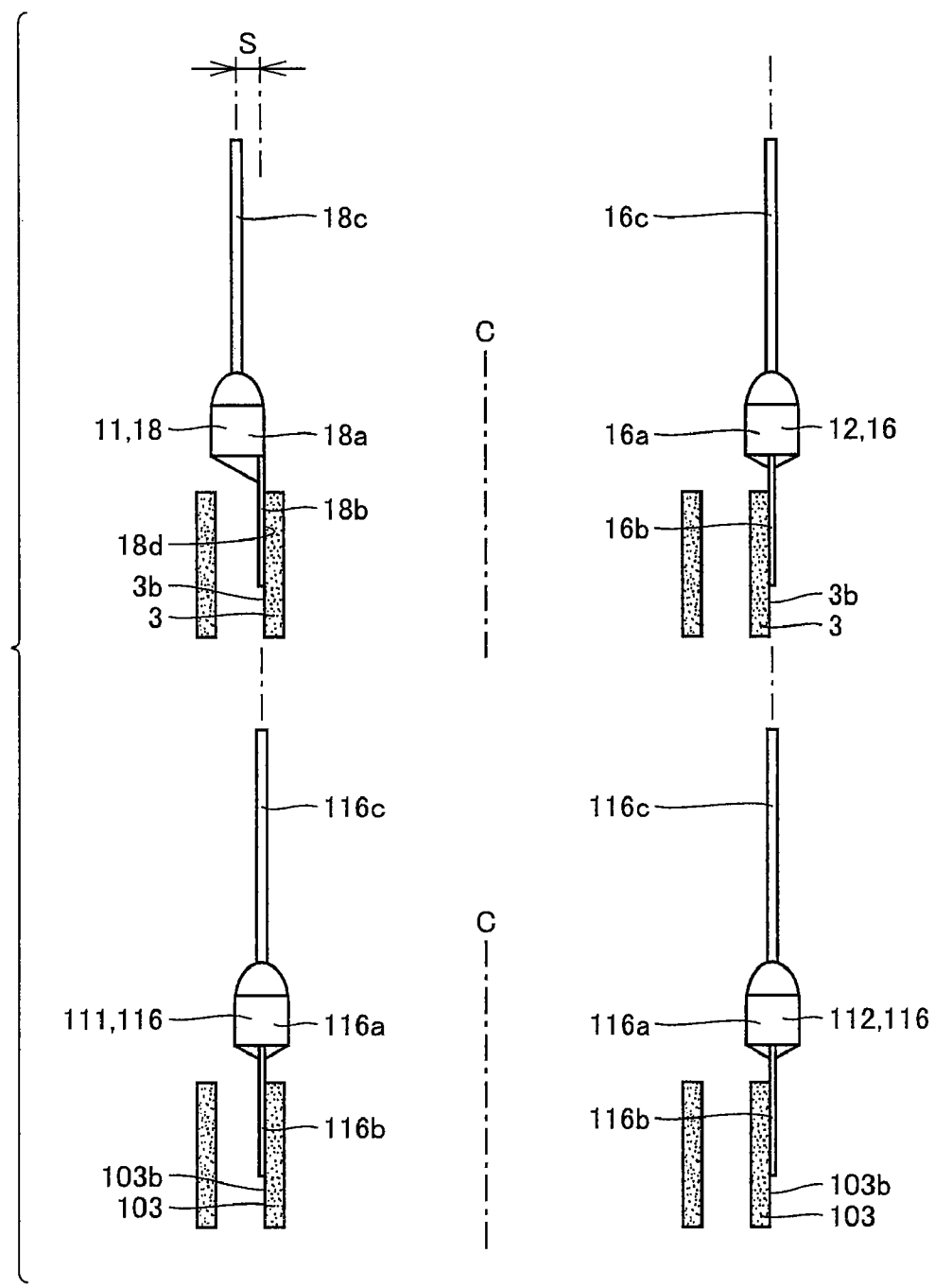
FIG. 50 is a cross-sectional view along the line XLV-C-XLV shown in FIG. 44 in an electrolytic capacitor according to a variation and a cross-sectional view along that line in an electrolytic capacitor according to a Comparative Example.

Therefore, though the position in the radial direction of connection portion 18*b* is not different from the position in the radial direction of connection portion 116*b* in a case where both-side pressed terminal 116 is applied, the position in the radial direction of lead 18*c* (boss portion 18*a*) is shifted by distance S outward relative to the position in the radial direction of lead 116*c* (boss portion 116*a*) in a case where both-side pressed terminal 116 shown in the lower portion of FIG. 50 is applied.

Thus, the position in the radial direction of lead 18*c* (boss portion 18*a*) of one-side pressed terminal 18 serving as first anode lead tab terminal 11 is shifted outward to be in registration with the position in the radial direction of lead 16*c* (boss portion 16*a*) of both-side pressed terminal 16 serving as second anode lead tab terminal 12, so that leads 16*c*, 18*c* of first and second anode lead tab terminals 11, 12 and cathode lead tab terminal 13 can be arranged at positions corresponding to respective vertices of an equilateral triangle (see FIG. 44).

Then, an electrolytic capacitor in which a one-side pressed terminal is applied as the first anode lead tab terminal and a one-side pressed terminal is applied as the second anode lead tab terminal will be described. In this case, as shown in an upper portion of FIG. 51, first connection surface 18*d* of connection portion 18*b* of one-side pressed terminal 18 serving as first anode lead tab terminal 11 is connected to outer circumferential surface 3*b* of anode foil 3.

Figure 51:
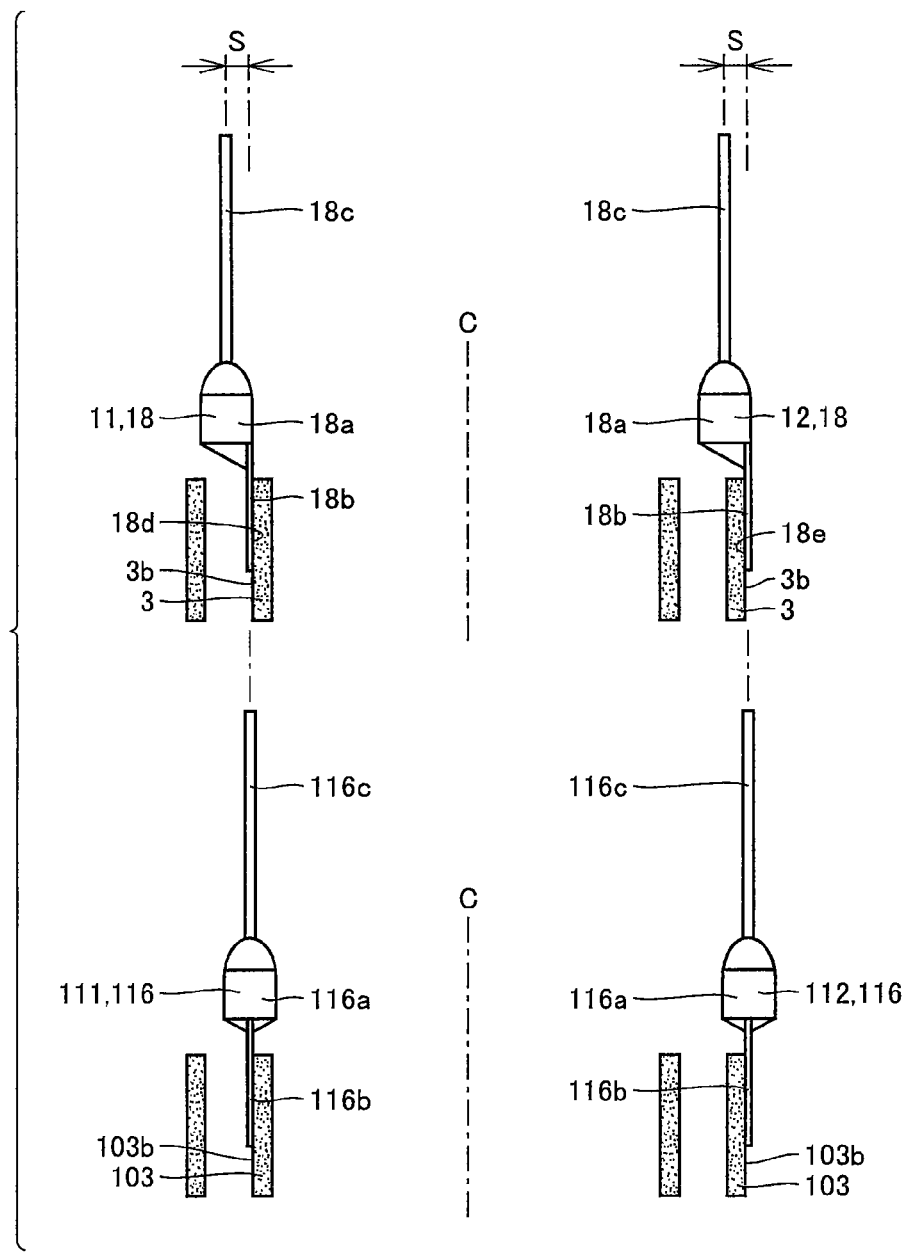
FIG. 51 is a cross-sectional view along the line XLVIII-C-XLVIII shown in FIG. 47 in an electrolytic capacitor according to a variation and a cross-sectional view along that line in an electrolytic capacitor according to a Comparative Example.
Figure 52:
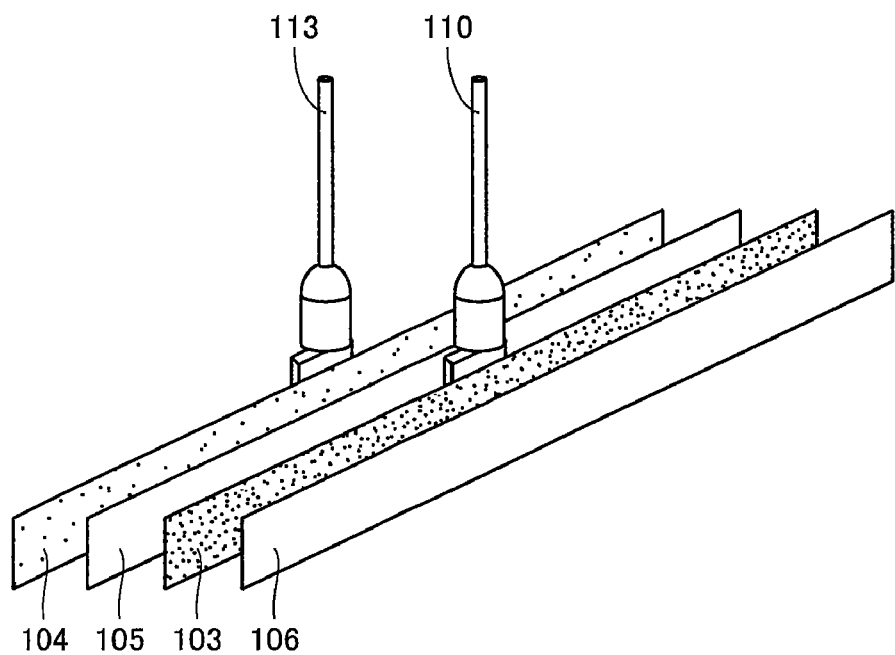
FIG. 52 is a perspective view showing a manner of connection of an anode (a cathode) lead tab terminal to an anode (a cathode) foil and a manner of arrangement of the anode (cathode) foil and a separator in an electrolytic capacitor according to a first conventional technique.

Therefore, though the position in the radial direction of connection portion 18*b* is not different from the position in the radial direction of connection portion 116*b* in a case where both-side pressed terminal 116 is applied, the position in the radial direction of lead 18*c* (boss portion 18*a*) is shifted by distance S outward relative to the position in the radial direction of lead 116*c* (boss portion 116*a*) in a case where both-side pressed terminal 116 shown in the lower portion of FIG. 51 is applied.

In addition, as shown in the upper portion of FIG. 51, second connection surface 18*e* of connection portion 18*b* of one-side pressed terminal 18 serving as second anode lead tab terminal 12 is connected to outer circumferential surface 3*b* of anode foil 3.

Therefore, though the position in the radial direction of connection portion 18*b* is not different from the position in the radial direction of connection portion 116*b* in a case where both-side pressed terminal 116 is applied, the position in the radial direction of lead 18*c* (boss portion 18*a*) is shifted by distance S inward relative to the position in the radial direction of lead 116*c* (boss portion 116*a*) in a case where both-side pressed terminal 116 shown in the lower portion of FIG. 51 is applied.

Thus, as shown in FIG. 51, the position in the radial direction of lead 18*c* (boss portion 18*a*) of one-side pressed terminal 18 serving as first anode lead tab terminal 11 is shifted outward and the position in the radial direction of lead 18*c* (boss portion 18*a*) of one-side pressed terminal 18 serving as second anode lead tab terminal 12 is shifted inward. Thus, the position in the radial direction of lead 18*c* (boss portion 18*a*) of one-side pressed terminal 18 serving as first anode lead tab terminal 11 is in registration with the position in the radial direction of lead 18*c* (boss portion 18*a*) of one-side pressed terminal 18 serving as second anode lead tab terminal 12, so that leads 16*c*, 18*c* of first and second anode lead tab terminals 11, 12 and cathode lead tab terminal 13 can be arranged at positions corresponding to respective vertices of an equilateral triangle (see FIG. 47).

Consequently, in the electrolytic capacitor in which the connection portion of the anode lead tab terminal is located on the outer circumferential surface of the anode foil as well, substantially regular pitches between first and second anode lead tab terminals 11, 12 and cathode lead tab terminal 13 are achieved, ESL is lowered, and lowering in characteristics as the electrolytic capacitor can be suppressed. In addition, leads or boss portions of first and second anode lead tab terminals 11, 12 and cathode lead tab terminal 13 can readily be inserted in openings 22a in sealing rubber gasket 22 or openings 24a in seat plate 24 and thus productivity can be improved.

In each embodiment described above, regarding a manner of connection of first anode lead tab terminal 11 and second anode lead tab terminal 12 to anode foil 3, a case in which interval P1 (NL) between first anode lead tab terminal 11 and second anode lead tab terminal 12 is set to an interval between a portion of anode foil 3 corresponding to the first position in the circumferential direction in anode foil 3 and a portion of anode foil 3 corresponding to the second position in the circumferential direction after winding up a closest portion of anode foil 3 corresponding to the second position in the circumferential direction with respect to the first position in the circumferential direction and further winding up anode foil 3 again has been described by way of example.

A manner of connection of first anode lead tab terminal 11 and second anode lead tab terminal 12 to anode foil 3 is not limited thereto, and for example, second anode lead tab terminal 12 may be connected to a prescribed portion of anode foil 3 after winding up the foil by a length shorter than a circumference from a portion of anode foil 3 to which first anode lead tab terminal 11 is connected. Alternatively, second anode lead tab terminal 12 may be connected to a prescribed portion of anode foil 3 after winding up the foil by a length longer than a circumference from a portion of anode foil 3 to which first anode lead tab terminal 11 is connected.

Though a case where both-side pressed terminal 16 is applied as cathode lead tab terminal 13 has been described in each embodiment described above by way of example, one-side pressed terminal 18 may be applied as cathode lead tab terminal 13.

In such a case as well, both-side pressed terminal 16 is applied as first anode lead tab terminal 11 and one-side pressed terminal 18 is applied as second anode lead tab terminal 12, and second anode lead tab terminal 12 arranged radially outward relative to first anode lead tab terminal 11 is connected to anode foil 3 such that lead 18c thereof is shifted radially inward. Thus, the position in the radial direction of lead 18c of second anode lead tab terminal 12 can be in registration with the position in the radial direction of lead 16c of first anode lead tab terminal 11. Consequently, registration in manufacturing is further facilitated and characteristics as the electrolytic capacitor can also be maintained.

Meanwhile, one-side pressed terminal 18 is applied as first anode lead tab terminal 11 and both-side pressed terminal 16 is applied as second anode lead tab terminal 12, and first anode lead tab terminal 11 arranged radially inward relative to second anode lead tab terminal 12 is connected to anode foil 3 such that lead 18c thereof is shifted radially outward. Thus, the position in the radial direction of lead 18c of first anode lead tab terminal 11 can be in registration with the position in the radial direction of lead 16c of second anode lead tab terminal 12. Consequently, registration in manufacturing is further facilitated and characteristics as the electrolytic capacitor can also be maintained.

In addition, one-side pressed terminal 18 is applied as first anode lead tab terminal 11 and second anode lead tab terminal 12, second anode lead tab terminal 12 arranged radially outward relative to first anode lead tab terminal 11 is connected to anode foil 3 such that lead 18c thereof is shifted radially inward and first anode lead tab terminal 11 arranged radially inward relative to second anode lead tab terminal 12 is connected to anode foil 3 such that lead 18c thereof is shifted radially outward. Thus, the position in the radial direction of lead 18c of second anode lead tab terminal 12 can be in registration with the position in the radial direction of lead 18c of first anode lead tab terminal 11. Consequently, registration in manufacturing is further facilitated and characteristics as the electrolytic capacitor can also be maintained.

In addition, the electrolytic capacitor in each present embodiment described above includes both-side pressed terminal 16 and one-side pressed terminal 18, or includes one-side pressed terminal 18 having first connection surface 18d connected to anode foil 3 or cathode foil 4 and one-side lead terminal 18 having second connection surface 18e connected to anode foil 3 or cathode foil 4. Thus, since the position in the radial direction of the lead of each lead tab terminal can be in registration, registration in manufacturing is facilitated. Therefore, a three-terminal electrolytic capacitor including two anode lead tab terminals and one cathode lead tab terminal can be implemented. Consequently, as compared with a four-terminal electrolytic capacitor including two anode lead tab terminals and two cathode lead tab terminals, size reduction can be achieved. In particular, the present invention is more advantageous than a case where, if geometry (a diameter) is made smaller in a four-terminal capacitor, it is difficult to take out four anode (cathode) lead tab terminals.

Example III

The inventors fabricated 500 electrolytic capacitors as Example 4 of the present invention in which a both-side pressed terminal was applied as the first anode lead tab terminal and a one-side pressed terminal was applied as the second anode lead tab terminal (the fourth embodiment), 500 electrolytic capacitors as Example 5 of the present invention in which a one-side pressed terminal was applied as the first anode lead tab terminal and a both-side pressed terminal was applied as the second anode lead tab terminal (the fifth embodiment), and 500 electrolytic capacitors as Example 6 of the present invention in which a one-side pressed terminal was applied as the first anode lead tab terminal and a one-side pressed terminal was applied as the second anode lead tab terminal (the sixth embodiment), and evaluated positions of four completed anode (cathode) lead tab terminals (leads) (arrangement geometry).

It is noted that a specific method of manufacturing an electrolytic capacitor is as described in the fourth to sixth embodiments above and a diameter was set to 6.3 mm. In addition, 500 three-terminal electrolytic capacitors in which a both-side pressed terminal was applied as the first and second anode lead tab terminals were fabricated as Comparative Example 3 and 500 four-terminal electrolytic capacitors in which a both-side pressed terminal was applied as the first and second anode (cathode) lead tab terminals were fabricated as Comparative Example 4, and shape and position of each anode (cathode) lead tab terminal (lead) were evaluated.

Regarding the criteria for determining whether a sample is good or defective, an angle of one vertex of a triangle formed by connecting to one another, points where leads of three anode (cathode) lead tab terminals are located was measured, and a sample of which angle is within a range from 20° to 140° was determined as good and a sample otherwise was determined as defective. Table 4 shows the results.

TABLE 4

| | | Anode Lead Tab Terminal | | Cathode Lead Tab Terminal | | The Number of Defects Produced/Total Number (pieces) | |
|---|---|---|---|---|---|---|---|
| | Shape | Start of Winding | End of Winding | Start of Winding | End of Winding | Shape | Lead Position |
| Example 4 of the Present Invention | 3 terminals | Both-Side Pressed Terminal | One-Side Pressed Terminal | Both-Side Pressed Terminal | — | 0/500 | 0/500 |
| Example 5 of the Present Invention | | One-Side Pressed Terminal | Both-Side Pressed Terminal | Both-Side Pressed Terminal | — | 0/500 | 0/500 |
| Example 6 of the Present Invention | | One-Side Pressed Terminal | One-Side Pressed Terminal | Both-Side Pressed Terminal | — | 0/500 | 0/500 |
| Comparative Example 3 | | Both-Side Pressed Terminal | Both-Side Pressed Terminal | Both-Side Pressed Terminal | — | 500/500 | — |
| Comparative Example 4 | 4 terminals | Both-Side Pressed Terminal | Both-Side Pressed Terminal | Both-Side Pressed Terminal | Both-Side Pressed Terminal | 500/500 | — |

As shown in Table 4, regarding the electrolytic capacitors according to each of Comparative Example 3 and Comparative Example 4 in all of which the both-side pressed terminal was applied, all of 500 evaluated samples were determined as defective. Therefore, fabrication per se of a capacitor element was very difficult, winding-up was defective, and a position of the lead could not be evaluated. In contrast, regarding the electrolytic capacitors in Examples 4 to 6 of the present invention according to the fourth to sixth embodiments respectively, all of 500 evaluated samples were determined as good. Based on this evaluation result, it was demonstrated that the electrolytic capacitor described above can contribute to lowering in ESL, facilitate registration with a sealing rubber gasket, a seat plate and the like, and improve productivity.

Although the present invention has been described and illustrated in detail, it is clearly understood that the same is by way of illustration and example only and is not to be taken by way of limitation, the scope of the present invention being interpreted by the terms of the appended claims.

INDUSTRIAL APPLICABILITY

The present invention is effectively utilized in a wound-type electrolytic capacitor in which an anode (cathode) foil is wound up from one-end side.

What is claimed is:

1. An electrolytic capacitor formed by winding band-shaped anode foil and cathode foil, comprising:
   an anode foil and a cathode foil wound up in a prescribed orientation from one-end side in a longitudinal direction, in a manner opposed to each other;
   a first anode lead tab terminal connected to a portion of said anode foil at a first distance from said one-end side of said anode foil and arranged at a prescribed first position in a circumferential direction in a wound-up state;
   a second anode lead tab terminal connected to a portion of said anode foil at a second distance greater than said first distance from said one-end side of said anode foil and arranged at a prescribed second position in a circumferential direction with respect to said first position in the circumferential direction in the wound-up state;
   a first cathode lead tab terminal connected to a portion of said cathode foil at a third distance from said one-end side of said cathode foil and arranged at a prescribed third position in a circumferential direction with respect to said first position in the circumferential direction and said second position in the circumferential direction in the wound-up state; and
   a second cathode lead tab terminal connected to a portion of said cathode foil at a fourth distance greater than said third distance from said one-end side of said cathode foil and arranged at a prescribed fourth position in a circumferential direction with respect to said third position in the circumferential direction in the wound-up state, wherein
   each of said first anode lead tab terminal and said second anode lead tab terminal includes
   an anode connection portion connected in contact with said anode foil and
   an anode lead electrically connected to said anode connection portion and serving as an anode terminal,
   each of said first cathode lead tab terminal and said second cathode lead tab terminal includes
   a cathode connection portion connected in contact with said cathode foil and
   a cathode lead electrically connected to said cathode connection portion and serving as a cathode terminal,
   said second anode lead tab terminal is connected to a portion of said anode foil corresponding to said second position in the circumferential direction after winding up said anode foil by a prescribed length from the portion of said anode foil corresponding to said first position in the circumferential direction,
   one anode lead tab terminal of said first anode lead tab terminal and said second anode lead tab terminal is provided as a first type formed such that a position in a radial direction of said anode lead is different from a position in a radial direction of said anode connection portion in a state that said anode foil is wound up,
   the other anode lead tab terminal of said first anode lead tab terminal and said second anode lead tab terminal is provided as a second type formed such that a position in a radial direction of said anode lead is identical to a position in a radial direction of said anode connection portion in a state that said anode foil is wound up,
   said second cathode lead tab terminal is connected to a portion of said cathode foil corresponding to said fourth position in the circumferential direction after winding up said cathode foil by a prescribed length from the portion of said cathode foil corresponding to said third position in the circumferential direction, one cathode lead tab terminal of said first cathode lead tab terminal and said second cathode lead tab terminal is provided as a third type formed such that a position in a radial direction of said cathode lead is different from a position in a radial direction of said cathode connection portion in a state that said cathode foil is wound up, and the other cathode lead tab terminal of said first cathode lead tab terminal and said second cathode lead tab terminal is provided as a fourth type formed such that a position in a radial direction of said cathode lead is identical to a position in a radial direction of said cathode connection portion in a state that said cathode foil is wound up.

2. The electrolytic capacitor according to claim 1, wherein said first anode lead tab terminal is provided as said second type, said second anode lead tab terminal is provided as said first type, said second anode lead tab terminal is connected to said anode foil such that the position in the radial direction of said anode lead of said second anode lead tab terminal is shifted inward to be in registration with the position in the radial direction of said anode lead of said first anode lead tab terminal, said first cathode lead tab terminal is provided as said fourth type, said second cathode lead tab terminal is provided as said third type, and said second cathode lead tab terminal is connected to said cathode foil such that the position in the radial direction of said cathode lead of said second cathode lead tab terminal is shifted inward to be in registration with the position in the radial direction of said cathode lead of said first cathode lead tab terminal.

3. The electrolytic capacitor according to claim 1, wherein said first anode lead tab terminal is provided as said first type, said second anode lead tab terminal is provided as said second type, said first anode lead tab terminal is connected to said anode foil such that the position in the radial direction of said anode lead of said first anode lead tab terminal is shifted outward to be in registration with the position in the radial direction of said anode lead of said second anode lead tab terminal, said first cathode lead tab terminal is provided as said third type, said second cathode lead tab terminal is provided as said fourth type, and said first cathode lead tab terminal is connected to said cathode foil such that the position in the radial direction of said cathode lead of said first cathode lead tab terminal is shifted outward to be in registration with the position in the radial direction of said cathode lead of said second cathode lead tab terminal.

4. The electrolytic capacitor according to claim 1, wherein a two-dimensional arrangement pattern of said anode lead of said first anode lead tab terminal, said anode lead of said second anode lead tab terminal, said cathode lead of said first cathode lead tab terminal, and said cathode lead of said second cathode lead tab terminal in a state that said anode foil and said cathode foil are wound up is a pattern in which the leads are arranged at positions corresponding to vertices of a quadrangle respectively.

5. The electrolytic capacitor according to claim 4, wherein in said two-dimensional arrangement pattern, an angle of one vertex of said quadrangle is in a range from 70 to 110°.

6. An electrolytic capacitor formed by winding band-shaped anode foil and cathode foil, comprising:

an anode foil and a cathode foil wound up in a prescribed orientation from one-end side in a longitudinal direction, in a manner opposed to each other;

a first anode lead tab terminal connected to a portion of said anode foil at a first distance from said one-end side of said anode foil and arranged at a prescribed first position in a circumferential direction in a wound-up state;

a second anode lead tab terminal connected to a portion of said anode foil at a second distance greater than said first distance from said one-end side of said anode foil and arranged at a prescribed second position in a circumferential direction with respect to said first position in the circumferential direction in the wound-up state;

a first cathode lead tab terminal connected to a portion of said cathode foil at a third distance from said one-end side of said cathode foil and arranged at a prescribed third position in a circumferential direction with respect to said first position in the circumferential direction and said second position in the circumferential direction in the wound-up state; and a second cathode lead tab terminal connected to a portion of said cathode foil at a fourth distance greater than said third distance from said one-end side of said cathode foil and arranged at a prescribed fourth position in a circumferential direction with respect to said third position in the circumferential direction in the wound-up state, wherein each of said first anode lead tab terminal and said second anode lead tab terminal includes an anode connection portion connected in contact with said anode foil and an anode lead electrically connected to said anode connection portion and serving as an anode terminal, each of said first cathode lead tab terminal and said second cathode lead tab terminal includes a cathode connection portion connected in contact with said cathode foil and a cathode lead electrically connected to said cathode connection portion and serving as a cathode terminal, said second anode lead tab terminal is connected to a portion of said anode foil corresponding to said second position in the circumferential direction after winding up said anode foil by a prescribed length from the portion of said anode foil corresponding to said first position in the circumferential direction, said first anode lead tab terminal and said second anode lead tab terminal are formed such that a position in a radial direction of said anode lead is different from a position in a radial direction of said anode connection portion in a state that said anode foil is wound up, said second cathode lead tab terminal is connected to a portion of said cathode foil corresponding to said fourth position in the circumferential direction after winding up said cathode foil by a prescribed length from a portion of said cathode foil corresponding to said third position in the circumferential direction, and said first cathode lead tab terminal and said second cathode lead tab terminal are formed such that a position in a radial direction of said cathode lead is different from a position in a radial direction of said cathode connection portion in a state that said cathode foil is wound up.

7. The electrolytic capacitor according to claim 6, wherein
said first anode lead tab terminal is connected to said anode foil such that the position in the radial direction of said anode lead of said first anode lead tab terminal is shifted outward to be in registration with the position in the radial direction of said anode lead of said second anode lead tab terminal,
said second anode lead tab terminal is connected to said anode foil such that the position in the radial direction of said anode lead of said second anode lead tab terminal is shifted inward to be in registration with the position in the radial direction of said anode lead of said first anode lead tab terminal,
said first cathode lead tab terminal is connected to said cathode foil such that the position in the radial direction of said cathode lead of said first cathode lead tab terminal is shifted outward to be in registration with the position in the radial direction of said cathode lead of said second cathode lead tab terminal, and
said second cathode lead tab terminal is connected to said cathode foil such that the position in the radial direction of said cathode lead of said second cathode lead tab terminal is shifted inward to be in registration with the position in the radial direction of said cathode lead of said first cathode lead tab terminal.

8. The electrolytic capacitor according to claim 6, wherein
a two-dimensional arrangement pattern of said anode lead of said first anode lead tab terminal, said anode lead of said second anode lead tab terminal, said cathode lead of said first cathode lead tab terminal, and said cathode lead of said second cathode lead tab terminal in a state that said anode foil and said cathode foil are wound up is a pattern in which the leads are arranged at vertices of a quadrangle respectively.

9. The electrolytic capacitor according to claim 8, wherein
in said two-dimensional arrangement pattern, an angle of one vertex of said quadrangle is in a range from 70 to 110°.

10. An electrolytic capacitor formed by winding band-shaped anode foil and cathode foil, comprising:
an anode foil and a cathode foil wound up in a prescribed orientation from one-end side in a longitudinal direction, in a manner opposed to each other;
a first anode lead tab terminal connected to a portion of said anode foil at a first distance from said one-end side of said anode foil and arranged at a prescribed first position in a circumferential direction in a wound-up state;
a second anode lead tab terminal connected to a portion of said anode foil at a second distance greater than said first distance from said one-end side of said anode foil and arranged at a prescribed second position in a circumferential direction with respect to said first position in the circumferential direction in the wound-up state; and
one cathode lead tab terminal connected to a portion of said cathode foil at a third distance from said one-end side of said cathode foil and arranged at a prescribed third position in a circumferential direction with respect to said first position in the circumferential direction and said second position in the circumferential direction in the wound-up state, wherein
each of said first anode lead tab terminal and said second anode lead tab terminal includes
an anode connection portion connected in contact with said anode foil and
an anode lead electrically connected to said anode connection portion and serving as an anode terminal,
said cathode lead tab terminal includes
a cathode connection portion connected in contact with said cathode foil and
a cathode lead electrically connected to said cathode connection portion and serving as a cathode terminal,
said second anode lead tab terminal is connected to a portion of said anode foil corresponding to said second position in the circumferential direction after winding up said anode foil by a prescribed length from the portion of said anode foil corresponding to said first position in the circumferential direction, and
at least one anode lead tab terminal of said first anode lead tab terminal and said second anode lead tab terminal is provided as a first type formed such that a position in a radial direction of said anode lead is different from a position in a radial direction of said anode connection portion in a state that said anode foil is wound up.

11. The electrolytic capacitor according to claim 10, wherein
an anode lead tab terminal of said first anode lead tab terminal is provided as the second type formed such that the position in the radial direction of said anode lead is identical to the position in the radial direction of said anode connection portion in the state that said anode foil is wound up,
said second anode lead tab terminal is provided as said first type, and
said second anode lead tab terminal is connected to said anode foil such that the position in the radial direction of said anode lead of said second anode lead tab terminal is shifted inward to be in registration with the position in the radial direction of said anode lead of said first anode lead tab terminal.

12. The electrolytic capacitor according to claim 10, wherein
said first anode lead tab terminal is provided as said first type,
an anode lead tab terminal of said second anode lead tab terminal is provided as the second type formed such that the position in the radial direction of said anode lead is identical to the position in the radial direction of said anode connection portion in the state that said anode foil is wound up, and
said first anode lead tab terminal is connected to said anode foil such that the position in the radial direction of said anode lead of said first anode lead tab terminal is shifted outward to be in registration with the position in the radial direction of said anode lead of said second anode lead tab terminal.

13. The electrolytic capacitor according to claim 10, wherein
said first and second anode lead tab terminals are provided as said first type,
said first anode lead tab terminal is connected to said anode foil such that the position in the radial direction of said anode lead of said first anode lead tab terminal is shifted outward to be in registration with the position in the radial direction of said anode lead of said second anode lead tab terminal, and
said second anode lead tab terminal is connected to said anode foil such that the position in the radial direction of said anode lead of said second anode lead tab terminal is shifted inward to be in registration with the position in the radial direction of said anode lead of said first anode lead tab terminal.

14. The electrolytic capacitor according to claim 10, wherein a two-dimensional arrangement pattern of said anode lead of said first anode lead tab terminal, said anode lead of said second anode lead tab terminal, and said cathode lead of said cathode lead tab terminal in a state that said anode foil and said cathode foil are wound up is a pattern in which the leads are arranged at vertices of a triangle respectively.

15. The electrolytic capacitor according to claim 14, wherein in said two-dimensional arrangement pattern, an angle of one vertex of said triangle is in a range from 20 to 140°.

* * * * *